US010659974B2

(12) United States Patent
Yun et al.

(10) Patent No.: US 10,659,974 B2
(45) Date of Patent: May 19, 2020

(54) METHOD FOR TRANSMITTING AND RECEIVING SIGNAL IN WIRELESS LAN SYSTEM, AND APPARATUS THEREFOR

(71) Applicant: LG ELECTRONICS INC., Seoul (KR)

(72) Inventors: Sunwoong Yun, Seoul (KR); Jinmin Kim, Seoul (KR); Sungjin Park, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/325,693

(22) PCT Filed: Apr. 9, 2018

(86) PCT No.: PCT/KR2018/004125
§ 371 (c)(1),
(2) Date: Feb. 14, 2019

(87) PCT Pub. No.: WO2019/013431
PCT Pub. Date: Jan. 17, 2019

(65) Prior Publication Data
US 2019/0215702 A1 Jul. 11, 2019

Related U.S. Application Data

(60) Provisional application No. 62/531,446, filed on Jul. 12, 2017, provisional application No. 62/535,242, filed on Jul. 21, 2017.

(51) Int. Cl.
*H04W 72/04* (2009.01)
*H04L 5/00* (2006.01)
(Continued)

(52) U.S. Cl.
CPC .......... *H04W 16/28* (2013.01); *H04B 7/0695* (2013.01); *H04B 7/0697* (2013.01);
(Continued)

(58) Field of Classification Search
CPC ... H04W 16/28; H04W 72/046; H04W 84/12; H04B 7/0697; H04B 7/0695; H04L 5/0053; H04L 5/0023; H04L 5/0007
See application file for complete search history.

(56) References Cited

U.S. PATENT DOCUMENTS

2011/0051747 A1* 3/2011 Schmidl .............. H04L 27/2613 370/474
2015/0289147 A1 10/2015 Lou et al.
(Continued)

FOREIGN PATENT DOCUMENTS

| | | |
|---|---|---|
| EP | 3599747 | 1/2020 |
| WO | 2017043912 | 3/2017 |

(Continued)

OTHER PUBLICATIONS

Claudio da Silva et al, "Training Field Structure Definition", IEEE 802.11-17/0007r1, Jan. 2017 (Jan. 16, 2017) See slides 4-8, 16. (Year: 2017).*
(Continued)

*Primary Examiner* — Mohamed A Kamara
(74) *Attorney, Agent, or Firm* — Lee Hong Degerman Kang Waimey

(57) ABSTRACT

The present specification proposes a method for transmitting and receiving a signal, and an apparatus therefor, and more specifically, a method for transmitting, by a first station (STA), a signal to a second STA in a wireless LAN (WLAN) system, the method comprising the steps of: generating a training field including a basic training subfield for each spatial-temporal stream and a training subfield for each
(Continued)

spatial-temporal stream on the basis of the total number of spatial-temporal streams, wherein the basic training subfield for each spatial-temporal stream is composed of M (M is a natural number) orthogonal frequency division multiplexing (OFDM) symbols on the basis of the information indicated by a header field; and transmitting a signal including the header field and the training field to the second STA through a corresponding spatial-temporal stream.

17 Claims, 40 Drawing Sheets

(51) Int. Cl.

| | |
|---|---|
| ***H04W 16/28*** | (2009.01) |
| ***H04B 7/06*** | (2006.01) |
| ***H04L 27/26*** | (2006.01) |
| ***H04L 1/06*** | (2006.01) |
| *H04W 84/12* | (2009.01) |

(52) U.S. Cl.

CPC .............. *H04L 1/06* (2013.01); *H04L 5/0048* (2013.01); *H04L 27/26* (2013.01); *H04L 27/2607* (2013.01); *H04L 27/2613* (2013.01); *H04W 72/046* (2013.01); *H04L 5/0007* (2013.01); *H04L 5/0023* (2013.01); *H04L 5/0053* (2013.01); *H04W 84/12* (2013.01)

(56) References Cited

U.S. PATENT DOCUMENTS

| | | | | |
|---|---|---|---|---|
| 2016/0164800 | A1 | 6/2016 | Eitan et al. | |
| 2016/0174200 | A1 | 6/2016 | Seok | |
| 2016/0261319 | A1 | 9/2016 | Sanderovich | |
| 2016/0323878 | A1 | 11/2016 | Ghosh et al. | |
| 2017/0078008 | A1 | 3/2017 | Kasher et al. | |
| 2017/0126303 | A1 | 5/2017 | Jo et al. | |
| 2017/0332277 | A1* | 11/2017 | Xin | H04W 28/06 |
| 2017/0373976 | A1* | 12/2017 | Lopez | H04W 84/12 |
| 2018/0014216 | A1* | 1/2018 | Banerjea | H04W 24/08 |
| 2018/0026696 | A1* | 1/2018 | Hansen | H04W 16/28 370/336 |
| 2018/0198584 | A1* | 7/2018 | Sanderovich | H04L 27/2613 |
| 2019/0044781 | A1* | 2/2019 | Lomayev | H04L 27/2666 |

FOREIGN PATENT DOCUMENTS

| | | |
|---|---|---|
| WO | 2018129508 | 7/2018 |
| WO | WO 2018191033 A1 * | 10/2018 |

OTHER PUBLICATIONS

Carlos Cordeiro, "Specification Framework for TGay", UEEE P802.11 Wireless LANs, IEEE 802.11-15/01358r9, Nov. 2015 (Oct. 8, 2016) See section 6.3.3.2.1, tables 9, 12. (Year: 2015).*

Artyom Lomayev et al, "EDMG TRN Subfields Definition for SC PHY", IEEE 802.11-16/1636r0, Jan. 2017 (Jan. 17, 2017) See slides 4-9. (Year: 2017).*

Claudio da Silva et al, "Draft Text for Data/TRN Transition Interval", IEEE 802.11-17/0924r0, Jul. 2017 (Jul. 10, 2017) See p. 2. (Year: 2017).*

PCT International Application No. PCT/KR2018/004125, International Search Report dated Jul. 13, 2018, 4 pages.

Kasher, A. et al., "EDMG Header Encoding and Modulation", doc.: IEEE 802.11-16/1011r1, Jul. 2016, 11 pages.

Korean Intellectual Property Office Application No. 10-2019-7003019, Office Action dated Jun. 26, 2019, 5 pages.

Lomayev, A. et al., "Channel Estimation Field for EDMG OFDM PHY in 11ay", doc.: IEEE 802.11-17/0595r0, Apr. 2017, 18 pages.

Kasher, A. et al., "Short and long TRN subfield", IEEE P802.11 Wireless LANs, doc.: IEEE 802.11-17/0430r0, Jan. 2017, 7 pages.

Cordeiro, C., "Specification Framework for TGay", IEEE P802.11 Wireless LANs, doc.: IEEE 802.11-15/01358r9, Nov. 2015, 90 pages.

Korean Intellectual Property Office Application No. 10-2019-7003019, Notice of Allowance dated Nov. 13, 2019, 5 pages.

European Patent Office Application Serial No. 18831802.6, Search Report dated Mar. 9, 2020, 14 pages.

Intel, "Proposed resolution to 11ay related CIDSs", IEEE 802.11-17/0919r0, Jun. 2017, 8 pages.

* cited by examiner

| CH 1 | L-STF | L-CE | L-Header | ay Header A | | | | |
|---|---|---|---|---|---|---|---|---|
| | GF-STF | GF-CE | | | ay STF | ay CE | ay Header B | ay payload |
| CH 2 | L-STF | L-CE | L-Header | ay Header A | | | | |

(L: Legacy, GF: Gap Filling, ay: 802.11ay)

FIG. 11

| |
|---|
| The Sequence $Seq^{1}_{left}$ , 176(k), to be transmitted from left to right, up to down |
| -1 -j -j +1 +j -j +1 -1 +1 -j -1 +1 -1 +1 -j -1 -1 +j +j +j -1 -1 +1 +j +j -1 -j +j -1 +1 -1 +j +1 +1 -1 +1 -j -1 -1 +j +j +j -1 -<br>1 +j -1 -1 -j +1 -1 -j +j -j -1 +j -j +j -j -1 +j +j +1 +1 +1 +j +j +j -1 -1 -j +1 -1 -j +j -j -1 +j +j -j +j +1 -j -j -1 -1 -1 -j -j +j<br>-1 -1 -j +1 -1 -j +j -j -1 +j -j +j -j -1 +j +j +1 +1 +1 +j +j -j +1 +1 +j -1 +1 +j -j +j +1 -j -j +j -j -1 +j +j +1 +1 +1 +j +j -1<br>-j -j +1 +j -j +1 -1 +1 -j -1 +1 -1 +1 -j -1 -1 +j +j +j -1 -1 -1 -j -j +1 +j -j +1 -1 +1 -j -1 -1 +1 -1 +j +1 +1 -j -j -j +1 +1 |
| The Sequence $Seq^{2}_{left}$ , 176(k), to be transmitted from left to right, up to down |
| +1 -j -j -1 +j -j -1 +1 -1 -j +1 +1 -j -j -1 +j -j -1 +1 -1 -j +1 +j +1 +1 -j -1 +1 -j +j -j +1 +j -j -1 -1 +j +1 -1 +j -j +j -1 -j<br>+1 -1 +1 +j -1 -1 -j -j -j -1 -1 +1 -1 +1 +j -1 -1 -j -j -j -1 -1 +j -j +j -1 -j -j +1 +1 +1 -j -j -j +j -j +1 +j +j -1 -1 -1 +j +j +j<br>+1 +1 -j -1 +1 -j +j -j +1 +j -j -1 -1 +j +1 -1 +j -j +j -1 -j -1 +j +j +1 -j +j +1 -1 +1 +j -1 -1 +j +j +1 -j +j +1 -1 +1 +j -1 -<br>j +j -j +1 +j +j -1 -1 -1 +j +j +j -j +j -1 -j -j +1 +1 +1 -j -j +1 -1 +1 +j -1 -1 -j -j -j -1 -1 +1 -1 +1 +j -1 -1 -j -j -j -1 -1 |
| The Sequence $Seq^{3}_{left}$ , 176(k), to be transmitted from left to right, up to down |
| +1 +1 +j +j +j +1 +1 -j -1 +1 -1 +1 +1 +j +j +j +1 +1 -j -1 +1 -1 +j +j -1 -1 -1 +j +j +1 -j +j -j -j +1 +1 +1 -j -j -1 +j -j<br>+j +j +j -1 -1 -1 +j +j +1 -j +j -j +j +j -1 -1 -1 +j +j +1 -j +j -j +1 +1 +j +j +j +1 +1 -j -1 +1 -1 -1 -1 -j -j -j -1 -1 +j +1 -1<br>+1 -j -1 +j -j +j -1 +1 +j -1 -1 -j +j +1 -j +j -j +1 -1 -j +1 +1 +j +1 -j -1 +1 -1 -j +j -1 -j -j +1 +1 -j -1 +1 -1 -j +j -1 -j -j<br>+1 +1 -j -1 +1 -1 -j +j -1 -j -j +1 -1 +j +1 -1 +1 +j -j +1 +j +j -1 -j -1 +j -j +j -1 +1 +j -1 -1 -j -j -1 +j -j +j -1 +1 +j -1 -1 -j |
| The Sequence $Seq^{4}_{left}$ , 176(k), to be transmitted from left to right, up to down |
| -1 +j +j +1 -j +j +1 -1 +1 +j -1 -j -1 -1 +j +1 -1 +j -j +j -1 -j +j -j +j -1 -j -j +1 +1 +1 -j -j -1 +1 -1 -j +1 +1 +j +j +j +1 +1<br>-1 +j +j +1 -j +j +1 -1 +1 +j -1 -j -1 -1 +j +1 -1 +j -j +j -1 -j -j +j -j +1 +j +j -1 -1 -1 +j +j +1 -1 +1 +j -1 -1 -j -j -j -1 -1 +1<br>-j -j -1 +j -j -1 +1 -1 -j +1 -j -1 -1 +j +1 -1 +j -j +j -1 -j -j +j -j +1 +j +j -1 -1 -1 +j +j -1 +1 -1 -j +1 +1 +j +j +j +1 +1 -1 +j<br>+j +1 -j +j +1 -1 +1 +j -1 +j +1 +1 -j -1 +1 -j +j -j +1 +j -j +j -j +1 +j +j -1 -1 -1 +j +j -1 +1 -1 -j +1 +1 +j +j +j +1 +1 |
| The Sequence $Seq^{5}_{left}$ , 176(k), to be transmitted from left to right, up to down |
| +1 -1 +1 -j -1 -1 +j +j +j -1 -1 +1 +j +j -1 -j +j -1 +1 -1 +j +1 +1 -1 +1 -j -1 -1 +j +j +j -1 -1 +1 +j +j -1 -j +j -1 +1 -1 +j<br>+1 +j -j +j +1 -j -j -1 -1 -1 -j -j +j -1 -1 -j +1 -1 -j +j -j -1 +j -j +j -j -1 +j +j +1 +1 +1 +j +j -j +1 +1 +j -1 +1 +j -j +j +1 -<br>j -j +j -j -1 +j +j +1 +1 +1 +j +j +j -1 -1 -j +1 -1 -j +j -j -1 +j +j -j +j +1 -j -j -1 -1 -1 -j -j -j +1 +1 +j -1 +1 +j -j +j +1 -j<br>+1 -1 +1 -j -1 -1 +j +j +j -1 -1 -1 -j -j +1 +j -j +1 -1 +1 -j -1 +1 -1 +1 -j -1 -1 +j +j +j -1 -1 -1 -j -j +1 +j -j +1 -1 +1 -j -1 |
| The Sequence $Seq^{6}_{left}$ , 176(k), to be transmitted from left to right, up to down |
| +1 +j -1 +1 -1 +j -j -1 +j +j +1 -1 -j +1 -1 +1 -j +j +1 -j -j -1 +j -1 -j +j -j -1 +1 -j -1 -1 +j -j +1 +j -j +j +1 -1 +j +1 +1 -j<br>+j +j +1 +1 +1 +j +j -1 -j +j -j +j +j +1 +1 +1 +j +j -1 -j +j -j -1 -1 +j +j +j -1 -1 -j +1 -1 +1 -1 -1 +j +j +j -1 -1 -j +1 -1<br>+1 +j -1 -j +j -j -1 +1 -j -1 -1 +j +j -1 -j +j -j -1 +1 -j -1 -1 +j +1 +j -1 +1 -1 +j -j -1 +j +j +1 +1 +j -1 +1 -1 +j -j -1 +j +j<br>+1 -1 -1 +j +j +j -1 -1 -j +1 -1 +1 +1 +1 -j -j -j +1 +1 +j -1 +1 -1 +j +j +1 +1 +1 +j +j -1 -j +j -j -j -j -1 -1 -1 -j -j +1 +j -j<br>+j |
| The Sequence $Seq^{7}_{left}$ , 176(k), to be transmitted from left to right, up to down |
| -j -1 +j -j +j -1 +1 +j -1 -1 -j +j +j -1 -1 -1 +j +j +1 -j +j -j +1 -j -1 +1 -1 -j +j -1 -j -j +1 -1 -1 -j -j -j -1 -1 +j +1 -1 +1 +1<br>-j -1 +1 -1 -j +j -1 -j -j +1 -1 -1 -j -j -j -1 -1 +j +1 -1 +1 -j -1 +j -j +j -1 +1 +j -1 -1 -j +j +j -1 -1 -1 +j +j +1 -j +j -j +1 -j -<br>1 +1 -1 -j +j -1 -j -j +1 +1 +1 +j +j +j +1 +1 -j -1 +1 -1 -j -1 +j -j +j -1 +1 +j -1 -1 -j -j -j +1 +1 +1 -j -j -1 +j -j +j +j +1 -<br>j +j -j +1 -1 -j +1 +1 +j +j +j -1 -1 -1 +j +j +1 -j +j -j -1 +j +1 -1 +1 +j -j +1 +j +j -1 -1 -1 -j -j -j -1 -1 +j +1 -1 +1 |
| The Sequence $Seq^{8}_{left}$ , 176(k), to be transmitted from left to right, up to down |
| +1 -1 +1 +j -1 -1 -j -j -j -1 -1 +j -j +j -1 -j -j +1 +1 +1 -j -j -j +j -j +1 +j +j -1 -1 -1 +j +j +1 -1 +1 +j -1 -1 -j -j -j -1 -1 +1<br>-1 +1 +j -1 -1 -j -j -j -1 -1 -j +j -j +1 +j +j -1 -1 -1 +j +j +j -j +j -1 -j -j +1 +1 +1 -j -j +1 -1 +1 +j -1 -1 -j -j -j -1 -1 +j +1<br>+1 -j -1 +1 -j +j -j +1 +j -1 +j +j +1 -j +j +1 -1 +1 +j -1 -1 +j +j +1 -j +j +1 -1 +1 +j -1 -j -1 -1 +j +1 -1 +j -j +j -1 -j +j<br>+1 +1 -j -1 +1 -j +j -j +1 +j +1 -j -j -1 +j -j -1 +1 -1 -j +1 +1 -j -j -1 +j -j -1 +1 -1 -j +1 -j -1 -1 +j +1 -1 +j -j +j -1 -j |

FIG. 12

| |
|---|
| The Sequence $Seq^{1}_{right}$, 176(k), to be transmitted from left to right, up to down |
| -1 -j -j +1 +j -j +1 -1 +1 -j -1 +1 -1 +1 -j -1 -1 +j +j +j -1 -1 +1 +j +j -1 -j +j -1 +1 -1 +j +1 +1 -1 +1 -j -1 -1 +j +j +j -1 -<br>1 +j -1 -1 -j +1 -1 -j +j -j -1 +j -j +j -j -1 +j +j +1 +1 +1 +j +j +j -1 -1 -j +1 -1 -j +j -j -1 +j +j -j +j +1 -j -j -1 -1 -1 -j -j -j<br>+1 +1 +j -1 +1 +j -j +j +1 -j +j -j +j +1 -j -j -1 -1 -1 -j -j +j -1 -1 -j +1 -1 -j +j -j -1 +j +j -j +j +1 -j -j -1 -1 -1 -j -j +1 +j<br>+j -1 -j +j -1 +1 -1 +j +1 -1 +1 -1 +j +1 +1 -j -j -j +1 +1 +1 +j +j -1 -j +j -1 +1 -1 +j +1 +1 -1 +1 -j -1 -1 +j +j +j -1 -1 |
| The Sequence $Seq^{2}_{right}$, 176(k), to be transmitted from left to right, up to down |
| -1 +j +j +1 -j +j +1 -1 +1 +j -1 -1 +j +j +1 -j +j +1 -1 +1 +j -1 +j +1 +1 -j -1 +1 -j +j -j +1 +j -j -1 -1 +j +1 -1 +j -j +j -1<br>-j -1 +1 -1 -j +1 +1 +j +j +j +1 +1 -1 +1 -1 -j +1 +1 +j +j +j +1 +1 +j -j +j -1 -j -j +1 +1 +1 -j -j -j +j -j +1 +j +j -1 -1 -1<br>+j +j -j -1 -1 +j +1 -1 +j -j +j -1 -j +j +1 +1 -j -1 +1 -j +j -j +1 +j -1 +j +j +1 -j +j +1 -1 +1 +j -1 -1 +j +j +1 -j +j +1 -1<br>+1 +j -1 +j -j +j -1 -j -j +1 +1 +1 -j -j -j +j -j +1 +j +j -1 -1 -1 +j +j +1 -1 +1 +j -1 -1 -j -j -j -1 -1 +1 -1 +1 +j -1 -1 -j -j -j<br>-1 -1 |
| The Sequence $Seq^{3}_{right}$, 176(k), to be transmitted from left to right, up to down |
| -1 -1 -j -j -j -1 -1 +j +1 -1 +1 -1 -1 -j -j -j -1 -1 +j +1 -1 +1 -j -j +1 +1 +1 -j -j -1 +j -j +j +j +j -1 -1 -1 +j +j +1 -j +j -j +j<br>+j -1 -1 -1 +j +j +1 -j +j -j +j +j -1 -1 -1 +j +j +1 -j +j -j +1 +1 +j +j +j +1 +1 -j -1 +1 -1 -1 -1 -j -j -j -1 -1 +j +1 -1 +1 +j<br>+1 -j +j -j +1 -1 -j +1 +1 +j -j -1 +j -j +j -1 +1 +j -1 -1 -j -1 +j +1 -1 +1 +j -j +1 +j +j -1 -1 +j +1 -1 +1 +j -j +1 +j +j -1<br>+1 -j -1 +1 -1 -j +j -1 -j -j +1 -1 +j +1 -1 +1 +j -j +1 +j +j -1 -j -1 +j -j +j -1 +1 +j -1 -1 -j -j -1 +j -j +j -1 +1 +j -1 -1 -j |
| The Sequence $Seq^{4}_{right}$, 176(k), to be transmitted from left to right, up to down |
| +1 -j -j -1 +j -j -1 +1 -1 -j +1 -j -1 -1 +j +1 -1 +j -j +j -1 -j -j +j -j +1 +j +j -1 -1 -1 +j +j -1 +1 -1 -j +1 +1 +j +j +j +1 +1<br>+1 -j -j -1 +j -j -1 +1 -1 -j +1 -j -1 -1 +j +1 -1 +j -j +j -1 -j +j -j +j -1 -j -j +1 +1 +1 -j -j +1 -1 +1 +j -1 -1 -j -j -j -1 -1 -1<br>+j +j +1 -j +j +1 -1 +1 +j -1 -j -1 -1 +j +1 -1 +j -j +j -1 -j +j -j +j -1 -j -j +1 +1 +1 -j -j -1 +1 -1 -j +1 +1 +j +j +j +1 +1<br>+1 -j -j -1 +j -j -1 +1 -1 -j +1 +j +1 +1 -j -1 +1 -j +j -j +1 +j +j -j +j -1 -j -j +1 +1 +1 -j -j -1 +1 -1 -j +1 +1 +j +j +j +1<br>+1 |
| The Sequence $Seq^{5}_{right}$, 176(k), to be transmitted from left to right, up to down |
| -1 +1 -1 +j +1 +1 -j -j -j +1 +1 -1 -j -j +1 +j -j +1 -1 +1 -j -1 -1 +1 -1 +j +1 +1 -j -j -j +1 +1 -1 -j -j +1 +j -j +1 -1 +1 -j -<br>1 +j -j +j +1 -j -j -1 -1 -1 -j -j +j -1 -1 -j +1 -1 -j +j -j -1 +j -j +j -j -1 +j +j +1 +1 +1 +j +j -j +1 +1 +j -1 +1 +j -j +j +1 -j<br>+j -j +j +1 -j -j -1 -1 -1 -j -j -j +1 +1 +j -1 +1 +j -j +j +1 -j -j +j -j -1 +j +j +1 +1 +1 +j +j +j -1 -1 -j +1 -1 -j +j -j -1 +j<br>+1 -1 +1 -j -1 -1 +j +j +j -1 -1 -1 -j -j +1 +j -j +1 -1 +1 -j -1 +1 -1 +1 -j -1 -1 +j +j +j -1 -1 -1 -j -j +1 +j -j +1 -1 +1 -j -1 |
| The Sequence $Seq^{6}_{right}$, 176(k), to be transmitted from left to right, up to down |
| -1 -j +1 -1 +1 -j +j +1 -j -j -1 +1 +j -1 +1 -1 +j -j -1 +j +j +1 +j -1 -j +j -j -1 +1 -j -1 -1 +j -j +1 +j -j +j +1 -1 +j +1 +1 -j<br>-j -j -1 -1 -1 -j -j +1 +j -j +j -j -j -1 -1 -1 -j -j +1 +j -j +j -1 -1 +j +j +j -1 -1 -j +1 -1 +1 -1 -1 +j +j +j -1 -1 -j +1 -1 +1 -j<br>+1 +j -j +j +1 -1 +j +1 +1 -j -j +1 +j -j +j +1 -1 +j +1 +1 -j +1 +j -1 +1 -1 +j -j -1 +j +j +1 +1 +j -1 +1 -1 +j -j -1 +j +j<br>+1 +1 +1 -j -j -j +1 +1 +j -1 +1 -1 -1 -1 +j +j +j -1 -1 -j +1 -1 +1 +j +j +1 +1 +1 +j +j -1 -j +j -j -j -j -1 -1 -1 -j -j +1 +j -j<br>+j |
| The Sequence $Seq^{7}_{right}$, 176(k), to be transmitted from left to right, up to down |
| +j +1 -j +j -j +1 -1 -j +1 +1 +j -j -j +1 +1 +1 -j -j -1 +j -j +j -1 +j +1 -1 +1 +j -j +1 +j +j -1 +1 +1 +j +j +j +1 +1 -j -1 +1<br>-1 +1 -j -1 +1 -1 -j +j -1 -j -j +1 -1 -1 -j -j -j -1 -1 +j +1 -1 +1 -j -1 +j -j +j -1 +1 +j -1 -1 -j +j +j -1 -1 -1 +j +j +1 -j +j -j<br>-1 +j +1 -1 +1 +j -j +1 +j +j -1 -1 -1 -j -j -j -1 -1 +j +1 -1 +1 +j +1 -j +j -j +1 -1 -j +1 +1 +j +j +j -1 -1 -1 +j +j +1 -j +j -j<br>+j +1 -j +j -j +1 -1 -j +1 +1 +j +j +j -1 -1 -1 +j +j +1 -j +j -j -1 +j +1 -1 +1 +j -j +1 +j +j -1 -1 -1 -j -j -j -1 -1 +j +1 -1 +1 |
| The Sequence $Seq^{8}_{right}$, 176(k), to be transmitted from left to right, up to down |
| -1 +1 -1 -j +1 +1 +j +j +j +1 +1 +j -j +j -1 -j -j +1 +1 +1 -j -j +j -j +j -1 -j -j +1 +1 +1 -j -j +1 -1 +1 +j -1 -1 -j -j -j -1 -1 -<br>1 +1 -1 -j +1 +1 +j +j +j +1 +1 -j +j -j +1 +j +j -1 -1 -1 +j +j -j +j -j +1 +j +j -1 -1 -1 +j +j +1 -1 +1 +j -1 -1 -j -j -j -1 -1<br>-j -1 -1 +j +1 -1 +j -j +j -1 -j -1 +j +j +1 -j +j +1 -1 +1 +j -1 +1 -j -j -1 +j -j -1 +1 -1 -j +1 -j -1 -1 +j +1 -1 +j -j +j -1 -j -j<br>-1 -1 +j +1 -1 +j -j +j -1 -j +1 -j -j -1 +j -j -1 +1 -1 -j +1 -1 +j +j +1 -j +j +1 -1 +1 +j -1 -j -1 -1 +j +1 -1 +j -j +j -1 -j |

FIG. 13

The Sequence $Seq^{1}_{left}$, 385(k), to be transmitted from left to right, up to down -1 -1 +j -1 +1 +1 -1 +j +1 +j +j +j -j -j -1 -j +j +j -j +1 -j +1 +1 +1 -1 -1 +j -1 +1 +1 -1 +j +1 +j +j +j -j +j +1 +j -j -j +j -
1 +j -1 -1 -1 +1 +1 -j +1 -1 -1 +1 -j -1 -j -j -j +j +j +1 +j -j -j +j -1 +j -1 -1 -1 +1 -1 +j -1 +1 +1 -1 +j +1 +j +j +j -j +j +1
+j -j -j +j -1 +j -1 -1 -1 +1 -1 +j -1 +1 +1 -1 +j +1 +j +j +j -j -j -1 -j +j +j -j +1 -j +1 +1 +1 -1 -1 +j -1 +1 +1 -1 +j +1 +j
+j +j -j +j +1 +j -j -j +j -1 +j -1 -1 -1 +1 -1 +j -1 +1 +1 -1 +j +1 +j +j +j -j -j -1 -j +j +j -j +1 -j +1 +1 +1 -1 +1 -j +1 -1 -
1 +1 -j -1 -j -j -j +j -j -1 -j +j +j -j +1 -j +1 +1 +1 -1 -j -1 -j +j +j -j -1 +j -1 -1 -1 +1 +1 -j +1 -1 -1 +1 +j +1 +j +j +j -j -j
-1 -j +j +j -j -1 +j -1 -1 -1 +1 -1 +j -1 +1 +1 -1 -j -1 -j -j -j +j +j +1 +j -j -j +j +1 -j +1 +1 +1 -1 -1 +j -1 +1 +1 -1 -j -1 -j -
j -j +j -j -1 -j +j +j -j -1 +j -1 -1 -1 +1 -1 +j -1 +1 +1 -1 -j -1 -j -j -j +j +j +1 +j -j -j +j +1 -j +1 +1 +1 -1 -1 +j -1 +1 +1 -1
-j -1 -j -j -j +j +j +1 +j -j -j +j +1 -j +1 +1 +1 -1 +1 -j +1 -1 -1 +1 +j +1 +j +j +j -j +j +1 +j -j -j +j +1 -j +1 +1 +1 -1 -1
+j -1 +1 +1 -1 -j -1 -j -j -j +j -j -1 -j +j +j -j -1 +j -1 -1 -1 +1 -1 +j -1 +1 +1 -1 -j -1 -j -j -j +j The Sequence $Seq^{2}_{left}$, 385(k), to be transmitted from left to right, up to down -j +1 -1 -1 -1 +j -1 -j +j +j +j +1 +j +j -j -j +j +1 +j -1 +1 +1 -1 +j -1 -1 +1 +1 +1 -j +1 +j -j -j -j -1 -j -j +j +j -j -1 -j +1 -
1 -1 +1 -j +1 +1 -1 -1 -1 +j -1 -j +j +j +j +1 +j +j -j -j +j +1 +j -1 +1 +1 -1 +j -1 +1 -1 -1 -1 +j -1 -j +j +j +j +1 +j +j -j -j
+j +1 +j -1 +1 +1 -1 +j -1 +1 -1 -1 -1 +j -1 -j +j +j +j +1 +j +j -j -j +j +1 +j -1 +1 +1 -1 +j -1 +1 -1 -1 -1 +j -1 -j +j +j +j
+1 +j +j -j -j +j +1 +j -1 +1 +1 -1 +j -1 +1 -1 -1 -1 +j -1 -j +j +j +j +1 +j +j -j -j +j +1 +j -1 +1 +1 -1 +j -1 -1 +1 +1 +1 -j
+1 +j -j -j -j -1 -j -j +j +j -j -1 -j +1 -1 -1 +1 -j +1 +j -j -j -j -1 -j -1 +1 +1 +1 -j +1 -1 +1 +1 -1 +j -1 +j -j -j +j +1 +j -j +j
+j +j +1 +j +1 -1 -1 -1 +j -1 +1 -1 -1 +1 -j +1 -j +j +j -j -1 -j +j -j -j -j -1 -j -1 +1 +1 +1 -j +1 -1 +1 +1 -1 +j -1 +j -j -j +j
+1 +j +j -j -j -j -1 -j -1 +1 +1 +1 -j +1 -1 +1 +1 -1 +j -1 +j -j -j +j +1 +j -j +j +j +j +1 +j +1 -1 -1 -1 +j -1 +1 -1 -1 +1 -j
+1 -j +j +j -j -1 -j -j +j +j +j +1 +j +1 -1 -1 -1 +j -1 +1 -1 -1 +1 -j +1 -j +j +j -j -1 -j -j +j +j +j +1 +j +1 -1 -1 -1 +j -1 +1
-1 -1 +1 -j +1 -j +j +j -j -1 -j +j -j -j -j -1 -j -1 +1 +1 +1 -j +1 -1 +1 +1 -1 +j -1 +j -j -j +j +1 +j The Sequence $Seq^{3}_{left}$, 385(k), to be transmitted from left to right, up to down +1 -1 +j -1 +1 -j +1 +j +1 +j -j -1 -j +1 -j +1 -1 +j -1 +j +1 +j -j -1 -j +1 -j +1 -1 +j -1 +j +1 +j -j -1 -j -1 +j -1 +1 -j +1
+j +1 +j -j -1 -j +1 +1 -1 -1 -1 +1 -j -j +j +j +j -j +1 +1 -1 -1 -1 +1 +j +j -j -j -j +j -1 -1 +1 +1 +1 -1 -j -j +j +j +j -j -1 -1
+1 +1 +1 -1 +j +j -j -j -j +j +j +1 +j -j -1 -j +1 -j +1 -1 +j -1 -j -1 -j +j +1 +j +1 -j +1 -1 +j -1 +j +1 +j -j -1 -j -1 +j -1 +1
-j +1 -j -1 -j +j +1 +j -1 +j -1 +1 -j +1 -j -j +j +j +j -j -1 -1 +1 +1 +1 -1 -j -j +j +j +j -j +1 +1 -1 -1 -1 +1 -j -j +j +j +j -j
+1 +1 -1 -1 -1 +1 -j -j +j +j +j -j -1 -1 +1 +1 +1 -1 +j +1 +j +j +1 +j +1 -j +1 +1 -j +1 -j -1 -j -j -1 -j +1 -j +1 +1 -j +1 -j -
1 -j -j -1 -j +1 -j +1 +1 -j +1 +j +1 +j +j +1 +j +1 -j +1 +1 -j +1 -j -j +j -j -j +j -1 -1 +1 -1 -1 +1 -j -j +j -j -j +j +1 +1 -1
+1 +1 -1 +j +j -j +j +j -j -1 -1 +1 -1 -1 +1 +j +j -j +j +j -j +1 +1 -1 +1 +1 -1 -1 +j -1 -1 +j -1 +j +1 +j +j +1 +j +1 -j +1
+1 -j +1 +j +1 +j +j +1 +j -1 +j -1 -1 +j -1 -j -1 -j -j -1 -j +1 -j +1 +1 -j +1 -j -1 -j -j -1 -j +1 +1 -1 +1 +1 -1 -j -j +j -j -j +j
+1 +1 -1 +1 +1 -1 +j +j -j +j +j -j +1 +1 -1 +1 +1 -1 +j +j -j +j +j -j +1 +1 -1 +1 +1 -1 -j -j +j -j -j +j The Sequence $Seq^{4}_{left}$, 385(k), to be transmitted from left to right, up to down -1 -1 +j -1 +j +1 +j +1 +1 -1 -j -j +j -j -1 -j +1 -j +1 +j +j -j -1 -1 +1 +1 -j +1 -j -1 -j -1 -1 +1 +j +j -j +j +1 +j -1 +j -1 -j -
j +j +1 +1 -1 -j -1 -j -1 +j -1 -j -j +j -1 -1 +1 +1 -j +1 +j +1 +j +1 +1 -1 +j +j -j +j +1 +j +1 -j +1 +j +j -j +1 +1 -1 -1 +j
-1 -j -1 -j -1 -1 +1 -j -j +j -1 +j -1 +j +1 +j +1 +1 -1 -j -j +j -j -1 -j +1 -j +1 +j +j -j -1 -1 +1 -1 +j -1 +j +1 +j +1 +1 -1 -j
-j +j -j -1 -j +1 -j +1 +j +j -j -1 -1 +1 +j +1 +j +1 -j +1 +j +j -j +1 +1 -1 -1 +j -1 -j -1 -j -1 -1 +1 -j -j +j +j +1 +j +1 -j +1
+j +j -j +1 +1 -1 -1 +j -1 -j -1 -j -1 -1 +1 -j -j +j +j +1 +j -1 +j -1 -j -j +j +1 +1 -1 -1 +j -1 +j +1 +j +1 +1 -1 -j -j +j +j +1
+j -1 +j -1 -j -j +j +1 +1 -1 -1 +j -1 +j +1 +j +1 +1 -1 -j -j +j -1 +j -1 -j -1 -j -1 -1 +1 -j -j +j -j -1 -j -1 +j -1 -j -j +j -1 -1
+1 -1 +j -1 -j -1 -j -1 -1 +1 -j -j +j -j -1 -j -1 +j -1 -j -j +j -1 -1 +1 +j +1 +j -1 +j -1 -j -j +j +1 +1 -1 -1 +j -1 +j +1 +j +1 +1
-1 -j -j +j -j -1 -j +1 -j +1 +j +j -j -1 -1 +1 +1 -j +1 -j -1 -j -1 -1 +1 +j +j -j +1 -j +1 +j +1 +j +1 +1 -1 +j +j -j +j +1 +j +1
-j +1 +j +j -j +1 +1 -1 -1 +j -1 -j -1 -j -1 -1 +1 -j -j +j -j -1 -j -1 +j -1 -j -j +j -1 -1 +1

FIG. 14

The Sequence $Seq^{5}_{left}$, 385(k), to be transmitted from left to right, up to down -j -1 +1 +1 -1 +1 +1 +j -j -j +j -j -j -j +j +j +j -j -j -1 +1 +1 +1 -1 -1 -1 +1 +1 +1 -1 -1 +j -j -j -j +j +j -j +j +j -j +j +j -1 +1
+1 -1 +1 +1 +1 -1 -1 +1 -1 -1 +j -j -j +j -j -j +j -j -j -j +j +j -1 +1 +1 +1 -1 -1 +1 -1 -1 -1 +1 +1 +j -j -j -j +j +j +j -j -j +j
-j -j -1 +1 +1 -1 +1 +1 -j +j +j -j +j +j +1 -1 -1 +1 -1 -1 +1 -1 -1 -1 +1 +1 +j -j -j -j +j +j +j -j -j -j +j +j -1 +1 +1 +1 -1 -1
-1 +1 +1 -1 +1 +1 -j +j +j -j +j +j +j -j -j +j -j -j +1 -1 -1 +1 -1 -1 -1 +1 +1 +1 -1 -1 +j -j -j -j +j +j -j +j +j +j -j -j -1 +1 +1
+1 -1 -1 +1 -1 -1 +1 -1 -1 -j +j +j -j +j +j +1 -j +1 +1 -j +1 -j -1 -j -j -1 -j +j +1 +j -j -1 -j +1 -j +1 -1 +j -1 +1 -j
+1 -1 +j -1 -j -1 -j +j +1 +j +j +1 +j +j +1 +j +1 -j +1 +1 -j +1 +1 -j +1 +1 -j +1 +j +1 +j +j +1 +j +j +1 +j -j -1 -j -1 +j -1
+1 -j +1 +1 -j +1 -1 +j -1 +j +1 +j -j -1 -j +j +1 +j +j +1 +j -1 +j -1 -1 +j -1 +j +1 +j +j +1 +j -1 +j -1 -1 +j -1 -1 +j -1 +1
-j +1 -j -1 -j +j +1 +j -j -1 -j +j +1 +j +1 -j +1 -1 +j -1 +1 -j +1 +1 -j +1 +j +1 +j +j +1 +j +j +1 +j +j +1 +j +1 -j +1 +1 -j
+1 -1 +j -1 +1 -j +1 +j +1 +j -j -1 -j -j -1 -j +j +1 +j -1 +j -1 +1 -j +1 +1 -j +1 +1 -j +1 -j -1 -j -j -1 -j The Sequence $Seq^{6}_{left}$, 385(k), to be transmitted from left to right, up to down +j -1 +j -1 +j +1 +j -1 +j -1 +j +1 +j -j -1 -j -1 +j -1 -j -1 -j -1 +j -1 -1 +j -1 -j -1 -j -1 +j -1 -j -1 -j +j +1 +j -1 +j -1 +j +1
+j -1 +j -1 -j -1 -j -1 +j -1 +j +1 +j +1 -j +1 +1 -j +1 -j -1 -j -1 +j -1 +j +1 +j -j -1 -j +1 -j +1 +j +1 +j -1 +j -1 -1 +j -1 -j -1
-j +1 -j +1 +j +1 +j -j +j +j -1 +1 +1 -j +j +j -1 +1 +1 +1 -1 -1 -j +j +j +1 -1 -1 -j +j +j -j +j +j +1 -1 -1 -j +j +j +1 -1 -1
-1 +1 +1 -j +j +j -1 +1 +1 -j +j +j -1 +1 +1 +j -j -j +1 -1 -1 -j +j +j -j +j +j -1 +1 +1 +j -j -j +1 -1 -1 -1 +1 +1 -j +j +j +1 -1
-1 +j -j -j +j -j -j -1 +1 +1 -j +j +j +1 -1 -1 +1 -j +1 +j +1 +j -1 +j -1 -j -1 -j +j +1 +j -1 +j -1 -j -1 -j +1 -j +1 +1 -j +1 -j -1
-j -1 +j -1 +j +1 +j -j -1 -j -1 +j -1 +j +1 +j +1 -j +1 +j +1 +j -1 +j -1 +j +1 +j -1 +j -1 -1 +j -1 -j -1 -j -1 +j -1 -j -1 -j +j
+1 +j +1 -j +1 +j +1 +j +1 -j +1 +1 -j +1 -j -1 -j +1 -j +1 -j -1 -j +j -j -j -1 +1 +1 -j +j +j +1 -1 -1 -1 +1 +1 -j +j +j +1 -1
-1 +j -j -j +j -j -j +1 -1 -1 -j +j +j -1 +1 +1 +1 -1 -1 -j +j +j -1 +1 +1 +j -j -j +1 -1 -1 +j -j -j +1 -1 -1 +j -j -j +j -j -j -1 +1
+1 +j -j -j -1 +1 +1 +1 -1 -1 -j +j +j +1 -1 -1 -j +j +j -j +j +j -1 +1 +1 -j +j +j -1 +1 +1

The Sequence $Seq^{7}_{left}$, 385(k), to be transmitted from left to right, up to down -1 +1 -1 -1 +j -j -j +1 -1 -1 +j -j -j +1 -1 -1 -j +j +j +1 -1 -1 -j +j +j +j +1 +j -1 +j -1 +j +1 +j -1 +j -1 +j +1 +j +1 -j +1
+j +1 +j +1 -j +1 +j -j -j -1 +1 +1 -j +j +j +1 -1 -1 +j -j -j +1 -1 -1 -j +j +j -1 +1 +1 +1 -j +1 +j +1 +j -1 +j -1 -j -1 -j +1 -
j +1 -j -1 -j -1 +j -1 +j +1 +j -1 +1 +1 +j -j -j -1 +1 +1 +j -j -j -1 +1 +1 -j +j +j -1 +1 +1 -j +j +j -j -1 -j -1 +j -1 -j -1 -j -1
+j -1 -j -1 -j +1 -j +1 -j -1 -j +1 -j +1 -j +j +j -1 +1 +1 +j -j -j +1 -1 -1 -j +j +j +1 -1 -1 +j -j -j -1 +1 +1 -1 +j -1 +j +1 +j
+1 -j +1 -j -1 -j -1 +j -1 -j -1 -j +1 -j +1 +j +1 +j +j -j -j -1 +1 +1 -j +j +j +1 -1 -1 -j +j +j -1 +1 +1 +j -j -j +1 -1 -1 -1 +j
-1 -j -1 -j +1 -j +1 +j +1 +j +1 -j +1 -j -1 -j -1 +j -1 +j +1 +j -1 +1 +1 -j +j +j -1 +1 +1 -j +j +j +1 -1 -1 -j +j +j +1 -1 -1
-j +j +j +j +1 +j -1 +j -1 +j +1 +j -1 +j -1 -j -1 -j -1 +j -1 -j -1 -j -1 +j -1 -j +j +j -1 +1 +1 +j -j -j +1 -1 -1 +j -j -j -1 +1 +1
-j +j +j +1 -1 -1 +1 -j +1 -j -1 -j -1 +j -1 +j +1 +j -1 +j -1 -j -1 -j +1 -j +1 +j +1 +j +1 -1 -1 -j +j +j +1 -1 -1 -j +j +j -1 +1
+1 -j +j +j -1 +1 +1 -j +j +j -j -1 -j -1 +j -1 -j -1 -j -1 +j -1 +j +1 +j -1 +j -1 +j +1 +j -1 +j -1

The Sequence $Seq^{8}_{left}$, 385(k), to be transmitted from left to right, up to down +1 +1 -j +1 -j -1 -j +1 -j +1 +j +1 +j -1 +1 +1 +j -j -j -1 +1 +1 -j +j +j -1 +j -1 -j -1 -j -1 +j -1 +j +1 +j +1 -1 -1 +j -j -j +1
-1 -1 -j +j +j -1 +j -1 +j +1 +j -1 +j -1 -j -1 -j +1 -1 -1 -j +j +j +1 -1 -1 +j -j -j +1 -j +1 +j +1 +j +1 -j +1 -j -1 -j -1 +1 +1
-j +j +j -1 +1 +1 +j -j -j -1 +j -1 +j +1 +j +1 -j +1 +j +1 +j -1 +1 +1 +j -j -j +1 -1 -1 +j -j -j +1 -j +1 +j +1 +j -1 +j -1 +j +1
+j +1 -1 -1 +j -j -j -1 +1 +1 +j -j -j +1 -j +1 -j -1 -j -1 +j -1 -j -1 -j +1 -1 -1 -j +j +j -1 +1 +1 -j +j +j -1 +j -1 -j -1 -j +1 -j
+1 -j -1 -j -1 +1 +1 -j +j +j +1 -1 -1 -j +j +j -j -1 -j -1 +j -1 -j -1 -j +1 -j +1 +j -j -j +1 -1 -1 +j -j -j -1 +1 +1 -j -1 -j +1 -j
+1 -j -1 -j -1 +j -1 +j -j -j -1 +1 +1 +j -j -j +1 -1 -1 -j -1 -j -1 +j -1 -j -1 -j +1 -j +1 +j -j -j +1 -1 -1 +j -j -j -1 +1 +1 -j -1 -j
+1 -j +1 -j -1 -j -1 +j -1 +j -j -j -1 +1 +1 +j -j -j +1 -1 -1 +j +1 +j +1 -j +1 -j -1 -j +1 -j +1 +j -j -j +1 -1 -1 -j +j +j +1 -1 -1
+j +1 +j -1 +j -1 -j -1 -j -1 +j -1 +j -j -j -1 +1 +1 -j +j +j -1 +1 +1 +j +1 +j +1 -j +1 -j -1 -j +1 -j +1 +j -j -j +1 -1 -1 -j +j
+j +1 -1 -1 +j +1 +j -1 +j -1 -j -1 -j -1 +j -1 +j -j -j -1 +1 +1 -j +j +j -1 +1 +1

FIG. 15

| The Sequence $Seq^{1}_{right}$, 385(k), to be transmitted from left to right, up to down |
| --- |
| +1 -j +1 -1 -1 +1 -j -1 -j -j -j +j +j +1 +j -j -j +j -1 +j -1 -1 -1 +1 +1 -j +1 -1 -1 +1 -j -1 -j -j -j +j -j -1 -j +j +j -j +1 -j +1<br>+1 +1 -1 -1 +j -1 +1 +1 -1 +j +1 +j +j +j -j -j -1 -j +j +j -j +1 -j +1 +1 +1 -1 +1 -j +1 -1 -1 +1 -j -1 -j -j -j +j -j -1 -j +j +j<br>-j +1 -j +1 +1 +1 -1 +1 -j +1 -1 -1 +1 -j -1 -j -j -j +j +j +1 +j -j -j +j -1 +j -1 -1 -1 +1 +1 -j +1 -1 -1 +1 -j -1 -j -j -j +j -j -1<br>-j +j +j -j +1 -j +1 +1 +1 -1 +1 -j +1 -1 -1 +1 -j -1 -j -j -j +j +j +1 +j -j -j +j -1 +j -1 -1 -1 +1 -1 +j -1 +1 +1 -1 +j +1 +j +j<br>+j -j +j +1 +j -j -j +j -1 +j -1 -1 -1 +1 -j -1 -j +j +j -j -1 +j -1 -1 -1 +1 +1 -j +1 -1 -1 +1 +j +1 +j +j +j -j -j -1 -j +j +j -j -1<br>+j -1 -1 -1 +1 -1 +j -1 +1 +1 -1 -j -1 -j -j -j +j +j +1 +j -j -j +j +1 -j +1 +1 +1 -1 -1 +j -1 +1 +1 -1 -j -1 -j -j -j +j -j -1 -j +j<br>+j -j -1 +j -1 -1 -1 +1 -1 +j -1 +1 +1 -1 -j -1 -j -j -j +j +j +1 +j -j -j +j +1 -j +1 +1 +1 -1 -1 +j -1 +1 +1 -1 -j -1 -j -j -j +j<br>+j +1 +j -j -j +j +1 -j +1 +1 +1 -1 +1 -j +1 -1 -1 +1 +j +1 +j +j +j -j +j +1 +j -j -j +j +1 -j +1 +1 +1 -1 -1 +j -1 +1 +1 -1 -j<br>-1 -j -j -j +j -j -1 -j +j +j -j -1 +j -1 -1 -1 +1 -1 +j -1 +1 +1 -1 -j -1 -j -j -j +j +j |
| The Sequence $Seq^{2}_{right}$, 385(k), to be transmitted from left to right, up to down |
| -1 +1 +1 +1 -j +1 +j -j -j -j -1 -j -j +j +j -j -1 -j +1 -1 -1 +1 -j +1 +1 -1 -1 -1 +j -1 -j +j +j +j +1 +j +j -j -j +j +1 +j -1 +1<br>+1 -1 +j -1 +1 -1 -1 -1 +j -1 -j +j +j +j +1 +j +j -j -j +j +1 +j -1 +1 +1 -1 +j -1 +1 -1 -1 -1 +j -1 -j +j +j +j +1 +j +j -j -j +j<br>+1 +j -1 +1 +1 -1 +j -1 -1 +1 +1 +1 -j +1 +j -j -j -j -1 -j -j +j +j -j -1 -j +1 -1 -1 +1 -j +1 -1 +1 +1 +1 -j +1 +j -j -j -j -1 -j<br>-j +j +j -j -1 -j +1 -1 -1 +1 -j +1 +1 -1 -1 -1 +j -1 -j +j +j +j +1 +j +j -j -j +j +1 +j -1 +1 +1 -1 +j -1 -1 +1 +1 +1 -j +1 +j -j<br>-j -j -1 -j -j +j +j -j -1 -j +1 -1 -1 +1 -j +1 -j +j +j +j +1 +j +1 -1 -1 -1 +j -1 +1 -1 -1 +1 -j +1 -j +j +j -j -1 -j +j -j -j -j -1 -j<br>-1 +1 +1 +1 -j +1 -1 +1 +1 -1 +j -1 +j -j -j +j +1 +j +j -j -j -j -1 -j -1 +1 +1 +1 -j +1 -1 +1 +1 -1 +j -1 +j -j -j +j +1 +j +j<br>-j -j -j -1 -j -1 +1 +1 +1 -j +1 -1 +1 +1 -1 +j -1 +j -j -j +j +1 +j +j -j -j -j -1 -j -1 +1 +1 +1 -j +1 -1 +1 +1 -1 +j -1 +j -j -j<br>+j +1 +j +j -j -j -j -1 -j -1 +1 +1 +1 -j +1 -1 +1 +1 -1 +j -1 +j -j -j +j +1 +j -j +j +j +j +1 +j +1 -1 -1 -1 +j -1 +1 -1 -1 +1 -j<br>+1 -j +j +j -j -1 -j +j -j -j -j -1 -j -1 +1 +1 +1 -j +1 -1 +1 +1 -1 +j -1 +j -j -j +j +1 +j -j |
| The Sequence $Seq^{3}_{right}$, 385(k), to be transmitted from left to right, up to down |
| +1 -j +1 +1 -j +1 -j -1 -j -j -1 -j -1 +j -1 -1 +j -1 -j -1 -j -j -1 -j -1 +j -1 -1 +j -1 -j -1 -j -j -1 -j +1 -j +1 +1 -j +1 -j -1 -j -j -1<br>-j -1 -1 +1 -1 -1 +1 +j +j -j +j +j -j -1 -1 +1 -1 -1 +1 -j -j +j -j -j +j +1 +1 -1 +1 +1 -1 +j +j -j +j +j -j +1 +1 -1 +1 +1 -1<br>-j -j +j -j -j +j -j -1 -j -j -1 -j -1 +j -1 -1 +j -1 +j +1 +j +j +1 +j -1 +j -1 -1 +j -1 -j -1 -j -j -1 -j +1 -j +1 +1 -j +1 +j +1 +j +j<br>+1 +j +1 -j +1 +1 -j +1 +j +j -j +j +j -j +1 +1 -1 +1 +1 -1 +j +j -j +j +j -j -1 -1 +1 -1 -1 +1 +j +j -j +j +j -j -1 -1 +1 -1 -1<br>+1 +j +j -j +j +j -j +1 +1 -1 +1 +1 -1 -j -1 -j +j +1 +j -1 +j -1 +1 -j +1 +j +1 +j -j -1 -j -1 +j -1 +1 -j +1 +j +1 +j -j -1 -j -1<br>+j -1 +1 -j +1 -j -1 -j +j +1 +j -1 +j -1 +1 -j +1 +j +j -j -j -j +j +1 +1 -1 -1 -1 +1 +j +j -j -j -j +j -1 -1 +1 +1 +1 -1 -j -j +j<br>+j +j -j +1 +1 -1 -1 -1 +1 -j -j +j +j +j -j -1 -1 +1 +1 +1 -1 +1 -j +1 -1 +j -1 -j -1 -j +j +1 +j -1 +j -1 +1 -j +1 -j -1 -j +j +1<br>+j +1 -j +1 -1 +j -1 +j +1 +j -j -1 -j -1 +j -1 +1 -j +1 +j +1 +j -j -1 -j -1 -1 +1 +1 +1 -1 +j +j -j -j -j +j -1 -1 +1 +1 +1 -1 -j<br>-j +j +j +j -j -1 -1 +1 +1 +1 -1 -j -j +j +j +j -j -1 -1 +1 +1 +1 -1 +j +j -j -j -j +j +j |
| The Sequence $Seq^{4}_{right}$, 385(k), to be transmitted from left to right, up to down |
| +1 -j +1 -j -1 -j -1 -1 +1 +j +j -j -j -1 -j +1 -j +1 +j +j -j -1 -1 +1 -1 +j -1 +j +1 +j +1 +1 -1 -j -j +j +j +1 +j -1 +j -1 -j -j +j<br>+1 +1 -1 +j +1 +j +1 -j +1 +j +j -j +1 +1 -1 +1 -j +1 +j +1 +j +1 +1 -1 +j +j -j -j -1 -j -1 +j -1 -j -j +j -1 -1 +1 -1 +j -1 -j<br>-1 -j -1 -1 +1 -j -j +j +1 -j +1 -j -1 -j -1 -1 +1 +j +j -j -j -1 -j +1 -j +1 +j +j -j -1 -1 +1 +1 -j +1 -j -1 -j -1 -1 +1 +j +j -j -j<br>-1 -j +1 -j +1 +j +j -j -1 -1 +1 -j -1 -j -1 +j -1 -j -j +j -1 -1 +1 -1 +j -1 -j -1 -j -1 -1 +1 -j -j +j -j -1 -j -1 +j -1 -j -j +j -1 -1<br>+1 -1 +j -1 -j -1 -j -1 -1 +1 -j -j +j -j -1 -j +1 -j +1 +j +j -j -1 -1 +1 -1 +j -1 +j +1 +j +1 +1 -1 -j -j +j -j -1 -j +1 -j +1 +j +j<br>-j -1 -1 +1 -1 +j -1 +j +1 +j +1 +1 -1 -j -j +j +1 -j +1 +j +1 +j +1 +1 -1 +j +j -j -j -1 -j -1 +j -1 -j -j +j -1 -1 +1 +1 -j +1 +j<br>+1 +j +1 +1 -1 +j +j -j -j -1 -j -1 +j -1 -j -j +j -1 -1 +1 -j -1 -j +1 -j +1 +j +j -j -1 -1 +1 -1 +j -1 +j +1 +j +1 +1 -1 -j -j +j<br>+j +1 +j -1 +j -1 -j -j +j +1 +1 -1 +1 -j +1 -j -1 -j -1 -1 +1 +j +j -j -1 +j -1 -j -1 -j -1 -1 +1 -j -j +j +j +1 +j +1 -j +1 +j +j -j<br>+1 +1 -1 +1 -j +1 +j +1 +j +1 +1 -1 +j +j -j -j -1 -j -1 +j -1 -j -j +j -1 -1 +1 -j |

FIG. 16

The Sequence $Seq^{5}_{right}$, 385(k), to be transmitted from left to right, up to down

+1 -1 -1 +1 -1 -1 -j +j +j -j +j +j -j +j +j +j -j -j -1 +1 +1 +1 -1 -1 +1 -1 -1 -1 +1 +1 -j +j +j +j -j -j -j +j +j -j +j +j -1 +1
+1 -1 +1 +1 -1 +1 +1 -1 +1 +1 -j +j +j -j +j +j +j -j -j -j +j +j -1 +1 +1 +1 -1 -1 -1 +1 +1 +1 -1 -1 -j +j +j +j -j -j +j -j -j +j
-j -j -1 +1 +1 -1 +1 +1 +j -j -j +j -j -j -1 +1 +1 -1 +1 +1 +1 -1 -1 -1 +1 +1 +j -j -j -j +j +j -j +j +j +j -j -j +1 -1 -1 -1 +1 +1
-1 +1 +1 -1 +1 +1 -j +j +j -j +j +j -j +j +j -j +j +j -1 +1 +1 -1 +1 +1 -1 +1 +1 +1 -1 -1 +j -j -j -j +j +j +j -j -j -j +j +j
+1 -1 -1 -1 +1 +1 +1 -1 -1 +1 -1 -1 -j +j +j -j +j +j -1 +j -1 -1 +j -1 +j +1 +j +j +1 +j +j +1 +j -j -1 -j +1 -j +1 -1 +j -1 -1
+j -1 +1 -j +1 +j +1 +j -j -1 -j +j +1 +j +j +1 +j +1 -j +1 +1 -j +1 -1 +j -1 -1 +j -1 -j -1 -j -j -1 -j +j +1 +j -j -1 -j -1 +j -1
+1 -j +1 -1 +j -1 +1 -j +1 -j -1 -j +j +1 +j +j +1 +j +j +1 +j -1 +j -1 -1 +j -1 -j -1 -j -j -1 -j +1 -j +1 +1 -j +1 -1 +j -1 +1 -j
+1 -j -1 -j +j +1 +j +j +1 +j -j -1 -j -1 +j -1 +1 -j +1 +1 -j +1 +1 -j +1 +j +1 +j +j +1 +j -j -1 -j -j -1 -j -1 +j -1 -1 +j -1 -1
+j -1 +1 -j +1 +j +1 +j -j -1 -j +j +1 +j -j -1 -j +1 -j +1 -1 +j -1 +1 -j +1 +1 -j +1 -j -1 -j -j -1 -j -j

The Sequence $Seq^{6}_{right}$, 385(k), to be transmitted from left to right, up to down

+1 -j +1 -j -1 -j +1 -j +1 -j -1 -j -j -1 -j -1 +j -1 -j -1 -j -1 +j -1 +1 -j +1 +j +1 +j +1 -j +1 +j +1 +j +j +1 +j -1 +j -1 +j +1
+j -1 +j -1 +j +1 +j +1 -j +1 -j -1 -j -1 +j -1 +1 -j +1 -j -1 -j -1 +j -1 +j +1 +j +j +1 +j -1 +j -1 -j -1 -j +1 -j +1 -1 +j -1 -j
-1 -j +1 -j +1 +j +1 +j +j -j -j +1 -1 -1 +j -j -j +1 -1 -1 +1 -1 -1 -j +j +j +1 -1 -1 -j +j +j +j -j -j -1 +1 +1 +j -j -j -1 +1 +1
-1 +1 +1 -j +j +j -1 +1 +1 -j +j +j +1 -1 -1 -j +j +j -1 +1 +1 +j -j -j -j +j +j -1 +1 +1 +j -j -j +1 -1 -1 +1 -1 -1 +j -j -j -1 +1
+1 -j +j +j +j -j -j -1 +1 +1 -j +j +j +1 -1 -1 -1 +j -1 -j -1 -j +1 -j +1 +j +1 +j +j +1 +j -1 +j -1 -j -1 -j +1 -j +1 -1 +j -1 +j
+1 +j +1 -j +1 -j -1 -j -j -1 -j -1 +j -1 +j +1 +j +1 -j +1 -j -1 -j +1 -j +1 -j -1 -j +1 -j +1 -1 +j -1 -j -1 -j -1 +j -1 -j -1 -j -j
-1 -j -1 +j -1 -j -1 -j -1 +j -1 +1 -j +1 -j -1 -j +1 -j +1 -j -1 -j -j +j +j +1 -1 -1 +j -j -j -1 +1 +1 -1 +1 +1 -j +j +j +1 -1 -1 +j
-j -j -j +j +j -1 +1 +1 +j -j -j +1 -1 -1 +1 -1 -1 -j +j +j -1 +1 +1 +j -j -j -1 +1 +1 -j +j +j -1 +1 +1 -j +j +j +j -j -j -1 +1 +1
+j -j -j -1 +1 +1 -1 +1 +1 +j -j -j -1 +1 +1 +j -j -j -j +j +j -1 +1 +1 -j +j +j -1 +1 +1 -j

The Sequence $Seq^{7}_{right}$, 385(k), to be transmitted from left to right, up to down

-1 +1 +1 -j +j +j -1 +1 +1 -j +j +j -1 +1 +1 +j -j -j -1 +1 +1 +j -j -j -j -1 -j +1 -j +1 -j -1 -j +1 -j +1 -j -1 -j -1 +j -1 -j -1 -j
-1 +j -1 -j +j +j +1 -1 -1 +j -j -j -1 +1 +1 -j +j +j -1 +1 +1 +j -j -j +1 -1 -1 -1 +j -1 -j -1 -j +1 -j +1 +j +1 +j -1 +j -1 +j +1
+j +1 -j +1 -j -1 -j -1 +1 +1 +j -j -j -1 +1 +1 +j -j -j -1 +1 +1 -j +j +j -1 +1 +1 -j +j +j -j -1 -j -1 +j -1 -j -1 -j -1 +j -1 -j -1
-j +1 -j +1 -j -1 -j +1 -j +1 -j +j +j -1 +1 +1 +j -j -j +1 -1 -1 -j +j +j +1 -1 -1 +j -j -j -1 +1 +1 -1 +j -1 +j +1 +j +1 -j +1 -j
-1 -j -1 +j -1 -j -1 -j +1 -j +1 +j +1 +j -j +j +j +1 -1 -1 +j -j -j -1 +1 +1 +j -j -j +1 -1 -1 -j +j +j -1 +1 +1 +1 -j +1 +j +1 +j
-1 +j -1 -j -1 -j -1 +j -1 +j +1 +j +1 -j +1 -j -1 -j +1 -1 -1 +j -j -j +1 -1 -1 +j -j -j -1 +1 +1 +j -j -j -1 +1 +1 +j -j -j -j -1 -j
+1 -j +1 -j -1 -j +1 -j +1 +j +1 +j +1 -j +1 +j +1 +j +1 -j +1 -j +j +j -1 +1 +1 +j -j -j +1 -1 -1 +j -j -j -1 +1 +1 -j +j +j +1
-1 -1 +1 -j +1 -j -1 -j -1 +j -1 +j +1 +j -1 +j -1 -j -1 -j +1 -j +1 +j +1 +j +1 -1 -1 -j +j +j +1 -1 -1 -j +j +j -1 +1 +1 -j +j +j
-1 +1 +1 -j +j +j -j -1 -j -1 +j -1 -j -1 -j -1 +j -1 +j +1 +j -1 +j -1 +j +1 +j -1 +j -1 +1

The Sequence $Seq^{8}_{right}$, 385(k), to be transmitted from left to right, up to down

| The Sequence $Seq^{1}_{left}$, 595(k), to be transmitted from left to right, up to down |
| --- |
| +j +1 -1 +j +1 +j -j -1 -1 +j +j -1 -1 +1 +1 +1 -j -j -1 +1 -j +1 -1 -1 +1 -j -1 -j -j -j +j +j +1 +j -j -j +j -1 +j -1 -1 -1 +1 +1<br>-j +1 -1 -1 +1 -j -1 -j -j -j +j -j -1 -j +j +j -j +1 -j +1 +1 +1 -1 -1 +j -1 +1 +1 -1 +j +1 +j +j +j -j -j -1 -j +j +j -j +1 -j +1 +1<br>+1 -1 +1 -j +1 -1 -1 +1 -j -1 -j -j -j +j -j -1 -j +j +j -j +1 -j +1 +1 +1 -1 -j -1 -j +j +j -j -1 +j -1 -1 -1 +1 +1 -j +1 -1 -1 +1<br>+j +1 +j +j +j -j -j -1 -j +j +j -j -1 +j -1 -1 -1 +1 -1 +j -1 +1 +1 -1 -j -1 -j -j -j +j -j -1 -j +j +j -j -1 +j -1 -1 -1 +1 +1 -j +1<br>-1 -1 +1 +j +1 +j +j +j -j +j +1 +j -j -j +j +1 -j +1 +1 +1 -1 +1 -j +1 -1 -1 +1 +j +1 +j +j +j -j +1 -j +1 -1 -1 +1 -j -1 -j -j<br>-j +j +j +1 +j -j -j +j -1 +j -1 -1 -1 +1 +1 -j +1 -1 -1 +1 -j -1 -j -j -j +j -j -1 -j +j +j -j +1 -j +1 +1 +1 -1 -1 +j -1 +1 +1 -1<br>+j +1 +j +j +j -j -j -1 -j +j +j -j +1 -j +1 +1 +1 -1 +1 -j +1 -1 -1 +1 -j -1 -j -j -j +j -j -1 -j +j +j -j +1 -j +1 +1 +1 -1 -j -1 -j<br>+j +j -j -1 +j -1 -1 -1 +1 +1 -j +1 -1 -1 +1 +j +1 +j +j +j -j -j -1 -j +j +j -j -1 +j -1 -1 -1 +1 -1 +j -1 +1 +1 -1 -j -1 -j -j -j +j<br>-j -1 -j +j +j -j -1 +j -1 -1 -1 +1 +1 -j +1 -1 -1 +1 +j +1 +j +j +j -j +j +1 +j -j -j +j +1 -j +1 +1 +1 -1 +1 -j +1 -1 -1 +1 +j<br>+1 +j +j +j -j -1 +j -1 +1 +1 -1 +j +1 +j +j +j -j -j -1 -j +j +j -j +1 -j +1 +1 +1 -1 -1 +j -1 +1 +1 -1 +j +1 +j +j +j -j +j +1<br>+j -j -j +j -1 +j -1 -1 -1 +1 +1 -j +1 -1 -1 +1 -j -1 -j -j -j +j +j +1 +j -j -j +j -1 +j -1 -1 -1 +1 -1 +j -1 +1 +1 -1 +j +1 +j +j<br>+j -j +j +1 +j -j -j +j -1 +j -1 -1 -1 +1 +j +1 +j -j -j +j +1 -j +1 +1 +1 -1 -1 +j -1 +1 +1 -1 -j -1 -j -j -j +j +j +1 +j -j -j +j<br>+1 -j +1 +1 +1 -1 +1 -j +1 -1 -1 +1 +j +1 +j +j +j -j +j +1 +j -j -j +j +1 -j +1 +1 +1 -1 -1 +j -1 +1 +1 -1 -j -1 -j -j -j +j -j<br>-1 -j +j +j -j -1 +j -1 -1 -1 +1 -1 +j -1 +1 +1 -1 -j -1 -j -j -j +j |

| The Sequence $Seq^{2}_{left}$, 595(k), to be transmitted from left to right, up to down |
| --- |
| -1 +1 -j +1 -j -1 +j +j +j -1 -1 +1 -1 -1 +j +1 +j -j -1 +1 -j +1 -1 +j -1 +1 -j +1 +1 -j +1 +1 -j +1 -1 +j -1 -1 +j -1 -1 +j<br>-1 -j -1 -j +j +1 +j -j -1 -j -j -1 -j +j +1 +j -j -1 -j -j -1 -j -j -1 -j -1 +j -1 +1 -j +1 -1 +j -1 -1 +j -1 -1 +j -1 +1 -j +1 +1 -j<br>+1 +1 -j +1 -j -1 -j +j +1 +j -j -1 -j -j -1 -j +j +1 +j -j -1 -j -j -1 -j -j -1 -j +j +j -j -j -j +j +j +j -j +j +j -j +j +j -j -j -j +j -j -j<br>+j -j -j +j +1 +1 -1 -1 -1 +1 +1 +1 -1 +1 +1 -1 -1 -1 +1 +1 +1 -1 +1 +1 -1 +1 +1 -1 +j +j -j -j -j +j +j +j -j +j +j -j +j +j -j<br>-j -j +j -j -j +j -j -j +j -1 -1 +1 +1 +1 -1 -1 -1 +1 -1 -1 +1 +1 +1 -1 -1 -1 +1 -1 -1 +1 -1 -1 +1 +1 -j +1 -1 +j -1 +1 -j +1 +1<br>-j +1 +1 -j +1 -1 +j -1 -1 +j -1 -1 +j -1 -j -1 -j +j +1 +j -j -1 -j -j -1 -j +j +1 +j -j -1 -j -j -1 -j -j -1 -j -1 +j -1 +1 -j +1 -1 +j<br>-1 -1 +j -1 -1 +j -1 +1 -j +1 +1 -j +1 +1 -j +1 -j -1 -j +j +1 +j -j -1 -j -j -1 -j +j +1 +j -j -1 -j -j -1 -j -j -1 -j +j +j -j -j -j +j<br>+j +j -j +j +j -j +j +j -j -j -j +j -j -j +j -j -j +j +1 +1 -1 -1 -1 +1 +1 +1 -1 +1 +1 -1 -1 -1 +1 +1 +1 -1 +1 +1 -1 +1 +1 -1 +j<br>+j -j -j -j +j +j +j -j +j +j -j +j +j -j -j -j +j -j -j +j -j -j +j -1 -1 +1 +1 +1 -1 -1 -1 +1 -1 -1 +1 +1 +1 -1 -1 -1 +1 -1 -1 +1 -1<br>-1 +1 -1 +j -1 +1 -j +1 -1 +j -1 -1 +j -1 -1 +j -1 +1 -j +1 +1 -j +1 +1 -j +1 +j +1 +j -j -1 -j +j +1 +j +j +1 +j -j -1 -j +j +1<br>+j +j +1 +j +j +1 +j +1 -j +1 -1 +j -1 +1 -j +1 +1 -j +1 +1 -j +1 -1 +j -1 -1 +j -1 -1 +j -1 +j +1 +j -j -1 -j +j +1 +j +j +1 +j<br>-j -1 -j +j +1 +j +j +1 +j +j +1 +j -j -j +j +j +j -j -j -j +j -j -j +j -j -j +j +j +j -j +j +j -j +j +j -j -1 -1 +1 +1 +1 -1 -1 -1 +1 -1<br>-1 +1 +1 +1 -1 -1 -1 +1 -1 -1 +1 -1 -1 +1 -j -j +j +j +j -j -j -j +j -j -j +j -j -j +j +j +j -j +j +j -j +j +j -j +1 +1 -1 -1 -1 +1 +1<br>+1 -1 +1 +1 -1 -1 -1 +1 +1 +1 -1 +1 +1 -1 +1 +1 -1 |

| The Sequence $Seq^{3}_{left}$, 595(k), to be transmitted from left to right, up to down |
| --- |
| -j -j -j -j -j +j -j +1 -j -j -j +j +j +j +1 -1 +j -1 +1 +1 -j +1 +j +1 +j +1 -j +1 -j -1 -j -j -1 -j -1 +j -1 -j -1 -j +1 -j +1 -1 +j -1<br>-j -1 -j -1 +j -1 +j +1 +j -j -1 -j -1 +j -1 -j -1 -j +1 -j +1 -1 -1 +1 -j -j +j -1 -1 +1 +j +j -j +j +j -j +1 +1 -1 +j +j -j -1 -1 +1<br>-1 -1 +1 -j -j +j -1 -1 +1 +j +j -j -j -j +j -1 -1 +1 -j -j +j +1 +1 -1 +j +1 +j -1 +j -1 -j -1 -j -1 +j -1 +1 -j +1 -j -1 -j -1 +j -1<br>-j -1 -j -j -1 -j +1 -j +1 +j +1 +j +1 -j +1 +1 -j +1 -j -1 -j -1 +j -1 -j -1 -j -j +j +1 +1 -1 +j +j -j +1 +1 -1 -1 -1 +1 +j +j -j<br>+1 +1 -1 +j +j -j -j -j +j +1 +1 -1 +j +j -j +1 +1 -1 +1 +1 -1 -j -j +j -1 -1 +1 -j -j +j +j +1 +j -1 +j -1 +j +1 +j +1 -j +1 +1<br>-j +1 -j -1 -j +1 -j +1 +j +1 +j -j -1 -j +1 -j +1 -j -1 -j -1 +j -1 +1 -j +1 -j -1 -j +1 -j +1 +j +1 +j -j -j +j +1 +1 -1 -j -j +j -1<br>-1 +1 -1 -1 +1 +j +j -j -1 -1 +1 -j -j +j -j -j +j +1 +1 -1 -j -j +j -1 -1 +1 +1 +1 -1 -j -j +j +1 +1 -1 +j +j -j -1 +j -1 -j -1 -j +1<br>-j +1 -j -1 -j +j +1 +j +1 -j +1 -j -1 -j +1 -j +1 +1 -j +1 +j +1 +j -1 +j -1 +j +1 +j +j +1 +j +1 -j +1 -j -1 -j +1 -j +1 +1 +1<br>-1 +j +j -j -1 -1 +1 +j +j -j -j -j +j -1 -1 +1 +j +j -j -1 -1 +1 +1 +1 -1 +j +j -j -1 -1 +1 +j +j -j +j +j -j +1 +1 -1 -j -j +j +1<br>+1 -1 +1 -j +1 +j +1 +j +1 -j +1 -j -1 -j -j -1 -j -1 +j -1 -j -1 -j +1 -j +1 -1 +j -1 -j -1 -j -1 +j -1 +j +1 +j -j -1 -j -1 +j -1 -j<br>-1 -j +1 -j +1 -1 -1 +1 -j -j +j -1 -1 +1 +j +j -j +j +j -j +1 +1 -1 +j +j -j -1 -1 +1 -1 -1 +1 -j -j +j -1 -1 +1 +j +j -j -j -j +j -1<br>-1 +1 -j -j +j +1 +1 -1 +j +1 +j -1 +j -1 -j -1 -j -1 +j -1 +1 -j +1 -j -1 -j -1 +j -1 -j -1 -j -j -1 -j +1 -j +1 +j +1 +j +1 -j +1 +1<br>-j +1 -j -1 -j -1 +j -1 -j -1 -j -j -j +j +1 +1 -1 +j +j -j +1 +1 -1 -1 -1 +1 +j +j -j +1 +1 -1 +j +j -j -j -j +j +1 +1 -1 +j +j -j<br>+1 +1 -1 +1 +1 -1 -j -j +j -1 -1 +1 -j -j +j |

FIG. 18

| The Sequence $Seq^{4}_{left}$, 595(k), to be transmitted from left to right, up to down |
| --- |
| +1 +1 +1 -1 -j -1 +1 -1 -j -1 -j -j -1 -j +j +1 +j -1 +1 +1 -j +1 +j +1 +j +j +1 +j +1 -j +1 +1 +1 -1 +j +j -j +j +j -j +1 +1 -1<br>+j +1 +j +1 -j +1 -1 +j -1 -j -1 -j -j -j +j -1 -1 +1 +1 +1 -1 +j +j -j -1 +j -1 -j -1 -j -j -1 -j -1 +j -1 -1 -1 +1 -j -j +j -j -j +j -1<br>-1 +1 -j -1 -j -1 +j -1 +1 -j +1 +j +1 +j +j +j -j +1 +1 -1 -1 -1 +1 -j -j +j +1 -j +1 +j +1 +j -j -1 -j -1 +j -1 +1 +1 -1 +j<br>+j -j -j -j +j -1 -1 +1 +j +1 +j +1 -j +1 +1 -j +1 +j +1 +j -j -j +j -1 -1 +1 -1 -1 +1 -j -j +j +1 -j +1 +j +1 +j -j -1 -j -1 +j -1<br>+1 +1 -1 +j +j -j -j -j +j -1 -1 +1 +j +1 +j +1 -j +1 +1 -j +1 +j +1 +j -j -j +j -1 -1 +1 -1 -1 +1 -j -j +j +j +1 +j -1 +j -1 -1<br>+j -1 +j +1 +j +j +j -j -1 -1 +1 -1 -1 +1 +j +j -j -1 +j -1 +j +1 +j -j -1 -j +1 -j +1 +1 +1 -1 -j -j +j +j +j -j -1 -1 +1 -j -1 -j<br>+1 -j +1 +1 -j +1 -j -1 -j -j -j +j +1 +1 -1 +1 +1 -1 -j -j +j +1 -j +1 -j -1 -j +j +1 +j -1 +j -1 -1 -1 +1 +j +j -j -j -j +j +1 +1<br>-1 +j +1 +j -1 +j -1 +1 -j +1 -j -1 -j +j +j -j -1 -1 +1 +1 +1 -1 -j -j +j -1 +j -1 +j +1 +j +j +1 +j -1 +j -1 +1 +1 -1 -j -j +j -j<br>-j +j +1 +1 -1 +j +1 +j -1 +j -1 +1 -j +1 -j -1 -j +j +j -j -1 -1 +1 +1 +1 -1 -j -j +j -1 +j -1 +j +1 +j +j +1 +j -1 +j -1 +1 +1<br>-1 -j -j +j -j -j +j +1 +1 -1 +1 -j +1 +j +1 +j +j +1 +j +1 -j +1 +1 +1 -1 +j +j -j +j +j -j +1 +1 -1 +j +1 +j +1 -j +1 -1 +j -1<br>-j -1 -j -j -j +j -1 -1 +1 +1 +1 -1 +j +j -j -1 +j -1 -j -1 -j -j -1 -j -1 +j -1 -1 -1 +1 -j -j +j -j -j +j -1 -1 +1 -j -1 -j -1 +j -1 +1<br>-j +1 +j +1 +j +j +j -j +1 +1 -1 -1 -1 +1 -j -j +j +1 -j +1 +j +1 +j -j -1 -j -1 +j -1 +1 +1 -1 +j +j -j -j -j +j -1 -1 +1 +j +1<br>+j +1 -j +1 +1 -j +1 +j +1 +j -j -j +j -1 -1 +1 -1 -1 +1 -j -j +j +1 -j +1 +j +1 +j -j -1 -j -1 +j -1 +1 +1 -1 +j +j -j -j -j +j -1<br>-1 +1 +j +1 +j +1 -j +1 +1 -j +1 +j +1 +j -j -j +j -1 -1 +1 -1 -1 +1 -j -j +j |

| The Sequence $Seq^{5}_{left}$, 595(k), to be transmitted from left to right, up to down |
| --- |
| +1 -j +1 -1 +1 -j -j -1 -j +j -1 +j +1 +1 +j +1 -j +1 +1 +1 -1 -1 +1 -1 -1 +1 -1 -1 -1 +1 +1 +j -j -j +j -j -j +j -j -j -j +j +j -j<br>-1 -j -j -1 -j +j +1 +j -j -1 -j +1 -j +1 +1 -j +1 -1 +j -1 +1 -j +1 -j +j +j -j +j +j -j +j +j +j -j -j -1 +1 +1 -1 +1 +1 -1 +1 +1<br>+1 -1 -1 -1 +j -1 -1 +j -1 +1 -j +1 -1 +j -1 +j +1 +j +j +1 +j -j -1 -j +j +1 +j -1 +1 +1 +1 -1 -1 -1 +1 +1 -1 +1 +1 -j +j +j<br>+j -j -j -j +j +j -j +j +j +j +1 +j -j -1 -j -j -1 -j -j -1 -j -1 +j -1 +1 -j +1 +1 -j +1 +1 -j +1 -j +j +j +j -j -j -j +j +j -j +j +j -1<br>+1 +1 +1 -1 -1 -1 +1 +1 -1 +1 +1 -1 +j -1 +1 -j +1 +1 -j +1 +1 -j +1 +j +1 +j -j -1 -j -j -1 -j -j -1 -j +j -j -j +j -j -j +j -j -j<br>-j +j +j -1 +1 +1 -1 +1 +1 -1 +1 +1 +1 -1 -1 +1 -j +1 +1 -j +1 -1 +j -1 +1 -j +1 +j +1 +j +j +1 +j -j -1 -j +j +1 +j +1 -1 -1<br>+1 -1 -1 +1 -1 -1 -1 +1 +1 -j +j +j -j +j +j -j +j +j +j -j -j -j -1 -j -j -1 -j +j +1 +j -j -1 -j -1 +j -1 -1 +j -1 +1 -j +1 -1 +j -1<br>-j +j +j +j -j -j -j +j +j -j +j +j +1 -1 -1 -1 +1 +1 +1 -1 -1 +1 -1 -1 -1 +j -1 +1 -j +1 +1 -j +1 +1 -j +1 -j -1 -j +j +1 +j +j<br>+1 +j +j +1 +j +1 -1 -1 -1 +1 +1 +1 -1 -1 +1 -1 -1 -j +j +j +j -j -j -j +j +j -j +j +j -j -1 -j +j +1 +j +j +1 +j +j +1 +j -1 +j -<br>1 +1 -j +1 +1 -j +1 +1 -j +1 +1 -1 -1 +1 -1 -1 +1 -1 -1 -1 +1 +1 +j -j -j +j -j -j +j -j -j -j +j +j -j -1 -j -j -1 -j +j +1 +j -j -1<br>-j +1 -j +1 +1 -j +1 -1 +j -1 +1 -j +1 -j +j +j -j +j +j -j +j +j +j -j -j -1 +1 +1 -1 +1 +1 -1 +1 +1 +1 -1 -1 -1 +j -1 -1 +j -1<br>+1 -j +1 -1 +j -1 +j +1 +j +j +1 +j -j -1 -j +j +1 +j -1 +1 +1 +1 -1 -1 -1 +1 +1 -1 +1 +1 -j +j +j +j -j -j -j +j +j -j +j +j +j<br>+1 +j -j -1 -j -j -1 -j -j -1 -j -1 +j -1 +1 -j +1 +1 -j +1 +1 -j +1 -j +j +j +j -j -j -j +j +j -j +j +j -1 +1 +1 +1 -1 -1 -1 +1 +1 -<br>1 +1 +1 -1 +j -1 +1 -j +1 +1 -j +1 +1 -j +1 +j +1 +j -j -1 -j -j -1 -j -j -1 -j |

| The Sequence $Seq^{6}_{left}$, 595(k), to be transmitted from left to right, up to down |
| --- |
| +1 -j +1 +1 -j +j +1 -1 -j +j -j -1 +j +j +1 -1 +1 +1 -1 +1 -1 -1 -j +j +j -1 +j -1 +j +1 +j -j +j +j -1 +1 +1 +j +1 +j +1 -j<br>+1 +1 -1 -1 -j +j +j -1 +j -1 +j +1 +j +j -j -j +1 -1 -1 -j -1 -j -1 +j -1 +j -j -j -1 +1 +1 -j -1 -j +1 -j +1 -1 +1 +1 -j +j +j +1<br>-j +1 +j +1 +j +j -j -j -1 +1 +1 -j -1 -j +1 -j +1 +1 -1 -1 +j -j -j -1 +j -1 -j -1 -j -1 +1 +1 -j +j +j -1 +j -1 -j -1 -j +j -j -j -1<br>+1 +1 +j +1 +j -1 +j -1 -1 +1 +1 -j +j +j -1 +j -1 -j -1 -j -j +j +j +1 -1 -1 -j -1 -j +1 -j +1 -j +j +j -1 +1 +1 -j -1 -j -1 +j -1<br>+1 -1 -1 -j +j +j +1 -j +1 -j -1 -j -j +j +j -1 +1 +1 -j -1 -j -1 +j -1 -1 +1 +1 +j -j -j -1 +j -1 +j +1 +j +j -j -j +1 -1 -1 -j -1 -j<br>-1 +j -1 +1 -1 -1 -j +j +j -1 +j -1 +j +1 +j +j -j -j +1 -1 -1 -j -1 -j -1 +j -1 -1 +1 +1 +j -j -j +1 -j +1 -j -1 -j -1 +1 +1 -j +j<br>+j +1 -j +1 +j +1 +j -j +j +j +1 -1 -1 +j +1 +j -1 +j -1 -1 +1 +1 -j +j +j +1 -j +1 +j +1 +j +j -j -j -1 +1 +1 -j -1 -j +1 -j +1<br>-j +j +j +1 -1 -1 -j -1 -j +1 -j +1 -1 +1 +1 -j +j +j -1 +j -1 -j -1 -j -j +j +j +1 -1 -1 -j -1 -j +1 -j +1 +1 -1 -1 +j -j -j +1 -j +1<br>+j +1 +j +1 -1 -1 -j +j +j +1 -j +1 -j -1 -j +j -j -j +1 -1 -1 +j +1 +j +1 -j +1 +1 -1 -1 -j +j +j +1 -j +1 -j -1 -j -j +j +j -1 +1<br>+1 -j -1 -j -1 +j -1 +1 -1 -1 -j +j +j -1 +j -1 +j +1 +j -j +j +j -1 +1 +1 +j +1 +j +1 -j +1 +1 -1 -1 -j +j +j -1 +j -1 +j +1 +j<br>+j -j -j +1 -1 -1 -j -1 -j -1 +j -1 +j -j -j -1 +1 +1 -j -1 -j +1 -j +1 -1 +1 +1 -j +j +j +1 -j +1 +j +1 +j +j -j -j -1 +1 +1 -j -1 -j<br>+1 -j +1 +1 -1 -1 +j -j -j -1 +j -1 -j -1 -j -1 +1 +1 -j +j +j -1 +j -1 -j -1 -j +j -j -j -1 +1 +1 +j +1 +j -1 +j -1 -1 +1 +1 -j +j<br>+j -1 +j -1 -j -1 -j -j +j +j +1 -1 -1 -j -1 -j +1 -j +1 -j +j +j -1 +1 +1 -j -1 -j -1 +j -1 +1 -1 -1 -j +j +j +1 -j +1 -j -1 -j -j +j<br>+j -1 +1 +1 -j -1 -j -1 +j -1 -1 +1 +1 +j -j -j -1 +j -1 +j +1 +j |

FIG. 19

| The Sequence $Seq^{7}_{left}$, 595(k), to be transmitted from left to right, up to down |
|---|
| +j -j +j -1 -1 +1 +j +1 -1 -j +j -j -j -j -j -1 +1 +1 +1 +1 -1 -1 -1 +1 +1 -j +j +j +j -j -j +j -j -j +j -j -j +1 -1 -1 +1 -1 -1 -j +j +j +j -j -j +1 -1 -1 -1 +1 +1 +1 -1 -1 +1 -1 -1 +j -j -j +j -j -j +j -j -j -j +j +j -1 +1 +1 +1 -1 -1 +1 -1 -1 +1 -1 -1 +j -j -j +j - j -j +1 -1 -1 -1 +1 +1 -j +j +j +j -j -j -j +j +j -j +j +j -1 +1 +1 -1 +1 +1 +1 -j +1 +1 -j +1 -j -1 -j -j -1 -j +j +1 +j -j -1 -j +1 -j +1 -1 +j -1 -j -1 -j -j -1 -j +1 -j +1 +1 -j +1 +1 -j +1 -1 +j -1 +j +1 +j -j -1 -j +j +1 +j +j +1 +j -1 +j -1 -1 +j -1 +1 -j +1 -1 +j -1 +j +1 +j -j -1 -j +1 -j +1 +1 -j +1 -j -1 -j -j -1 -j -j -1 -j +j +1 +j -1 +j -1 +1 -j +1 +1 -1 -1 -1 +1 +1 -j +j +j +j -j -j +j -j -j +j -j -j +1 -1 -1 +1 -1 -1 -j +j +j +j -j -j +1 -1 -1 -1 +1 +1 +1 -1 -1 +1 -1 -1 +j -j -j +j -j -j +j -j -j -j +j +j -1 +1 +1 +1 -1 -1 +1 -1 -1 +1 -1 -1 +j -j -j +j -j -j +1 -1 -1 -1 +1 +1 -j +j +j +j -j -j -j +j +j -j +j +j -1 +1 +1 -1 +1 +1 +1 -j +1 +1 -j +1 -j -1 -j -j -1 -j +j +1 +j -j -1 -j +1 -j +1 -1 +j -1 -j -1 -j -j -1 -j +1 -j +1 +1 -j +1 +1 -j +1 -1 +j -1 +j +1 +j -j -1 -j +j +1 +j +j +1 +j -1 +j -1 -1 +j -1 +1 -j +1 -1 +j -1 +j +1 +j -j -1 -j +1 -j +1 +1 -j +1 -j -1 -j -j -1 -j -j -1 -j +j +1 +j -1 +j -1 +1 -j +1 -1 +1 +1 +1 -1 -1 +j -j -j -j +j +j -j +j +j -j +j +j -1 +1 +1 -1 +1 +1 +j -j -j -j +j +j -1 +1 +1 +1 -1 -1 -1 +1 +1 -1 +1 +1 -j +j +j -j +j +j -j +j +j +j -j -j +1 -1 -1 -1 +1 +1 -1 +1 +1 -1 +1 +1 -j +j +j -j +j +j -1 +1 +1 +1 -1 -1 +j -j -j -j +j +j +j -j -j +j -j -j +1 -1 -1 +1 -1 -1 -1 +j -1 -1 +j -1 +j +1 +j +j +1 +j -j -1 -j +j +1 +j -1 +j -1 +1 -j +1 +j +1 +j +j +1 +j -1 +j -1 -1 +j -1 -1 +j -1 +1 -j +1 -j -1 -j +j +1 +j -j -1 -j -j -1 -j +1 -j +1 +1 -j +1 -1 +j -1 +1 -j +1 -j -1 -j +j +1 +j -1 +j -1 -1 +j -1 +j +1 +j +j +1 +j -j -1 -j +1 -j +1 -1 +j -1 |

| The Sequence $Seq^{8}_{left}$, 595(k), to be transmitted from left to right, up to down |
|---|
| -1 +j +j +1 +1 -1 -j +j -j -1 -j +j -1 +j -j +j -1 +j +1 +1 -1 -1 -1 +1 +1 +j -j -j -j +j +j -1 +j -1 -1 +j -1 -j -1 -j -j -1 -j -j +j +j +j -j -j -1 +1 +1 +1 -1 -1 +j +1 +j +j +1 +j +1 -j +1 +1 -j +1 -j +j +j -j +j +j -1 +1 +1 -1 +1 +1 +j +1 +j -j -1 -j +1 -j +1 -1 +j -1 -1 +1 +1 -1 +1 +1 -j +j +j -j +j +j +1 -j +1 -1 +j -1 +j +1 +j -j -1 -j +1 -1 -1 -1 +1 +1 +j -j -j -j +j +j -1 +j -1 - 1 +j -1 -j -1 -j -j -1 -j +j -j -j -j +j +j +1 -1 -1 -1 +1 +1 -j -1 -j -j -1 -j -1 +j -1 -1 +j -1 -j +j +j -j +j +j -1 +1 +1 -1 +1 +1 +j +1 +j -j -1 -j +1 -j +1 -1 +j -1 +1 -1 -1 +1 -1 -1 +j -j -j +j -j -j -1 +j -1 +1 -j +1 -j -1 -j +j +1 +j +1 -1 -1 -1 +1 +1 +j -j -j -j +j +j -1 +j -1 -1 +j -1 -j -1 -j -j -1 -j -j +j +j +j -j -j -1 +1 +1 +1 -1 -1 +j +1 +j +j +1 +j +1 -j +1 +1 -j +1 -j +j +j -j +j +j -1 +1 +1 -1 +1 +1 +j +1 +j -j -1 -j +1 -j +1 -1 +j -1 -1 +1 +1 -1 +1 +1 -j +j +j -j +j +j +1 -j +1 -1 +j -1 +j +1 +j -j -1 -j +1 -1 -1 -1 +1 +1 +j -j -j -j +j +j -1 +j -1 -1 +j -1 -j -1 -j -j -1 -j +j -j -j -j +j +j +1 -1 -1 -1 +1 +1 -j -1 -j -j -1 -j -1 +j -1 -1 +j -1 -j +j +j -j +j +j -1 +1 +1 -1 +1 +1 +j +1 +j -j -1 -j +1 -j +1 -1 +j -1 +1 -1 -1 +1 -1 -1 +j -j -j +j -j -j -1 +j -1 +1 -j +1 -j -1 -j +j +1 +j -1 +1 +1 +1 -1 -1 -j +j +j +j -j -j +1 -j +1 +1 -j +1 +j +1 +j +j +1 +j +j -j -j -j +j +j +1 -1 -1 -1 +1 +1 -j - 1 -j -j -1 -j -1 +j -1 -1 +j -1 +j -j -j +j -j -j +1 -1 -1 +1 -1 -1 -j -1 -j +j +1 +j -1 +j -1 +1 -j +1 +1 -1 -1 +1 -1 -1 +j -j -j +j - j -j -1 +j -1 +1 -j +1 -j -1 -j +j +1 +j -1 +1 +1 +1 -1 -1 -j +j +j +j -j -j +1 -j +1 +1 -j +1 +j +1 +j +j +1 +j -j +j +j +j -j -j - 1 +1 +1 +1 -1 -1 +j +1 +j +j +1 +j +1 -j +1 +1 -j +1 +j -j -j +j -j -j +1 -1 -1 +1 -1 -1 -j -1 -j +j +1 +j -1 +j -1 +1 -j +1 -1 +1 +1 -1 +1 +1 -j +j +j -j +j +j +1 -j +1 -1 +j -1 +j +1 +j -j -1 -j |

FIG. 20

The Sequence $Seq^{1}_{right}$, 595(k), to be transmitted from left to right, up to down -j -1 -j +j +j -j -1 +j -1 -1 -1 +1 +1 -j +1 -1 -1 +1 +j +1 +j +j +j -j -j -1 -j +j +j -j -1 +j -1 -1 -1 +1 -1 +j -1 +1 +1 -1 -j -1 -j
-j -j +j +j +1 +j -j -j +j +1 -j +1 +1 +1 -1 -1 +j -1 +1 +1 -1 -j -1 -j -j -j +j -j -1 -j +j +j -j -1 +j -1 -1 -1 +1 -1 +j -1 +1 +1 -1
-j -1 -j -j -j +j +1 -j +1 -1 -1 +1 -j -1 -j -j -j +j +j +1 +j -j -j +j -1 +j -1 -1 -1 +1 +1 -j +1 -1 -1 +1 -j -1 -j -j -j +j -j -1 -j +j
+j -j +1 -j +1 +1 +1 -1 +1 -j +1 -1 -1 +1 -j -1 -j -j -j +j +j +1 +j -j -j +j -1 +j -1 -1 -1 +1 -1 +j -1 +1 +1 -1 +j +1 +j +j +j -j
+j +1 +j -j -j +j -1 +j -1 -1 -1 +1 +1 -j +1 -1 -1 +1 -j -1 -j -j -j +j +j +1 +j -j -j +j -1 +j -1 -1 -1 +1 +1 -j +1 -1 -1 +1 -j -1 -j
-j -j +j -j -1 -j +j +j -j +1 -j +1 +1 +1 -1 -1 +j -1 +1 +1 -1 +j +1 +j +j +j -j -j -1 -j +j +j -j +1 -j +1 +1 +1 -1 +1 -j +1 -1 -1
+1 -j -1 -j -j -j +j -j -1 -j +j +j -j +1 -j +1 +1 +1 -1 +j +1 +j -j -j +j +1 -j +1 +1 +1 -1 -1 +j -1 +1 +1 -1 -j -1 -j -j -j +j +j +1
+j -j -j +j +1 -j +1 +1 +1 -1 +1 -j +1 -1 -1 +1 +j +1 +j +j +j -j +j +1 +j -j -j +j +1 -j +1 +1 +1 -1 -1 +j -1 +1 +1 -1 -j -1 -j
-j -j +j -j -1 -j +j +j -j -1 +j -1 -1 -1 +1 -1 +j -1 +1 +1 -1 -j -1 -j -j -j +j -j -1 -j +j +j -j -1 +j -1 -1 -1 +1 +1 -j +1 -1 -1 +1
+j +1 +j +j +j -j -j -1 -j +j +j -j -1 +j -1 -1 -1 +1 -1 +j -1 +1 +1 -1 -j -1 -j -j -j +j +j +1 +j -j -j +j +1 -j +1 +1 +1 -1 -1 +j -1
+1 +1 -1 -j -1 -j -j -j +j -j -1 -j +j +j -j -1 +j -1 -1 -1 +1 -1 +j -1 +1 +1 -1 -j -1 -j -j -j +j +1 -j +1 -1 -1 +1 -j -1 -j -j -j +j +j
+1 +j -j -j +j -1 +j -1 -1 -1 +1 +1 -j +1 -1 -1 +1 -j -1 -j -j -j +j -j -1 -j +j +j -j +1 -j +1 +1 +1 -1 +1 -j +1 -1 -1 +1 -j -1 -j -j
-j +j +j +1 +j -j -j +j -1 +j -1 -1 -1 +1 -1 +j -1 +1 +1 -1 +j +1 +j +j +j -j +j +1 +j -j -j +j -1 +j -1 -1 -1 +1 -1 +1 +j +j -1
+1 +1 +j -j +j -1 +j +1 +1 +j +1 +j -1 -j The Sequence $Seq^{2}_{right}$, 595(k), to be transmitted from left to right, up to down -j -1 -j -j -1 -j -j -1 -j +j +1 +j -j -1 -j -j -1 -j +j +1 +j -j -1 -j -1 +j -1 -1 +j -1 -1 +j -1 +1 -j +1 +1 -j +1 +1 -j +1 -1 +j -1
+1 -j +1 +j +1 +j +j +1 +j +j +1 +j -j -1 -j +j +1 +j +j +1 +j -j -1 -j +j +1 +j -1 +j -1 -1 +j -1 -1 +j -1 +1 -j +1 +1 -j +1 +1
-j +1 -1 +j -1 +1 -j +1 +1 +1 -1 +1 +1 -1 +1 +1 -1 -1 -1 +1 +1 +1 -1 +1 +1 -1 -1 -1 +1 +1 +1 -1 -j -j +j -j -j +j -j -j +j +j
+j -j +j +j -j +j +j -j -j -j +j +j +j -j +1 +1 -1 +1 +1 -1 +1 +1 -1 -1 -1 +1 +1 +1 -1 +1 +1 -1 -1 -1 +1 +1 +1 -1 +j +j -j +j +j
-j +j +j -j -j -j +j -j -j +j -j -j +j +j +j -j -j -j +j +1 -j +1 +1 -j +1 +1 -j +1 -1 +j -1 +1 -j +1 +1 -j +1 -1 +j -1 +1 -j +1 -j -1
-j -j -1 -j -j -1 -j +j +1 +j +j +1 +j +j +1 +j -j -1 -j +j +1 +j -1 +j -1 -1 +j -1 -1 +j -1 +1 -j +1 -1 +j -1 -1 +j -1 +1 -j +1 -1
+j -1 -j -1 -j -j -1 -j -j -1 -j +j +1 +j +j +1 +j +j +1 +j -j -1 -j +j +1 +j +j +j -j +j +j -j +j +j -j -j -j +j +j +j -j +j +j -j -j -j +j
+j +j -j +1 +1 -1 +1 +1 -1 +1 +1 -1 -1 -1 +1 -1 -1 +1 -1 -1 +1 +1 +1 -1 -1 -1 +1 +j +j -j +j +j -j +j +j -j -j -j +j +j +j -j +j
+j -j -j -j +j +j +j -j -1 -1 +1 -1 -1 +1 -1 -1 +1 +1 +1 -1 +1 +1 -1 +1 +1 -1 -1 -1 +1 +1 +1 -1 -j -1 -j -j -1 -j -j -1 -j +j +1
+j -j -1 -j -j -1 -j +j +1 +j -j -1 -j -1 +j -1 -1 +j -1 -1 +j -1 +1 -j +1 +1 -j +1 +1 -j +1 -1 +j -1 +1 -j +1 +j +1 +j +j +1 +j +j
+1 +j -j -1 -j +j +1 +j +j +1 +j -j -1 -j +j +1 +j -1 +j -1 -1 +j -1 -1 +j -1 +1 -j +1 +1 -j +1 +1 -j +1 -1 +j -1 +1 -j +1 +1 +1
-1 +1 +1 -1 +1 +1 -1 -1 -1 +1 +1 +1 -1 +1 +1 -1 -1 -1 +1 +1 +1 -1 -j -j +j -j -j +j -j -j +j +j +j -j +j +j -j +j +j -j -j -j +j +j
+j -j +1 +1 -1 +1 +1 -1 +1 +1 -1 -1 -1 +1 +1 +1 -1 +1 +1 -1 -1 -1 +1 +1 +1 -1 +j +j -j +j +j -j +j +j -j -j -j +j -j -j +j -j -j
+j +j +j -j -j -j +j -1 -j +j -1 +1 -1 -1 +j -1 +j -j -1 +1 +1 -1 +1 -j -j +1

The Sequence $Seq^{3}_{right}$, 595(k), to be transmitted from left to right, up to down +1 -j +1 +j +1 +j +1 -j +1 -j -1 -j -j -1 -j -1 +j -1 -j -1 -j +1 -j +1 -1 +j -1 -j -1 -j -1 +j -1 +j +1 +j -j -1 -j -1 +j -1 -j -1 -j
+1 -j +1 -1 -1 +1 -j -j +j -1 -1 +1 +j +j -j +j +j -j +1 +1 -1 +j +j -j -1 -1 +1 -1 -1 +1 -j -j +j -1 -1 +1 +j +j -j -j -j +j -1 -1
+1 -j -j +j +1 +1 -1 -j -1 -j +1 -j +1 +j +1 +j +1 -j +1 -1 +j -1 +j +1 +j +1 -j +1 +j +1 +j +j +1 +j -1 +j -1 -j -1 -j -1 +j -1
-1 +j -1 +j +1 +j +1 -j +1 +j +1 +j +j +j -j -1 -1 +1 -j -j +j -1 -1 +1 +1 +1 -1 -j -j +j -1 -1 +1 -j -j +j +j +j -j -1 -1 +1 -j -j
+j -1 -1 +1 -1 -1 +1 +j +j -j +1 +1 -1 +j +j -j -1 +j -1 -j -1 -j -1 +j -1 +j +1 +j +j +1 +j +1 -j +1 +j +1 +j -1 +j -1 +1 -j +1
+j +1 +j +1 -j +1 -j -1 -j +j +1 +j +1 -j +1 +j +1 +j -1 +j -1 +1 +1 -1 +j +j -j +1 +1 -1 -j -j +j -j -j +j -1 -1 +1 -j -j +j +1 +1
-1 +1 +1 -1 +j +j -j +1 +1 -1 -j -j +j +j +j -j +1 +1 -1 +j +j -j -1 -1 +1 +j +1 +j -1 +j -1 -j -1 -j -1 +j -1 +1 -j +1 -j -1 -j -1
+j -1 -j -1 -j -j -1 -j +1 -j +1 +j +1 +j +1 -j +1 +1 -j +1 -j -1 -j -1 +j -1 -j -1 -j -j -j +j +1 +1 -1 +j +j -j +1 +1 -1 -1 -1 +1 +j
+j -j +1 +1 -1 +j +j -j -j -j +j +1 +1 -1 +j +j -j +1 +1 -1 +1 +1 -1 -j -j +j -1 -1 +1 -j -j +j -1 +j -1 -j -1 -j -1 +j -1 +j +1 +j
+j +1 +j +1 -j +1 +j +1 +j -1 +j -1 +1 -j +1 +j +1 +j +1 -j +1 -j -1 -j +j +1 +j +1 -j +1 +j +1 +j -1 +j -1 +1 +1 -1 +j +j -j
+1 +1 -1 -j -j +j -j -j +j -1 -1 +1 -j -j +j +1 +1 -1 +1 +1 -1 +j +j -j +1 +1 -1 -j -j +j +j +j -j +1 +1 -1 +j +j -j -1 -1 +1 +j +1
+j -1 +j -1 -j -1 -j -1 +j -1 +1 -j +1 -j -1 -j -1 +j -1 -j -1 -j -j -1 -j +1 -j +1 +j +1 +j +1 -j +1 +1 -j +1 -j -1 -j -1 +j -1 -j -1
-j -j -j +j +1 +1 -1 +j +j -j +1 +1 -1 -1 -1 +1 +j +j -j +1 +1 -1 +j +j -j -j -j +j +1 +1 -1 +j +j -j +1 +1 -1 +1 +1 -1 -j -j +j -1
-1 +1 -j -j +j -j -j +j +1 -1 -1 -j +j -j +j -1 +j +1 +1 +1 -1 +1 -1 -j

FIG. 21

The Sequence $Seq^{4}_{right}$, 595(k), to be transmitted from left to right, up to down +1 -j +1 +j +1 +j +j +1 +j +1 -j +1 +1 +1 -1 +j +j -j +j +j -j +1 +1 -1 +j +1 +j +1 -j +1 -1 +j -1 -j -1 -j -j -j +j -1 -1 +1 +1
+1 -1 +j +j -j +1 -j +1 +j +1 +j +j +1 +j +1 -j +1 +1 +1 -1 +j +j -j +j +j -j +1 +1 -1 +j +1 +j +1 -j +1 -1 +j -1 -j -1 -j -j -j
+j -1 -1 +1 +1 +1 -1 +j +j -j +1 -j +1 +j +1 +j -j -1 -j -1 +j -1 +1 +1 -1 +j +j -j -j -j +j -1 -1 +1 +j +1 +j +1 -j +1 +1 -j +1
+j +1 +j -j -j +j -1 -1 +1 -1 -1 +1 -j -j +j -1 +j -1 -j -1 -j +j +1 +j +1 -j +1 -1 -1 +1 -j -j +j +j +j -j +1 +1 -1 -j -1 -j -1 +j -1
-1 +j -1 -j -1 -j +j +j -j +1 +1 -1 +1 +1 -1 +j +j -j -1 +j -1 -j -1 -j -j -1 -j -1 +j -1 -1 -1 +1 -j -j +j -j -j +j -1 -1 +1 -j -1 -j -1
+j -1 +1 -j +1 +j +1 +j +j +j -j +1 +1 -1 -1 -1 +1 -j -j +j -1 +j -1 -j -1 -j -j -1 -j -1 +j -1 -1 -1 +1 -j -j +j -j -j +j -1 -1 +1 -j
-1 -j -1 +j -1 +1 -j +1 +j +1 +j +j +j -j +1 +1 -1 -1 -1 +1 -j -j +j -1 +j -1 -j -1 -j +j +1 +j +1 -j +1 -1 -1 +1 -j -j +j +j +j -j
+1 +1 -1 -j -1 -j -1 +j -1 -1 +j -1 -j -1 -j +j +j -j +1 +1 -1 +1 +1 -1 +j +j -j +1 -j +1 +j +1 +j -j -1 -j -1 +j -1 +1 +1 -1 +j +j
-j -j -j +j -1 -1 +1 +j +1 +j +1 -j +1 +1 -j +1 +j +1 +j -j -j +j -1 -1 +1 -1 -1 +1 -j -j +j -1 +j -1 -j -1 -j -j -1 -j -1 +j -1 -1 -1
+1 -j -j +j -j -j +j -1 -1 +1 -j -1 -j -1 +j -1 +1 -j +1 +j +1 +j +j +j -j +1 +1 -1 -1 -1 +1 -j -j +j -1 +j -1 -j -1 -j -j -1 -j -1 +j -1
-1 -1 +1 -j -j +j -j -j +j -1 -1 +1 -j -1 -j -1 +j -1 +1 -j +1 +j +1 +j +j +j -j +1 +1 -1 -1 -1 +1 -j -j +j -1 +j -1 -j -1 -j +j +1 +j
+1 -j +1 -1 -1 +1 -j -j +j +j +j -j +1 +1 -1 -j -1 -j -1 +j -1 -1 +j -1 -j -1 -j +j +j -j +1 +1 -1 +1 +1 -1 +j +j -j +1 -j +1 +j +1
+j -j -1 -j -1 +j -1 +1 +1 -1 +j +j -j -j -j +j -1 -1 +1 +j +1 +j +1 -j +1 +1 -j +1 +j +1 +j -j -j +j -1 -1 +1 -1 -1 +1 -j -j +j -j -
1 +j +1 +j -1 +1 +1 +j +1 -j -j +1 +1 +1 +j +1 -1 -1

The Sequence $Seq^{5}_{right}$, 595(k), to be transmitted from left to right, up to down +1 -1 -1 +1 -1 -1 +1 -1 -1 -1 +1 +1 -j +j +j -j +j +j -j +j +j +j -j -j -j -1 -j -j -1 -j +j +1 +j -j -1 -j -1 +j -1 -1 +j -1 +1 -j +1
-1 +j -1 -j +j +j -j +j +j -j +j +j +j -j -j +1 -1 -1 +1 -1 -1 +1 -1 -1 -1 +1 +1 -1 +j -1 -1 +j -1 +1 -j +1 -1 +j -1 -j -1 -j -j -1 -j
+j +1 +j -j -1 -j -1 +1 +1 +1 -1 -1 -1 +1 +1 -1 +1 +1 +j -j -j -j +j +j +j -j -j +j -j -j +j +1 +j -j -1 -j -j -1 -j -j -1 -j +1 -j +1
-1 +j -1 -1 +j -1 -1 +j -1 -j +j +j +j -j -j -j +j +j -j +j +j +1 -1 -1 -1 +1 +1 +1 -1 -1 +1 -1 -1 -1 +j -1 +1 -j +1 +1 -j +1 +1 -j
+1 -j -1 -j +j +1 +j +j +1 +j +j +1 +j -1 +1 +1 -1 +1 +1 -1 +1 +1 +1 -1 -1 +j -j -j +j -j -j +j -j -j -j +j +j +j +1 +j +j +1 +j
-j -1 -j +j +1 +j +1 -j +1 +1 -j +1 -1 +j -1 +1 -j +1 +j -j -j +j -j -j +j -j -j -j +j +j -1 +1 +1 -1 +1 +1 -1 +1 +1 +1 -1 -1 +1 -j
+1 +1 -j +1 -1 +j -1 +1 -j +1 +j +1 +j +j +1 +j -j -1 -j +j +1 +j +1 -1 -1 -1 +1 +1 +1 -1 -1 +1 -1 -1 -j +j +j +j -j -j -j +j +j
-j +j +j -j -1 -j +j +1 +j +j +1 +j +j +1 +j -1 +j -1 +1 -j +1 +1 -j +1 +1 -j +1 +j -j -j -j +j +j +j -j -j +j -j -j -1 +1 +1 +1 -1
-1 -1 +1 +1 -1 +1 +1 +1 -j +1 -1 +j -1 -1 +j -1 -1 +j -1 +j +1 +j -j -1 -j -j -1 -j -j -1 -j -1 +1 +1 -1 +1 +1 -1 +1 +1 +1 -1 -1
+j -j -j +j -j -j +j -j -j -j +j +j +j +1 +j +j +1 +j -j -1 -j +j +1 +j +1 -j +1 +1 -j +1 -1 +j -1 +1 -j +1 +j -j -j +j -j -j +j -j -j
+j +j -1 +1 +1 -1 +1 +1 -1 +1 +1 +1 -1 -1 +1 -j +1 +1 -j +1 -1 +j -1 +1 -j +1 +j +1 +j +j +1 +j -j -1 -j +j +1 +j +1 -1 -1 -1
+1 +1 +1 -1 -1 +1 -1 -1 -j +j +j +j -j -j -j +j +j -j +j +j -j -1 -j +j +1 +j +j +1 +j +j +1 +j -1 +j -1 +1 -j +1 +1 -j +1 +1 -j
+1 +j -j -j -j +j +j +j -j -j +j -j -j -1 +1 +1 +1 -1 -1 -1 +1 +1 -1 +1 +1 +1 -j +1 -1 +j -1 -1 +j -1 -1 +j -1 +j +1 +j -j -1 -j -j
-1 -j -j -1 -j -1 -j +1 -j -1 +1 +j -j +1 +j -1 -j +1 +1 +1 -j +j +j +j The Sequence $Seq^{6}_{right}$, 595(k), to be transmitted from left to right, up to down +1 -1 -1 -j +j +j -1 +j -1 +j +1 +j -j +j +j -1 +1 +1 +j +1 +j +1 -j +1 -1 +1 +1 +j -j -j +1 -j +1 -j -1 -j -j +j +j -1 +1 +1 +j
+1 +j +1 -j +1 +j -j -j -1 +1 +1 -j -1 -j +1 -j +1 -1 +1 +1 -j +j +j +1 -j +1 +j +1 +j -j +j +j +1 -1 -1 +j +1 +j -1 +j -1 -1 +1
+1 -j +j +j +1 -j +1 +j +1 +j -1 +1 +1 -j +j +j -1 +j -1 -j -1 -j +j -j -j -1 +1 +1 +j +1 +j -1 +j -1 +1 -1 -1 +j -j -j +1 -j +1 +j
+1 +j +j -j -j -1 +1 +1 +j +1 +j -1 +j -1 -j +j +j -1 +1 +1 -j -1 -j -1 +j -1 +1 -1 -1 -j +j +j +1 -j +1 -j -1 -j +j -j -j +1 -1 -1
+j +1 +j +1 -j +1 +1 -1 -1 -j +j +j +1 -j +1 -j -1 -j -1 +1 +1 +j -j -j +1 -j +1 -j -1 -j +j -j -j +1 -1 -1 -j -1 -j -1 +j -1 +1 -1 -1
-j +j +j -1 +j -1 +j +1 +j +j -j -j +1 -1 -1 -j -1 -j -1 +j -1 -j +j +j +1 -1 -1 +j +1 +j -1 +j -1 +1 -1 -1 +j -j -j -1 +j -1 -j -1 -j
+j -j -j -1 +1 +1 -j -1 -j +1 -j +1 +1 -1 -1 +j -j -j -1 +j -1 -j -1 -j +1 -1 -1 +j -j -j +1 -j +1 +j +1 +j -j +j +j +1 -1 -1 -j -1 -j
+1 -j +1 -1 +1 +1 -j +j +j -1 +j -1 -j -1 -j -j +j +j +1 -1 -1 -j -1 -j +1 -j +1 +j -j -j +1 -1 -1 +j +1 +j +1 -j +1 -1 +1 +1 +j -j
-j -1 +j -1 +j +1 +j -j +j +j -1 +1 +1 -j -1 -j -1 +j -1 -1 +1 +1 +j -j -j -1 +j -1 +j +1 +j -1 +1 +1 +j -j -j +1 -j +1 -j -1 -j +j -j
-j +1 -1 -1 -j -1 -j -1 +j -1 +1 -1 -1 -j +j +j -1 +j -1 +j +1 +j +j -j -j +1 -1 -1 -j -1 -j -1 +j -1 -j +j +j +1 -1 -1 +j +1 +j -1 +j
-1 +1 -1 -1 +j -j -j -1 +j -1 -j -1 -j +j -j -j -1 +1 +1 -j -1 -j +1 -j +1 +1 -1 -1 +j -j -j -1 +j -1 -j -1 -j +1 -1 -1 +j -j -j +1 -j +1
+j +1 +j -j +j +j +1 -1 -1 -j -1 -j +1 -j +1 -1 +1 +1 -j +j +j -1 +j -1 -j -1 -j -j +j +j +1 -1 -1 -j -1 -j +1 -j +1 +j -j -j +1 -1 -1
+j +1 +j +1 -j +1 -1 +1 +1 +j -j -j -1 +j -1 +j +1 +j -j +j +j -1 +1 +1 -j -1 -j -1 +j -1 -1 +1 +1 +j -j -j -1 +j -1 +j +1 +j +1
+1 +1 +j +j -1 +j +1 -j +1 +j -1 +1 +1 +1 +j -j +j +j

FIG. 22

| The Sequence $Seq^{7}_{right}$, 595(k), to be transmitted from left to right, up to down |
|---|
| -j +j +j +j -j -j -1 +1 +1 +1 -1 -1 +1 -1 -1 +1 -1 -1 -j +j +j -j +j +j +1 -1 -1 -1 +1 +1 +j -j -j -j +j +j +j -j -j +j -j -j -1 +1 +1<br>-1 +1 +1 +1 -1 -1 -1 +1 +1 +j -j -j -j +j +j -j +j +j -j +j +j +1 -1 -1 +1 -1 -1 +j -j -j -j +j +j +1 -1 -1 -1 +1 +1 +1 -1 -1 +1<br>-1 -1 -j +j +j -j +j +j -j -1 -j -j -1 -j -1 +j -1 -1 +j -1 +1 -j +1 -1 +j -1 -j -1 -j +j +1 +j +1 -j +1 +1 -j +1 +j +1 +j +j +1 +j +j<br>+1 +j -j -1 -j -1 +j -1 +1 -j +1 +1 -j +1 +1 -j +1 +j +1 +j +j +1 +j -j -1 -j +j +1 +j +1 -j +1 -1 +j -1 +j +1 +j +j +1 +j +1 -j<br>+1 +1 -j +1 +1 -j +1 -1 +j -1 -j -1 -j +j +1 +j +1 -1 -1 -1 +1 +1 -j +j +j +j -j -j +j -j -j +j -j -j +1 -1 -1 +1 -1 -1 +j -j -j -j +j<br>+j -1 +1 +1 +1 -1 -1 -1 +1 +1 -1 +1 +1 -j +j +j -j +j +j +j -j -j -j +j +j -1 +1 +1 +1 -1 -1 +1 -1 -1 +1 -1 -1 +j -j -j +j -j -j<br>-1 +1 +1 +1 -1 -1 +j -j -j -j +j +j +j -j -j +j -j -j +1 -1 -1 +1 -1 -1 +1 -j +1 +1 -j +1 -j -1 -j -j -1 -j +j +1 +j -j -1 -j +1 -j +1<br>-1 +j -1 +j +1 +j +j +1 +j -1 +j -1 -1 +j -1 -1 +j -1 +1 -j +1 -j -1 -j +j +1 +j +j +1 +j +j +1 +j -1 +j -1 -1 +j -1 +1 -j +1 -1<br>+j -1 +j +1 +j -j -1 -j -1 +j -1 -1 +j -1 +j +1 +j +j +1 +j +j +1 +j -j -1 -j +1 -j +1 -1 +j -1 -j +j +j +j -j -j -1 +1 +1 +1 -1 -1<br>+1 -1 -1 +1 -1 -1 -j +j +j -j +j +j +1 -1 -1 -1 +1 +1 +j -j -j -j +j +j +j -j -j +j -j -j -1 +1 +1 -1 +1 +1 +1 -1 -1 -1 +1 +1 +j<br>-j -j -j +j +j -j +j +j -j +j +j +1 -1 -1 +1 -1 -1 +j -j -j -j +j +j +1 -1 -1 -1 +1 +1 +1 -1 -1 +1 -1 -1 -j +j +j -j +j +j -j -1 -j -j<br>-1 -j -1 +j -1 -1 +j -1 +1 -j +1 -1 +j -1 -j -1 -j +j +1 +j +1 -j +1 +1 -j +1 +j +1 +j +j +1 +j +j +1 +j -j -1 -j -1 +j -1 +1 -j +1<br>+1 -j +1 +1 -j +1 +j +1 +j +j +1 +j -j -1 -j +j +1 +j +1 -j +1 -1 +j -1 +j +1 +j +j +1 +j +1 -j +1 +1 -j +1 +1 -j +1 -1 +j -1<br>-j -1 -j +j +1 +j -1 +1 -1 +1 +j +j -1 -1 -j +1 -1 +j +1 +1 -1 -j +j +j +1 |

| The Sequence $Seq^{8}_{right}$, 595(k), to be transmitted from left to right, up to down |
|---|
| -j +j +j +j -j -j +1 -1 -1 -1 +1 +1 +j +1 +j +j +1 +j -1 +j -1 -1 +j -1 -1 +1 +1 +1 -1 -1 +j -j -j -j +j +j +1 -j +1 +1 -j +1 -j<br>-1 -j -j -1 -j -1 +1 +1 -1 +1 +1 +j -j -j +j -j -j +1 -j +1 -1 +j -1 -j -1 -j +j +1 +j +j -j -j +j -j -j -1 +1 +1 -1 +1 +1 -j -1 -j +j<br>+1 +j +1 -j +1 -1 +j -1 +j -j -j -j +j +j -1 +1 +1 +1 -1 -1 -j -1 -j -j -1 -j +1 -j +1 +1 -j +1 -1 +1 +1 +1 -1 -1 +j -j -j -j +j +j<br>+1 -j +1 +1 -j +1 -j -1 -j -j -1 -j +1 -1 -1 +1 -1 -1 -j +j +j -j +j +j -1 +j -1 +1 -j +1 +j +1 +j -j -1 -j +j -j -j +j -j -j -1 +1 +1<br>-1 +1 +1 -j -1 -j +j +1 +j +1 -j +1 -1 +j -1 +1 -1 -1 -1 +1 +1 +j -j -j -j +j +j -1 +j -1 -1 +j -1 -j -1 -j -j -1 -j -j +j +j +j -j -j<br>-1 +1 +1 +1 -1 -1 +j +1 +j +j +1 +j +1 -j +1 +1 -j +1 -j +j +j -j +j +j -1 +1 +1 -1 +1 +1 +j +1 +j -j -1 -j +1 -j +1 -1 +j -1<br>-1 +1 +1 -1 +1 +1 -j +j +j -j +j +j +1 -j +1 -1 +j -1 +j +1 +j -j -1 -j -1 +1 +1 +1 -1 -1 -j +j +j +j -j -j +1 -j +1 +1 -j +1 +j<br>+1 +j +j +1 +j -j +j +j +j -j -j -1 +1 +1 +1 -1 -1 +j +1 +j +j +1 +j +1 -j +1 +1 -j +1 +j -j -j +j -j -j +1 -1 -1 +1 -1 -1 -j -1 -j<br>+j +1 +j -1 +j -1 +1 -j +1 -1 +1 +1 -1 +1 +1 -j +j +j -j +j +j +1 -j +1 -1 +j -1 +j +1 +j -j -1 -j -j +j +j +j -j -j +1 -1 -1 -1 +1<br>+1 +j +1 +j +j +1 +j -1 +j -1 -1 +j -1 -1 +1 +1 +1 -1 -1 +j -j -j -j +j +j +1 -j +1 +1 -j +1 -j -1 -j -j -1 -j -1 +1 +1 -1 +1 +1<br>+j -j -j +j -j -j +1 -j +1 -1 +j -1 -j -1 -j +j +1 +j +j -j -j +j -j -j -1 +1 +1 -1 +1 +1 -j -1 -j +j +1 +j +1 -j +1 -1 +j -1 +j -j -j -j<br>+j +j -1 +1 +1 +1 -1 -1 -j -1 -j -j -1 -j +1 -j +1 +1 -j +1 -1 +1 +1 +1 -1 -1 +j -j -j -j +j +j +1 -j +1 +1 -j +1 -j -1 -j -j -1 -j<br>+1 -1 -1 +1 -1 -1 -j +j +j -j +j +j -1 +j -1 +1 -j +1 +j +1 +j -j -1 -j +j -j -j +j -j -j -1 +1 +1 -1 +1 +1 -j -1 -j +j +1 +j +1 -j<br>+1 -1 +j -1 +j +1 -1 +1 +1 -1 +1 -1 +j +j -1 -1 +1 +1 -1 -j -j -j +1 |

FIG. 23

The Sequence $Seq^{1}_{left}$, 804(k), to be transmitted from left to right, up to down -j +j +1 -1 +j -1 -j -j -1 +j -j +j +1 +1 +1 +j -1 -1 +j -1 +1 -1 +j +j -1 -j +1 +1 -j -1 +1 -1 +j +j -j +1 +j +j +1 +j -j +j +1
+1 +j -1 -j -j -1 +j -j +j +1 +1 +1 +j -1 -1 +j -1 +1 -1 +j +j +1 +j -1 -1 +j +1 -1 +1 -j -j +j -1 -j -j -1 -j +j -j -1 -1 -j +1 +j
+j +1 -j +j -j -1 -1 -1 -j +1 +1 -j +1 -1 +1 -j -j +1 +j -1 -1 +j +1 -1 +1 -j -j +j -1 -j -j -1 -j +j -j -1 -1 +j -1 -j -j -1 +j -j +j +1
+1 +1 +j -1 -1 +j -1 +1 -1 +j +j +1 +j -1 -1 +j +1 -1 +1 -j -j +j -1 -j -j -1 -j +j -j -1 -1 +j -1 -j -j -1 +j -j +j +1 +1 +1 +j -1
-1 +j -1 +1 -1 +j +j -1 -j +1 +1 -j -1 +1 -1 +j +j -j +1 +j +j +1 +j -j +j +1 +1 +j -1 -j -j -1 +j -j +j +1 +1 +1 +j -1 -1 +j -1
+1 -1 +j +j +1 +j -1 -1 +j +1 -1 +1 -j -j +j -1 -j -j -1 -j +j -j -1 -1 -j +1 +j +j +1 -j +j -j -1 -1 -1 -j +1 +1 -j +1 -1 +1 -j -j +1
+j -1 -1 +j +1 -1 +1 -j -j +j -1 -j -j -1 -j +j -j -1 -1 +j -1 -j -j -1 +j -j +j +1 +1 +1 +j -1 -1 +j -1 +1 -1 +j +j +1 +j -1 -1 +j
+1 -1 +1 -j -j +j -1 -j -j -1 -j +j -j -1 -1 +1 +j -1 -1 +j +1 -1 +1 -j -j -j +1 +j +j +1 +j -j +j +1 +1 +j -1 -j -j -1 +j -j +j +1 +1
-1 -j +1 +1 -j +1 -1 +1 -j -j +1 +j -1 -1 +j +1 -1 +1 -j -j -j +1 +j +j +1 +j -j +j +1 +1 -j +1 +j +j +1 -j +j -j -1 -1 +1 +j -1
-1 +j -1 +1 -1 +j +j -1 -j +1 +1 -j -1 +1 -1 +j +j +j -1 -j -j -1 -j +j -j -1 -1 -j +1 +j +j +1 -j +j -j -1 -1 +1 +j -1 -1 +j -1 +1
-1 +j +j +1 +j -1 -1 +j +1 -1 +1 -j -j -j +1 +j +j +1 +j -j +j +1 +1 -j +1 +j +j +1 -j +j -j -1 -1 +1 +j -1 -1 +j -1 +1 -1 +j +j
-1 -j +1 +1 -j -1 +1 -1 +j +j +j -1 -j -j -1 -j +j -j -1 -1 -j +1 +j +j +1 -j +j -j -1 -1 +1 +j -1 -1 +j -1 +1 -1 +j +j -1 -j +1 +1 -j
-1 +1 -1 +j +j +j -1 -j -j -1 -j +j -j -1 -1 +j -1 -j -j -1 +j -j +j +1 +1 -1 -j +1 +1 -j +1 -1 +1 -j -j +1 +j -1 -1 +j +1 -1 +1 -j -j
-j +1 +j +j +1 +j -j +j +1 +1 +j -1 -j -j -1 +j -j +j +1 +1 -1 -j +1 +1 -j +1 -1 +1 -j -j -1 -j +1 +1 -j -1 +1 -1 +j +j +j -1 -j -j
-1 -j +j -j -1 -1 +j -1 -j -j -1 +j -j +j +1 +1 -1 -j +1 +1 -j +1 -1 +1 -j -j +1 +j -1 -1 +j +1 -1 +1 -j -j -j +1 +j +j +1 +j -j +j
+1 +1 +j -1 -j -j -1 +j -j +j +1 +1 -1 -j +1 +1 -j +1 -1 +1 -j -j +1 +j -1 -1 +j +1 -1 +1 -j -j -j +1 +j +j +1 +j -j +j +1 +1 -j +1
+j +j +1 -j +j -j -1 -1 +1 +j -1 -1 +j -1 +1 -1 +j +j -1 -j +1 +1 -j -1 +1 -1 +j +j +j -1 -j -j -1 -j +j -j -1 -1 -j +1 +j +j +1 -j
+j -j -1 -1 +1 +j -1 -1 +j -1 +1 -1 +j +j +1 +j -1 -1 +j +1 -1 +1 -j -j -j +1 +j +j +1 +j -j +j +1 +1 -j +1 +j +j +1 -j +j -j -1
-1 +1 +j -1 -1 +j -1 +1 -1 +j +j The Sequence $Seq^{2}_{left}$, 804(k), to be transmitted from left to right, up to down +1 -1 -1 +1 +j -1 -j -j -1 +j -1 -j -j -1 +1 +j -1 -1 +j +1 +j -1 -1 +j -j +1 +j +j +1 -j +1 +j +j +1 +1 +j -1 -1 +j +1 +j -1 -1
+j +j -1 -j -j -1 -j +1 +j +j +1 -1 -j +1 +1 -j +1 +j -1 -1 +j -j +1 +j +j +1 +j -1 -j -j -1 -1 -j +1 +1 -j +1 +j -1 -1 +j +1 -1 +1
-j -j +1 -1 +1 -j -j -j +j -j -1 -1 -j +j -j -1 -1 +1 -1 +1 -j -j +1 -1 +1 -j -j +j -j +j +1 +1 +j -j +j +1 +1 +1 -1 +1 -j -j -1 +1 -1
+j +j +j -j +j +1 +1 -j +j -j -1 -1 +1 -1 +1 -j -j -1 +1 -1 +j +j -j +j -j -1 -1 +j -j +j +1 +1 +j -1 -j -j -1 +j -1 -j -j -1 +1 +j -1
-1 +j +1 +j -1 -1 +j -j +1 +j +j +1 -j +1 +j +j +1 +1 +j -1 -1 +j +1 +j -1 -1 +j +j -1 -j -j -1 -j +1 +j +j +1 -1 -j +1 +1 -j +1
+j -1 -1 +j -j +1 +j +j +1 +j -1 -j -j -1 -1 -j +1 +1 -j +1 +j -1 -1 +j +1 -1 +1 -j -j +1 -1 +1 -j -j -j +j -j -1 -1 -j +j -j -1 -1 +1
-1 +1 -j -j +1 -1 +1 -j -j +j -j +j +1 +1 +j -j +j +1 +1 +1 -1 +1 -j -j -1 +1 -1 +j +j +j -j +j +1 +1 -j +j -j -1 -1 +1 -1 +1 -j -j
-1 +1 -1 +j +j -j +j -j -1 -1 +j -j +j +1 +1 +1 +j -1 -1 +j +1 +j -1 -1 +j -j +1 +j +j +1 -j +1 +j +j +1 -1 -j +1 +1 -j -1 -j +1
+1 -j -j +1 +j +j +1 -j +1 +j +j +1 +1 +j -1 -1 +j -1 -j +1 +1 -j +j -1 -j -j -1 -j +1 +j +j +1 -1 -j +1 +1 -j +1 +j -1 -1 +j +j -1
-j -j -1 -j +1 +j +j +1 -j +j -j -1 -1 -j +j -j -1 -1 -1 +1 -1 +j +j -1 +1 -1 +j +j -j +j -j -1 -1 -j +j -j -1 -1 +1 -1 +1 -j -j +1 -1
+1 -j -j -j +j -j -1 -1 +j -j +j +1 +1 +1 -1 +1 -j -j -1 +1 -1 +j +j -j +j -j -1 -1 +j -j +j +1 +1 -1 +1 -1 +j +j +1 -1 +1 -j -j -1 -j
+1 +1 -j -1 -j +1 +1 -j +j -1 -j -j -1 +j -1 -j -j -1 +1 +j -1 -1 +j +1 +j -1 -1 +j +j -1 -j -j -1 +j -1 -j -j -1 -1 -j +1 +1 -j +1 +j
-1 -1 +j -j +1 +j +j +1 +j -1 -j -j -1 +1 +j -1 -1 +j -1 -j +1 +1 -j -j +1 +j +j +1 +j -1 -j -j -1 +j -j +j +1 +1 +j -j +j +1 +1 +1
-1 +1 -j -j +1 -1 +1 -j -j +j -j +j +1 +1 +j -j +j +1 +1 -1 +1 -1 +j +j -1 +1 -1 +j +j +j -j +j +1 +1 -j +j -j -1 -1 -1 +1 -1 +j
+j +1 -1 +1 -j -j +j -j +j +1 +1 -j +j -j -1 -1 +1 -1 +1 -j -j -1 +1 -1 +j +j +1 +j -1 -1 +j +1 +j -1 -1 +j -j +1 +j +j +1 -j +1
+j +j +1 -1 -j +1 +1 -j -1 -j +1 +1 -j -j +1 +j +j +1 -j +1 +j +j +1 +1 +j -1 -1 +j -1 -j +1 +1 -j +j -1 -j -j -1 -j +1 +j +j +1
-1 -j +1 +1 -j +1 +j -1 -1 +j +j -1 -j -j -1 -j +1 +j +j +1 -j +j -j -1 -1 -j +j -j -1 -1 -1 +1 -1 +j +j -1 +1 -1 +j +j -j +j -j -1 -1
-j +j -j -1 -1 +1 -1 +1 -j -j +1 -1 +1 -j -j -j +j -j -1 -1 +j -j +j +1 +1 +1 -1 +1 -j -j -1 +1 -1 +j +j -j +j -j -1 -1 +j -j +j +1 +1
-1 +1 -1 +j +j +1 -1 +1 -j -j

FIG. 24

| The Sequence $Seq^{3}_{left}$ , 804(k), to be transmitted from left to right, up to down |
| --- |
| -j -1 -1 -1 +j -1 -j -j -1 +j -j +j +1 +1 -1 -j +1 +1 -j -1 +1 -1 +j +j -j +1 +j +j +1 +j -j +j +1 +1 +1 +j -1 -1 +j -1 +1 -1 +j +j<br>+1 +j -1 -1 +j +1 -1 +1 -j -j -j +1 +j +j +1 -j +j -j -1 -1 +1 +j -1 -1 +j -1 +1 -1 +j +j -j +1 +j +j +1 +j -j +j +1 +1 +j -1 -j -j<br>-1 +j -j +j +1 +1 +1 +j -1 -1 +j +1 -1 +1 -j -j -j +1 +j +j +1 +j -j +j +1 +1 -1 -j +1 +1 -j +1 -1 +1 -j -j +1 +j -1 -1 +j +1 -1<br>+1 -j -j +j -1 -j -j -1 +j -j +j +1 +1 +1 +j -1 -1 +j -1 +1 -1 +j +j +j -1 -j -j -1 -j +j -j -1 -1 -j +1 +j +j +1 -j +j -j -1 -1 +1 +j<br>-1 -1 +j +1 -1 +1 -j -j +j -1 -j -j -1 -j +j -j -1 -1 -1 -j +1 +1 -j +1 -1 +1 -j -j -1 -j +1 +1 -j -1 +1 -1 +j +j +j -1 -j -j -1 +j -j +j<br>+1 +1 -1 -j +1 +1 -j +1 -1 +1 -j -j +j -1 -j -j -1 -j +j -j -1 -1 -j +1 +j +j +1 -j +j -j -1 -1 -1 -j +1 +1 -j -1 +1 -1 +j +j +j -1 -j<br>-j -1 -j +j -j -1 -1 +1 +j -1 -1 +j -1 +1 -1 +j +j -1 -j +1 +1 -j -1 +1 -1 +j +j -j +1 +j +j +1 -j +j -j -1 -1 -1 -j +1 +1 -j +1 -1<br>+1 -j -j -j +1 +j +j +1 +j -j +j +1 +1 +j -1 -j -j -1 +j -j +j +1 +1 -1 -j +1 +1 -j -1 +1 -1 +j +j -j +1 +j +j +1 +j -j +j +1 +1<br>+1 +j -1 -1 +j -1 +1 -1 +j +j +1 +j -1 -1 +j +1 -1 +1 -j -j -j +1 +j +j +1 -j +j -j -1 -1 +1 +j -1 -1 +j -1 +1 -1 +j +j -j +1 +j<br>+j +1 +j -j +j +1 +1 +j -1 -j -j -1 +j -j +j +1 +1 +1 +j -1 -1 +j +1 -1 +1 -j -j -j +1 +j +j +1 +j -j +j +1 +1 -1 -j +1 +1 -j +1<br>-1 +1 -j -j +1 +j -1 -1 +j +1 -1 +1 -j -j +j -1 -j -j -1 +j -j +j +1 +1 +1 +j -1 -1 +j -1 +1 -1 +j +j +j -1 -j -j -1 -j +j -j -1 -1 -1<br>-j +1 +1 -j -1 +1 -1 +j +j -j +1 +j +j +1 -j +j -j -1 -1 +1 +j -1 -1 +j -1 +1 -1 +j +j +j -1 -j -j -1 -j +j -j -1 -1 +j -1 -j -j -1 +j<br>-j +j +1 +1 +1 +j -1 -1 +j +1 -1 +1 -j -j +j -1 -j -j -1 -j +j -j -1 -1 +1 +j -1 -1 +j -1 +1 -1 +j +j -1 -j +1 +1 -j -1 +1 -1 +j +j<br>+j -1 -j -j -1 +j -j +j +1 +1 +1 +j -1 -1 +j -1 +1 -1 +j +j -j +1 +j +j +1 +j -j +j +1 +1 +j -1 -j -j -1 +j -j +j +1 +1 -1 -j +1 +1<br>-j -1 +1 -1 +j +j +j -1 -j -j -1 -j +j -j -1 -1 -1 -j +1 +1 -j +1 -1 +1 -j -j -1 -j +1 +1 -j -1 +1 -1 +j +j -j +1 +j +j +1 -j +j -j -1<br>-1 +1 +j -1 -1 +j -1 +1 -1 +j +j +j -1 -j -j -1 -j +j -j -1 -1 +j -1 -j -j -1 +j -j +j +1 +1 +1 +j -1 -1 +j +1 -1 +1 -j -j +j -1 -j -j<br>-1 -j +j -j -1 -1 +1 +j -1 -1 +j -1 +1 -1 +j +j -1 -j +1 +1 -j -1 +1 -1 +j +j +j -1 -j -j -1 +j -j +j +1 +1 +1 +j -1 -1 +j -1 +1 -1<br>+j +j -j +1 +j +j +1 +j -j +j +1 +1 +j -1 -j -j -1 +j -j +j +1 +1 -1 -j +1 +1 -j -1 +1 -1 +j +j +j -1 -j -j -1 -j +j -j -1 -1 -1 -j +1<br>+1 -j +1 -1 +1 -j -j |

| The Sequence $Seq^{4}_{left}$ , 804(k), to be transmitted from left to right, up to down |
| --- |
| +1 +j +j -j +j -1 -j -j -1 +j -1 -j -j -1 -j +j -j -1 -1 -j +j -j -1 -1 -1 -j +1 +1 -j -1 -j +1 +1 -j +1 -1 +1 -j -j +1 -1 +1 -j -j -1 -j<br>+1 +1 -j +1 +j -1 -1 +j +1 -1 +1 -j -j -1 +1 -1 +j +j +j -1 -j -j -1 -j +1 +j +j +1 -j +j -j -1 -1 +j -j +j +1 +1 -1 -j +1 +1 -j -1<br>-j +1 +1 -j -1 +1 -1 +j +j -1 +1 -1 +j +j +j -1 -j -j -1 +j -1 -j -j -1 +j -j +j +1 +1 +j -j +j +1 +1 -j +1 +j +j +1 +j -1 -j -j -1 -j<br>+j -j -1 -1 +j -j +j +1 +1 +1 +j -1 -1 +j -1 -j +1 +1 -j +1 -1 +1 -j -j -1 +1 -1 +j +j -j +1 +j +j +1 -j +1 +j +j +1 +j -j +j +1<br>+1 +j -j +j +1 +1 +1 +j -1 -1 +j +1 +j -1 -1 +j -1 +1 -1 +j +j -1 +1 -1 +j +j +1 +j -1 -1 +j -1 -j +1 +1 -j -1 +1 -1 +j +j +1<br>-1 +1 -j -j -j +1 +j +j +1 +j -1 -j -j -1 +j -j +j +1 +1 -j +j -j -1 -1 +1 +j -1 -1 +j +1 +j -1 -1 +j +1 -1 +1 -j -j +1 -1 +1 -j -j -j<br>+1 +j +j +1 -j +1 +j +j +1 -j +j -j -1 -1 -j +j -j -1 -1 +j -1 -j -j -1 -j +1 +j +j +1 +j -j +j +1 +1 -j +j -j -1 -1 -1 -j +1 +1 -j +1<br>+j -1 -1 +j -1 +1 -1 +j +j +1 -1 +1 -j -j +j -1 -j -j -1 +j -1 -j -j -1 -j +j -j -1 -1 -j +j -j -1 -1 -1 -j +1 +1 -j -1 -j +1 +1 -j +1<br>-1 +1 -j -j +1 -1 +1 -j -j -1 -j +1 +1 -j +1 +j -1 -1 +j +1 -1 +1 -j -j -1 +1 -1 +j +j +j -1 -j -j -1 -j +1 +j +j +1 -j +j -j -1 -1 +j<br>-j +j +1 +1 -1 -j +1 +1 -j -1 -j +1 +1 -j -1 +1 -1 +j +j -1 +1 -1 +j +j +j -1 -j -j -1 +j -1 -j -j -1 +j -j +j +1 +1 +j -j +j +1 +1<br>-j +1 +j +j +1 +j -1 -j -j -1 -j +j -j -1 -1 +j -j +j +1 +1 +1 +j -1 -1 +j -1 -j +1 +1 -j +1 -1 +1 -j -j -1 +1 -1 +j +j -1 -j +1 +1<br>-j -1 -j +1 +1 -j +1 -1 +1 -j -j +1 -1 +1 -j -j -j +1 +j +j +1 -j +1 +j +j +1 +j -j +j +1 +1 +j -j +j +1 +1 -j +1 +j +j +1 +j -1<br>-j -j -1 +j -j +j +1 +1 -j +j -j -1 -1 -1 -j +1 +1 -j +1 +j -1 -1 +j +1 -1 +1 -j -j -1 +1 -1 +j +j -j +1 +j +j +1 -j +1 +j +j +1 -j<br>+j -j -1 -1 -j +j -j -1 -1 -1 -j +1 +1 -j -1 -j +1 +1 -j -1 +1 -1 +j +j -1 +1 -1 +j +j +1 +j -1 -1 +j -1 -j +1 +1 -j +1 -1 +1 -j -j<br>-1 +1 -1 +j +j +j -1 -j -j -1 -j +1 +j +j +1 +j -j +j +1 +1 -j +j -j -1 -1 -1 -j +1 +1 -j -1 -j +1 +1 -j +1 -1 +1 -j -j +1 -1 +1 -j<br>-j -j +1 +j +j +1 -j +1 +j +j +1 +j -j +j +1 +1 +j -j +j +1 +1 -j +1 +j +j +1 +j -1 -j -j -1 +j -j +j +1 +1 -j +j -j -1 -1 -1 -j +1<br>+1 -j +1 +j -1 -1 +j +1 -1 +1 -j -j -1 +1 -1 +j +j -j +1 +j +j +1 -j +1 +j +j +1 -j +j -j -1 -1 -j +j -j -1 -1 -1 -j +1 +1 -j -1 -j<br>+1 +1 -j -1 +1 -1 +j +j -1 +1 -1 +j +j +1 +j -1 -1 +j -1 -j +1 +1 -j +1 -1 +1 -j -j -1 +1 -1 +j +j +j -1 -j -j -1 -j +1 +j +j +1<br>+j -j +j +1 +1 -j +j -j -1 -1 |

FIG. 25

The Sequence $Seq^{5}_{left}$, 804(k), to be transmitted from left to right, up to down

-j -j +1 -j -1 -1 -j +j -j -1 -1 -j +j -j +1 +1 +j -j +j -1 -1 -j +j -j -j +1 +1 -j -1 -j +1 +1 -j -1 +j -1 -1 +j +1 -j +1 +1 -j -1 -1 -1
-j +j -j +1 +1 +j -j +j +1 +1 +j -j +j +1 +1 +j -j +j +j -1 -1 +j +1 -j +1 +1 -j -1 -j +1 +1 -j -1 -j +1 +1 -j -1 +j +j -1 +1 -1
+j +j -1 +1 -1 +j +j -1 +1 -1 -j -j +1 -1 +1 -1 -j -j -1 +j -1 -j -j -1 +j -1 -j -j -1 +j +1 +j +j +1 -j +j +j -1 +1 -1 -j -j +1 -1 +1
+j +j -1 +1 -1 +j +j -1 +1 -1 +1 +j +j +1 -j -1 -j -j -1 +j +1 +j +j +1 -j +1 +j +j +1 -j -1 -1 -j +j -j -1 -1 -j +j -j +1 +1 +j -j
+j -1 -1 -j +j -j -j +1 +1 -j -1 -j +1 +1 -j -1 +j -1 -1 +j +1 -j +1 +1 -j -1 -1 -1 -j +j -j +1 +1 +j -j +j +1 +1 +j -j +j +1 +1 +j
-j +j +j -1 -1 +j +1 -j +1 +1 -j -1 -j +1 +1 -j -1 -j +1 +1 -j -1 +j +j -1 +1 -1 +j +j -1 +1 -1 +j +j -1 +1 -1 -j -j +1 -1 +1 -1 -j
-j -1 +j -1 -j -j -1 +j -1 -j -j -1 +j +1 +j +j +1 -j +j +j -1 +1 -1 -j -j +1 -1 +1 +j +j -1 +1 -1 +j +j -1 +1 -1 +1 +j +j +1 -j -1
-j -j -1 +j +1 +j +j +1 -j +1 +j +j +1 -j +j +j -1 +1 -1 +j +j -1 +1 -1 -j -j +1 -1 +1 +j +j -1 +1 -1 -1 -j -j -1 +j -1 -j -j -1 +j
+1 +j +j +1 -j -1 -j -j -1 +j +j +j -1 +1 -1 -j -j +1 -1 +1 -j -j +1 -1 +1 -j -j +1 -1 +1 +1 +j +j +1 -j -1 -j -j -1 +j -1 -j -j -1 +j
-1 -j -j -1 +j +1 +1 +j -j +j +1 +1 +j -j +j +1 +1 +j -j +j -1 -1 -j +j -j +j -1 -1 +j +1 +j -1 -1 +j +1 +j -1 -1 +j +1 -j +1 +1 -j
-1 +1 +1 +j -j +j -1 -1 -j +j -j +1 +1 +j -j +j +1 +1 +j -j +j -j +1 +1 -j -1 +j -1 -1 +j +1 -j +1 +1 -j -1 -j +1 +1 -j -1 -j -j +1
-1 +1 -j -j +1 -1 +1 +j +j -1 +1 -1 -j -j +1 -1 +1 +1 +j +j +1 -j +1 +j +j +1 -j -1 -j -j -1 +j +1 +j +j +1 -j -j -j +1 -1 +1 +j
+j -1 +1 -1 +j +j -1 +1 -1 +j +j -1 +1 -1 -1 -j -j -1 +j +1 +j +j +1 -j +1 +j +j +1 -j +1 +j +j +1 -j -1 -1 -j +j -j -1 -1 -j +j -j
-1 -1 -j +j -j +1 +1 +j -j +j -j +1 +1 -j -1 -j +1 +1 -j -1 -j +1 +1 -j -1 +j -1 -1 +j +1 -1 -1 -j +j -j +1 +1 +j -j +j -1 -1 -j +j -j
-1 -1 -j +j -j +j -1 -1 +j +1 -j +1 +1 -j -1 +j -1 -1 +j +1 +j -1 -1 +j +1 +j +j -1 +1 -1 +j +j -1 +1 -1 -j -j +1 -1 +1 +j +j -1
+1 -1 -1 -j -j -1 +j -1 -j -j -1 +j +1 +j +j +1 -j -1 -j -j -1 +j +j +j -1 +1 -1 -j -j +1 -1 +1 -j -j +1 -1 +1 -j -j +1 -1 +1 +1 +j +j
+1 -j -1 -j -j -1 +j -1 -j -j -1 +j -1 -j -j -1 +j +1 +1 +j -j +j +1 +1 +j -j +j +1 +1 +j -j +j -1 -1 -j +j -j +j -1 -1 +j +1 +j -1 -1
+j +1 +j -1 -1 +j +1 -j +1 +1 -j -1 +1 +1 +j -j +j -1 -1 -j +j -j +1 +1 +j -j +j +1 +1 +j -j +j -j +1 +1 -j -1 +j -1 -1 +j +1 -j +1
+1 -j -1 -j +1 +1 -j -1

The Sequence $Seq^{6}_{left}$, 804(k), to be transmitted from left to right, up to down

| The Sequence $Seq^{7}_{left}$, 804(k), to be transmitted from left to right, up to down |
|---|
| +j -j -1 -1 -1 -1 -j +j -j +1 +1 +j -j +j +1 +j +j +1 -j +1 +j +j +1 -j -j -j +1 -1 +1 +j +j -1 +1 -1 +j -1 -1 +j +1 +j -1 -1 +j +1<br>+j +j -1 +1 -1 -j -j +1 -1 +1 -j +1 +1 -j -1 -j +1 +1 -j -1 +1 +1 +j -j +j -1 -1 -j +j -j -1 -j -j -1 +j -1 -j -j -1 +j -j -j +1 -1 +1<br>-j -j +1 -1 +1 +j -1 -1 +j +1 -j +1 +1 -j -1 -1 -1 -j +j -j -1 -1 -j +j -j +1 +j +j +1 -j -1 -j -j -1 +j -1 -1 -j +j -j -1 -1 -j +j -j +1<br>+j +j +1 -j -1 -j -j -1 +j -j -j +1 -1 +1 -j -j +1 -1 +1 +j -1 -1 +j +1 -j +1 +1 -j -1 +1 +1 +j -j +j -1 -1 -j +j -j -1 -j -j -1 +j -1<br>-j -j -1 +j +j +j -1 +1 -1 -j -j +1 -1 +1 -j +1 +1 -j -1 -j +1 +1 -j -1 -j -j +1 -1 +1 +j +j -1 +1 -1 +j -1 -1 +j +1 +j -1 -1 +j +1<br>-1 -1 -j +j -j +1 +1 +j -j +j +1 +j +j +1 -j +1 +j +j +1 -j +j +j -1 +1 -1 +j +j -1 +1 -1 -j +1 +1 -j -1 +j -1 -1 +j +1 +1 +1 +j<br>-j +j +1 +1 +j -j +j -1 -j -j -1 +j +1 +j +j +1 -j +1 +1 +j -j +j +1 +1 +j -j +j -1 -j -j -1 +j +1 +j +j +1 -j +j +j -1 +1 -1 +j +j<br>-1 +1 -1 -j +1 +1 -j -1 +j -1 -1 +j +1 -1 -1 -j +j -j +1 +1 +j -j +j +1 +j +j +1 -j +1 +j +j +1 -j -j -j +1 -1 +1 +j +j -1 +1 -1<br>+j -1 -1 +j +1 +j -1 -1 +j +1 +j +j -1 +1 -1 -j -j +1 -1 +1 -j +1 +1 -j -1 -j +1 +1 -j -1 +1 +1 +j -j +j -1 -1 -j +j -j -1 -j -j -1<br>+j -1 -j -j -1 +j -j -j +1 -1 +1 -j -j +1 -1 +1 +j -1 -1 +j +1 -j +1 +1 -j -1 -1 -1 -j +j -j -1 -1 -j +j -j +1 +j +j +1 -j -1 -j -j -1<br>+j -1 -1 -j +j -j -1 -1 -j +j -j +1 +j +j +1 -j -1 -j -j -1 +j -j -j +1 -1 +1 -j -j +1 -1 +1 +j -1 -1 +j +1 -j +1 +1 -j -1 -j -j +1 -1<br>+1 +j +j -1 +1 -1 +j -1 -1 +j +1 +j -1 -1 +j +1 +1 +1 +j -j +j -1 -1 -j +j -j -1 -j -j -1 +j -1 -j -j -1 +j -1 -1 -j +j -j +1 +1 +j<br>-j +j +1 +j +j +1 -j +1 +j +j +1 -j +j +j -1 +1 -1 -j -j +1 -1 +1 -j +1 +1 -j -1 -j +1 +1 -j -1 +1 +1 +j -j +j +1 +1 +j -j +j -1<br>-j -j -1 +j +1 +j +j +1 -j -j -j +1 -1 +1 -j -j +1 -1 +1 +j -1 -1 +j +1 -j +1 +1 -j -1 -j -j +1 -1 +1 -j -j +1 -1 +1 +j -1 -1 +j +1<br>-j +1 +1 -j -1 +1 +1 +j -j +j +1 +1 +j -j +j -1 -j -j -1 +j +1 +j +j +1 -j -j -j +1 -1 +1 +j +j -1 +1 -1 +j -1 -1 +j +1 +j -1 -1<br>+j +1 +1 +1 +j -j +j -1 -1 -j +j -j -1 -j -j -1 +j -1 -j -j -1 +j -1 -1 -j +j -j +1 +1 +j -j +j +1 +j +j +1 -j +1 +j +j +1 -j +j +j -1<br>+1 -1 -j -j +1 -1 +1 -j +1 +1 -j -1 -j +1 +1 -j -1 +1 +1 +j -j +j +1 +1 +j -j +j -1 -j -j -1 +j +1 +j +j +1 -j -j -j +1 -1 +1 -j -j<br>+1 -1 +1 +j -1 -1 +j +1 -j +1 +1 -j -1 -j -j +1 -1 +1 -j -j +1 -1 +1 +j -1 -1 +j +1 -j +1 +1 -j -1 +1 +1 +j -j +j +1 +1 +j -j<br>+j -1 -j -j -1 +j +1 +j +j +1 -j |

| The Sequence $Seq^{8}_{left}$, 804(k), to be transmitted from left to right, up to down |
|---|
| -1 +j +1 -1 -j -j +1 -1 +1 -1 -1 -j +j -j -1 -1 -j +j -j +j +j -1 +1 -1 -j +1 +1 -j -1 -1 -j -j -1 +j -1 -j -j -1 +j +j -1 -1 +j +1 +1<br>+1 +j -j +j +j +j -1 +1 -1 +j +j -1 +1 -1 -1 -1 -j +j -j +1 +j +j +1 -j +j -1 -1 +j +1 +j -1 -1 +j +1 -1 -j -j -1 +j +j +j -1 +1 -1<br>-1 -1 -j +j -j +1 +1 +j -j +j +j +j -1 +1 -1 -j +1 +1 -j -1 +1 +j +j +1 -j -1 -j -j -1 +j -j +1 +1 -j -1 -1 -1 -j +j -j +j +j -1 +1 -1<br>-j -j +1 -1 +1 -1 -1 -j +j -j +1 +j +j +1 -j -j +1 +1 -j -1 +j -1 -1 +j +1 +1 +j +j +1 -j +j +j -1 +1 -1 +1 +1 +j -j +j +1 +1 +j<br>-j +j -j -j +1 -1 +1 +j -1 -1 +j +1 +1 +j +j +1 -j +1 +j +j +1 -j -j +1 +1 -j -1 -1 -1 -j +j -j -j +1 -1 +1 -j -j +1 -1 +1 +1 +1<br>+j -j +j -1 -j -j -1 +j -j +1 +1 -j -1 -j +1 +1 -j -1 +1 +j +j +1 -j -j -j +1 -1 +1 +1 +1 +j -j +j -1 -1 -j +j -j -j -j +1 -1 +1 +j -1<br>-1 +j +1 -1 -j -j -1 +j +1 +j +j +1 -j +j -1 -1 +j +1 +1 +1 +j -j +j -j -j +1 -1 +1 +j +j -1 +1 -1 +1 +1 +j -j +j -1 -j -j -1 +j +j<br>-1 -1 +j +1 -j +1 +1 -j -1 -1 -j -j -1 +j -j -j +1 -1 +1 -1 -1 -j +j -j -1 -1 -j +j -j +j +j -1 +1 -1 -j +1 +1 -j -1 -1 -j -j -1 +j -1<br>-j -j -1 +j +j -1 -1 +j +1 +1 +1 +j -j +j +j +j -1 +1 -1 +j +j -1 +1 -1 -1 -1 -j +j -j +1 +j +j +1 -j +j -1 -1 +j +1 +j -1 -1 +j +1<br>-1 -j -j -1 +j +j +j -1 +1 -1 -1 -1 -j +j -j +1 +1 +j -j +j +j +j -1 +1 -1 -j +1 +1 -j -1 +1 +j +j +1 -j -1 -j -j -1 +j -j +1 +1 -j<br>-1 -1 -1 -j +j -j +j +j -1 +1 -1 -j -j +1 -1 +1 -1 -1 -j +j -j +1 +j +j +1 -j -j +1 +1 -j -1 +j -1 -1 +j +1 +1 +j +j +1 -j +1 +1 +j<br>-j +j -j -j +1 -1 +1 -j -j +1 -1 +1 -1 -1 -j +j -j +1 +j +j +1 -j -j +1 +1 -j -1 -j +1 +1 -j -1 -1 -j -j -1 +j +j +j -1 +1 -1 -1 -1 -j<br>+j -j -1 -1 -j +j -j -j -j +1 -1 +1 +j -1 -1 +j +1 -1 -j -j -1 +j -1 -j -j -1 +j -j +1 +1 -j -1 -1 -1 -j +j -j -j -j +1 -1 +1 +j +j -1 +1<br>-1 -1 -1 -j +j -j +1 +j +j +1 -j +j -1 -1 +j +1 -j +1 +1 -j -1 +1 +j +j +1 -j -j -j +1 -1 +1 -1 -1 -j +j -j +1 +1 +j -j +j -j -j +1<br>-1 +1 +j -1 -1 +j +1 +1 +j +j +1 -j -1 -j -j -1 +j +j -1 -1 +j +1 +1 +1 +j -j +j -j -j +1 -1 +1 -j -j +1 -1 +1 -1 -1 -j +j -j +1 +j<br>+j +1 -j -j +1 +1 -j -1 -j +1 +1 -j -1 -1 -j -j -1 +j +j +j -1 +1 -1 -1 -1 -j +j -j -1 -1 -j +j -j -j -j +1 -1 +1 +j -1 -1 +j +1 -1 -j<br>-j -1 +j -1 -j -j -1 +j -j +1 +1 -j -1 -1 -1 -j +j -j -j -j +1 -1 +1 +j +j -1 +1 -1 -1 -1 -j +j -j +1 +j +j +1 -j +j -1 -1 +j +1 -j +1<br>+1 -j -1 +1 +j +j +1 -j -j -j +1 -1 +1 -1 -1 -j +j -j +1 +1 +j -j +j -j -j +1 -1 +1 +j -1 -1 +j +1 +1 +j +j +1 -j -1 -j -j -1 +j +j<br>-1 -1 +j +1 |

FIG. 27

The Sequence $Seq^{1}_{right}$, 804(k), to be transmitted from left to right, up to down

-j +1 +j +j +1 -j +j -j -1 -1 -1 -j +1 +1 -j +1 -1 +1 -j -j +1 +j -1 -1 +j +1 -1 +1 -j -j +j -1 -j -j -1 -j +j -j -1 -1 -j +1 +j +j +1
-j +j -j -1 -1 -1 -j +1 +1 -j +1 -1 +1 -j -j -1 -j +1 +1 -j -1 +1 -1 +j +j -j +1 +j +j +1 +j -j +j +1 +1 -j +1 +j +j +1 -j +j -j -1
-1 -1 -j +1 +1 -j +1 -1 +1 -j -j +1 +j -1 -1 +j +1 -1 +1 -j -j +j -1 -j -j -1 -j +j -j -1 -1 +j -1 -j -j -1 +j -j +j +1 +1 +1 +j -1 -1
+j -1 +1 -1 +j +j +1 +j -1 -1 +j +1 -1 +1 -j -j +j -1 -j -j -1 -j +j -j -1 -1 -1 -j +1 +1 -j -1 +1 -1 +j +j +j -1 -j -j -1 -j +j -j -1
-1 -j +1 +j +j +1 -j +j -j -1 -1 +1 +j -1 -1 +j -1 +1 -1 +j +j -1 -j +1 +1 -j -1 +1 -1 +j +j +j -1 -j -j -1 -j +j -j -1 -1 +j -1 -j -j
-1 +j -j +j +1 +1 -1 -j +1 +1 -j +1 -1 +1 -j -j -1 -j +1 +1 -j -1 +1 -1 +j +j +j -1 -j -j -1 -j +j -j -1 -1 -j +1 +j +j +1 -j +j -j -1
-1 +1 +j -1 -1 +j -1 +1 -1 +j +j +1 +j -1 -1 +j +1 -1 +1 -j -j -j +1 +j +j +1 +j -j +j +1 +1 -j +1 +j +j +1 -j +j -j -1 -1 +1 +j
-1 -1 +j -1 +1 -1 +j +j -1 -j +1 +1 -j -1 +1 -1 +j +j +j -1 -j -j -1 -j +j -j -1 -1 -j +1 +j +j +1 -j +j -j -1 -1 +1 +j -1 -1 +j -1 +1
-1 +j +j -1 -j +1 +1 -j -1 +1 -1 +j +j +j -1 -j -j -1 -j +j -j -1 -1 +j -1 -j -j -1 +j -j +j +1 +1 -1 -j +1 +1 -j +1 -1 +1 -j -j -1 -j
+1 +1 -j -1 +1 -1 +j +j +j -1 -j -j -1 -j +j -j -1 -1 -j +1 +j +j +1 -j +j -j -1 -1 +1 +j -1 -1 +j -1 +1 -1 +j +j +1 +j -1 -1 +j +1
-1 +1 -j -j -j +1 +j +j +1 +j -j +j +1 +1 -j +1 +j +j +1 -j +j -j -1 -1 +1 +j -1 -1 +j -1 +1 -1 +j +j -j +1 +j +j +1 -j +j -j -1 -1
-1 -j +1 +1 -j +1 -1 +1 -j -j +1 +j -1 -1 +j +1 -1 +1 -j -j +j -1 -j -j -1 -j +j -j -1 -1 -j +1 +j +j +1 -j +j -j -1 -1 -1 -j +1 +1 -j
+1 -1 +1 -j -j -1 -j +1 +1 -j -1 +1 -1 +j +j -j +1 +j +j +1 +j -j +j +1 +1 -j +1 +j +j +1 -j +j -j -1 -1 -1 -j +1 +1 -j +1 -1 +1 -j
-j +1 +j -1 -1 +j +1 -1 +1 -j -j +j -1 -j -j -1 -j +j -j -1 -1 +j -1 -j -j -1 +j -j +j +1 +1 +1 +j -1 -1 +j -1 +1 -1 +j +j +1 +j -1 -1
+j +1 -1 +1 -j -j +j -1 -j -j -1 -j +j -j -1 -1 +1 +j -1 -1 +j +1 -1 +1 -j -j -j +1 +j +j +1 +j -j +j +1 +1 +j -1 -j -j -1 +j -j +j +1
+1 -1 -j +1 +1 -j +1 -1 +1 -j -j +1 +j -1 -1 +j +1 -1 +1 -j -j -j +1 +j +j +1 +j -j +j +1 +1 -j +1 +j +j +1 -j +j -j -1 -1 +1 +j
-1 -1 +j -1 +1 -1 +j +j +1 +j -1 -1 +j +1 -1 +1 -j -j -j +1 +j +j +1 +j -j +j +1 +1 +j -1 -j -j -1 +j -j +j +1 +1 -1 -j +1 +1 -j
+1 -1 +1 -j -j -1 -j +1 +1 -j -1 +1 -1 +j +j +j -1 -j -j -1 -j +j -j -1 -1 +j -1 -j -j -1 +j -j +j +1 +1 -1 -j +1 +1 -j +1 -1 +1 -j
-j +1 +1 +j -1

The Sequence $Seq^{2}_{right}$, 804(k), to be transmitted from left to right, up to down

The Sequence $Seq^{3}_{right}$, 804(k), to be transmitted from left to right, up to down +1 +j -1 -1 +j +1 -1 +1 -j -j +j -1 -j -j -1 +j -j +j +1 +1 -1 -j +1 +1 -j +1 -1 +1 -j -j -j +1 +j +j +1 +j -j +j +1 +1 -j +1 +j
+j +1 -j +j -j -1 -1 -1 -j +1 +1 -j -1 +1 -1 +j +j -j +1 +j +j +1 +j -j +j +1 +1 -1 -j +1 +1 -j +1 -1 +1 -j -j -1 -j +1 +1 -j -1
+1 -1 +j +j +j -1 -j -j -1 +j -j +j +1 +1 +1 +j -1 -1 +j -1 +1 -1 +j +j -j +1 +j +j +1 +j -j +j +1 +1 +j -1 -j -j -1 +j -j +j +1
+1 -1 -j +1 +1 -j -1 +1 -1 +j +j +j -1 -j -j -1 -j +j -j -1 -1 -1 -j +1 +1 -j +1 -1 +1 -j -j -j +1 +j +j +1 -j +j -j -1 -1 +1 +j -1
-1 +j +1 -1 +1 -j -j +j -1 -j -j -1 -j +j -j -1 -1 -1 -j +1 +1 -j +1 -1 +1 -j -j -1 -j +1 +1 -j -1 +1 -1 +j +j +j -1 -j -j -1 +j -j +j
+1 +1 -1 -j +1 +1 -j +1 -1 +1 -j -j +j -1 -j -j -1 -j +j -j -1 -1 +j -1 -j -j -1 +j -j +j +1 +1 +1 +j -1 -1 +j +1 -1 +1 -j -j -j +1
+j +j +1 +j -j +j +1 +1 -1 -j +1 +1 -j +1 -1 +1 -j -j +1 +j -1 -1 +j +1 -1 +1 -j -j +j -1 -j -j -1 +j -j +j +1 +1 +1 +j -1 -1 +j -
1 +1 -1 +j +j +j -1 -j -j -1 -j +j -j -1 -1 -1 -j +1 +1 -j -1 +1 -1 +j +j -j +1 +j +j +1 -j +j -j -1 -1 +1 +j -1 -1 +j -1 +1 -1 +j +j
+j -1 -j -j -1 -j +j -j -1 -1 +j -1 -j -j -1 +j -j +j +1 +1 +1 +j -1 -1 +j +1 -1 +1 -j -j +j -1 -j -j -1 -j +j -j -1 -1 +1 +j -1 -1 +j
-1 +1 -1 +j +j +1 +j -1 -1 +j +1 -1 +1 -j -j -j +1 +j +j +1 -j +j -j -1 -1 -1 -j +1 +1 -j +1 -1 +1 -j -j +j -1 -j -j -1 -j +j -j -1 -1
-j +1 +j +j +1 -j +j -j -1 -1 +1 +j -1 -1 +j +1 -1 +1 -j -j -j +1 +j +j +1 +j -j +j +1 +1 +1 +j -1 -1 +j -1 +1 -1 +j +j -1 -j +1
+1 -j -1 +1 -1 +j +j -j +1 +j +j +1 -j +j -j -1 -1 +1 +j -1 -1 +j -1 +1 -1 +j +j +j -1 -j -j -1 -j +j -j -1 -1 +j -1 -j -j -1 +j -j +j
+1 +1 +1 +j -1 -1 +j +1 -1 +1 -j -j +j -1 -j -j -1 -j +j -j -1 -1 +1 +j -1 -1 +j -1 +1 -1 +j +j +1 +j -1 -1 +j +1 -1 +1 -j -j -j +1
+j +j +1 -j +j -j -1 -1 -1 -j +1 +1 -j +1 -1 +1 -j -j +j -1 -j -j -1 -j +j -j -1 -1 -j +1 +j +j +1 -j +j -j -1 -1 +1 +j -1 -1 +j +1
-1 +1 -j -j -j +1 +j +j +1 +j -j +j +1 +1 +1 +j -1 -1 +j -1 +1 -1 +j +j -j +1 +j +j +1 -j +j -j -1 -1 +1 +j -1 -1 +j +1 -1 +1 -j
-j +j -1 -j -j -1 -j +j -j -1 -1 -1 -j +1 +1 -j +1 -1 +1 -j -j -1 -j +1 +1 -j -1 +1 -1 +j +j +j -1 -j -j -1 +j -j +j +1 +1 -1 -j +1 +1
-j +1 -1 +1 -j -j +j -1 -j -j -1 -j +j -j -1 -1 +j -1 -j -j -1 +j -j +j +1 +1 +1 +j -1 -1 +j +1 -1 +1 -j -j -j +1 +j +j +1 +j -j +j +1
+1 -1 -j +1 +1 -j +1 -1 +1 -j -j +1 +j -1 -1 +j +1 -1 +1 -j -j +j -1 -j -j -1 +j -j +j +1 +1 +1 +j -1 -1 +j -1 +1 -1 +j +j +j -1
-j -j -1 -j +j -j -1 -1 -1 +1 -1 -j The Sequence $Seq^{4}_{right}$, 804(k), to be transmitted from left to right, up to down +1 +j -1 -1 +j -1 -j +1 +1 -j -1 +1 -1 +j +j +1 -1 +1 -j -j +j -1 -j -j -1 -j +1 +j +j +1 -j +j -j -1 -1 +j -j +j +1 +1 +j -1 -j -j
-1 +j -1 -j -j -1 -j +j -j -1 -1 -j +j -j -1 -1 +1 +j -1 -1 +j +1 +j -1 -1 +j -1 +1 -1 +j +j -1 +1 -1 +j +j +j -1 -j -j -1 -j +1 +j +j
+1 +j -j +j +1 +1 -j +j -j -1 -1 +1 +j -1 -1 +j -1 -j +1 +1 -j +1 -1 +1 -j -j -1 +1 -1 +j +j -1 -j +1 +1 -j -1 -j +1 +1 -j -1 +1
-1 +j +j -1 +1 -1 +j +j -j +1 +j +j +1 -j +1 +j +j +1 -j +j -j -1 -1 -j +j -j -1 -1 -j +1 +j +j +1 +j -1 -j -j -1 +j -j +j +1 +1 -j
+j -j -1 -1 +1 +j -1 -1 +j -1 -j +1 +1 -j -1 +1 -1 +j +j +1 -1 +1 -j -j +1 +j -1 -1 +j +1 +j -1 -1 +j -1 +1 -1 +j +j -1 +1 -1 +j
+j -j +1 +j +j +1 -j +1 +j +j +1 +j -j +j +1 +1 +j -j +j +1 +1 +1 +j -1 -1 +j -1 -j +1 +1 -j +1 -1 +1 -j -j -1 +1 -1 +j +j -j +1
+j +j +1 +j -1 -j -j -1 -j +j -j -1 -1 +j -j +j +1 +1 +j -1 -j -j -1 +j -1 -j -j -1 +j -j +j +1 +1 +j -j +j +1 +1 -1 -j +1 +1 -j -1 -j
+1 +1 -j -1 +1 -1 +j +j -1 +1 -1 +j +j -1 -j +1 +1 -j +1 +j -1 -1 +j +1 -1 +1 -j -j -1 +1 -1 +j +j -j +1 +j +j +1 +j -1 -j -j -1
+j -j +j +1 +1 -j +j -j -1 -1 -j +1 +j +j +1 -j +1 +j +j +1 +j -j +j +1 +1 +j -j +j +1 +1 -1 -j +1 +1 -j -1 -j +1 +1 -j +1 -1 +1
-j -j +1 -1 +1 -j -j -j +1 +j +j +1 +j -1 -j -j -1 -j +j -j -1 -1 +j -j +j +1 +1 -1 -j +1 +1 -j +1 +j -1 -1 +j -1 +1 -1 +j +j +1 -1
+1 -j -j +1 +j -1 -1 +j +1 +j -1 -1 +j +1 -1 +1 -j -j +1 -1 +1 -j -j +j -1 -j -j -1 +j -1 -j -j -1 +j -j +j +1 +1 +j -j +j +1 +1 -1
-j +1 +1 -j +1 +j -1 -1 +j +1 -1 +1 -j -j -1 +1 -1 +j +j -j +1 +j +j +1 +j -1 -j -j -1 +j -j +j +1 +1 -j +j -j -1 -1 -j +1 +j +j +1
-j +1 +j +j +1 +j -j +j +1 +1 +j -j +j +1 +1 -1 -j +1 +1 -j -1 -j +1 +1 -j +1 -1 +1 -j -j +1 -1 +1 -j -j -j +1 +j +j +1 +j -1 -j
-j -1 -j +j -j -1 -1 +j -j +j +1 +1 -1 -j +1 +1 -j +1 +j -1 -1 +j -1 +1 -1 +j +j +1 -1 +1 -j -j +1 +j -1 -1 +j +1 +j -1 -1 +j +1 -1
+1 -j -j +1 -1 +1 -j -j +j -1 -j -j -1 +j -1 -j -j -1 +j -j +j +1 +1 +j -j +j +1 +1 -j +1 +j +j +1 +j -1 -j -j -1 +j -j +j +1 +1 -j +j
-j -1 -1 +1 +j -1 -1 +j -1 -j +1 +1 -j -1 +1 -1 +j +j +1 -1 +1 -j -j +1 +j -1 -1 +j +1 +j -1 -1 +j -1 +1 -1 +j +j -1 +1 -1 +j +j
-j +1 +j +j +1 -j +1 +j +j +1 +j -j +j +1 +1 +j -j +j +1 +1 +1 +j -1 -1 +j -1 -j +1 +1 -j +1 -1 +1 -j -j -1 +1 -1 +j +j -j +1 +j
+j +1 +j -1 -j -j -1 -j +j -j -1 -1 +j -j +j +1 +1 +j -1 -j -j -1 +j -1 -j -j -1 +j -j +j +1 +1 +j -j +j +1 +1 -1 -j +1 +1 -j -1 -j
+1 +1 -j -1 +1 -1 +j +j -1 +1 -1 +j +j +1 +1 -1 -j

FIG. 29

| The Sequence $Seq^{5}_{right}$, 804(k), to be transmitted from left to right, up to down |
|---|
| +1 +1 +j -j +j +1 +1 +j -j +j -1 -1 -j +j -j +1 +1 +j -j +j +j -1 -1 +j +1 +j -1 -1 +j +1 -j +1 +1 -j -1 +j -1 -1 +j +1 +1 +1 +j<br>-j +j -1 -1 -j +j -j -1 -1 -j +j -j -1 -1 -j +j -j -j +1 +1 -j -1 +j -1 -1 +j +1 +j -1 -1 +j +1 +j -1 -1 +j +1 +j +j -1 +1 -1 +j +j -1<br>+1 -1 +j +j -1 +1 -1 -j -j +1 -1 +1 -1 -j -j -1 +j -1 -j -j -1 +j -1 -j -j -1 +j +1 +j +j +1 -j +j +j -1 +1 -1 -j -j +1 -1 +1 +j +j<br>-1 +1 -1 +j +j -1 +1 -1 +1 +j +j +1 -j -1 -j -j -1 +j +1 +j +j +1 -j +1 +j +j +1 -j -j -j +1 -1 +1 -j -j +1 -1 +1 +j +j -1 +1 -1<br>-j -j +1 -1 +1 +1 +j +j +1 -j +1 +j +j +1 -j -1 -j -j -1 +j +1 +j +j +1 -j -j -j +1 -1 +1 +j +j -1 +1 -1 +j +j -1 +1 -1 +j +j -1<br>+1 -1 -1 -j -j -1 +j +1 +j +j +1 -j +1 +j +j +1 -j +1 +j +j +1 -j +1 +1 +j -j +j +1 +1 +j -j +j +1 +1 +j -j +j -1 -1 -j +j -j +j<br>-1 -1 +j +1 +j -1 -1 +j +1 +j -1 -1 +j +1 -j +1 +1 -j -1 +1 +1 +j -j +j -1 -1 -j +j -j +1 +1 +j -j +j +1 +1 +j -j +j -j +1 +1 -j<br>-1 +j -1 -1 +j +1 -j +1 +1 -j -1 -j +1 +1 -j -1 -j -j +1 -1 +1 -j -j +1 -1 +1 +j +j -1 +1 -1 -j -j +1 -1 +1 +1 +j +j +1 -j +1 +j<br>+j +1 -j -1 -j -j -1 +j +1 +j +j +1 -j -j -j +1 -1 +1 +j +j -1 +1 -1 +j +j -1 +1 -1 +j +j -1 +1 -1 -1 -j -j -1 +j +1 +j +j +1 -j +1<br>+j +j +1 -j +1 +j +j +1 -j +1 +1 +j -j +j +1 +1 +j -j +j +1 +1 +j -j +j -1 -1 -j +j -j +j -1 -1 +j +1 +j -1 -1 +j +1 +j -1 -1 +j<br>+1 -j +1 +1 -j -1 +1 +1 +j -j +j -1 -1 -j +j -j +1 +1 +j -j +j +1 +1 +j -j +j -j +1 +1 -j -1 +j -1 -1 +j +1 -j +1 +1 -j -1 -j +1<br>+1 -j -1 +1 +1 +j -j +j +1 +1 +j -j +j -1 -1 -j +j -j +1 +1 +j -j +j +j -1 -1 +j +1 +j -1 -1 +j +1 -j +1 +1 -j -1 +j -1 -1 +j +1<br>+1 +1 +j -j +j -1 -1 -j +j -j -1 -1 -j +j -j -1 -1 -j +j -j -j +1 +1 -j -1 +j -1 -1 +j +1 +j -1 -1 +j +1 +j -1 -1 +j +1 +j +j -1 +1<br>-1 +j +j -1 +1 -1 +j +j -1 +1 -1 -j -j +1 -1 +1 -1 -j -j -1 +j -1 -j -j -1 +j -1 -j -j -1 +j +1 +j +j +1 -j +j +j -1 +1 -1 -j -j +1 -1<br>+1 +j +j -1 +1 -1 +j +j -1 +1 -1 +1 +j +j +1 -j -1 -j -j -1 +j +1 +j +j +1 -j +1 +j +j +1 -j +j +j -1 +1 -1 +j +j -1 +1 -1 -j -j<br>+1 -1 +1 +j +j -1 +1 -1 -1 -j -j -1 +j -1 -j -j -1 +j +1 +j +j +1 -j -1 -j -j -1 +j +j +j -1 +1 -1 -j -j +1 -1 +1 -j -j +1 -1 +1 -j -j<br>+1 -1 +1 +1 +j +j +1 -j -1 -j -j -1 +j -1 -j -j -1 +j -1 -j -j -1 +j -1 -1 -j +j -j -1 -1 -j +j -j -1 -1 -j +j -j +1 +1 +j -j +j -j +1 +1<br>-j -1 -j +1 +1 -j -1 -j +1 +1 -j -1 +j -1 -1 +j +1 -1 -1 -j +j -j +1 +1 +j -j +j -1 -1 -j +j -j -1 -1 -j +j -j +j -1 -1 +j +1 -j +1 +1<br>-j -1 +j -1 -1 +j +1 +j -1 -1 +j +1 +j -1 +1 +1 |

| The Sequence $Seq^{6}_{right}$, 804(k), to be transmitted from left to right, up to down |
|---|
| -1 -j -j -1 +j +j -1 -1 +j +1 +1 +j +j +1 -j +j -1 -1 +j +1 -j +1 +1 -j -1 -1 -j -j -1 +j +j -1 -1 +j +1 -1 -j -j -1 +j -1 -1 -j +j -j<br>+j +j -1 +1 -1 -1 -1 -j +j -j -j -j +1 -1 +1 -j -j +1 -1 +1 -1 -1 -j +j -j -j -j +1 -1 +1 +1 +1 +j -j +j -j +1 +1 -j -1 +1 +j +j +1<br>-j +j -1 -1 +j +1 +1 +j +j +1 -j -1 -j -j -1 +j -j +1 +1 -j -1 +1 +j +j +1 -j -j +1 +1 -j -1 -j -j +1 -1 +1 +1 +1 +j -j +j -j -j +1<br>-1 +1 -1 -1 -j +j -j -1 -1 -j +j -j -j -j +1 -1 +1 -1 -1 -j +j -j +j +j -1 +1 -1 +j -1 -1 +j +1 +1 +j +j +1 -j -j +1 +1 -j -1 +1 +j<br>+j +1 -j -1 -j -j -1 +j +j -1 -1 +j +1 +1 +j +j +1 -j +j -1 -1 +j +1 +j +j -1 +1 -1 +1 +1 +j -j +j +j +j -1 +1 -1 -1 -1 -j +j -j -<br>1 -1 -j +j -j +j +j -1 +1 -1 -1 -1 -j +j -j -j -j +1 -1 +1 -1 -j -j -1 +j -j +1 +1 -j -1 +1 +j +j +1 -j -j +1 +1 -j -1 +j -1 -1 +j +1<br>-1 -j -j -1 +j -j +1 +1 -j -1 -1 -j -j -1 +j -1 -1 -j +j -j -j -j +1 -1 +1 -1 -1 -j +j -j +j +j -1 +1 -1 +j +j -1 +1 -1 -1 -1 -j +j -j +j<br>+j -1 +1 -1 +1 +1 +j -j +j +j -1 -1 +j +1 +1 +j +j +1 -j -j +1 +1 -j -1 +1 +j +j +1 -j -1 -j -j -1 +j +j -1 -1 +j +1 +1 +j +j +1<br>-j +j -1 -1 +j +1 +j +j -1 +1 -1 +1 +1 +j -j +j +j +j -1 +1 -1 -1 -1 -j +j -j -1 -1 -j +j -j +j +j -1 +1 -1 -1 -1 -j +j -j -j -j +1 -1<br>+1 -1 -j -j -1 +j -j +1 +1 -j -1 +1 +j +j +1 -j -j +1 +1 -j -1 +j -1 -1 +j +1 -1 -j -j -1 +j -j +1 +1 -j -1 -1 -j -j -1 +j -1 -1 -j +j<br>-j -j -j +1 -1 +1 -1 -1 -j +j -j +j +j -1 +1 -1 +j +j -1 +1 -1 -1 -1 -j +j -j +j +j -1 +1 -1 +1 +1 +j -j +j -1 -j -j -1 +j +j -1 -1<br>+j +1 +1 +j +j +1 -j +j -1 -1 +j +1 -j +1 +1 -j -1 -1 -j -j -1 +j +j -1 -1 +j +1 -1 -j -j -1 +j -1 -1 -j +j -j +j +j -1 +1 -1 -1 -1<br>-j +j -j -j -j +1 -1 +1 -j -j +1 -1 +1 -1 -1 -j +j -j -j -j +1 -1 +1 +1 +1 +j -j +j -j +1 +1 -j -1 +1 +j +j +1 -j +j -1 -1 +j +1 +1<br>+j +j +1 -j -1 -j -j -1 +j -j +1 +1 -j -1 +1 +j +j +1 -j -j +1 +1 -j -1 -j -j +1 -1 +1 +1 +1 +j -j +j -j -j +1 -1 +1 -1 -1 -j +j -j<br>-1 -1 -j +j -j -j -j +1 -1 +1 -1 -1 -j +j -j +j +j -1 +1 -1 -j +1 +1 -j -1 -1 -j -j -1 +j +j -1 -1 +j +1 -1 -j -j -1 +j +1 +j +j +1 -j<br>-j +1 +1 -j -1 -1 -j -j -1 +j -j +1 +1 -j -1 -j -j +1 -1 +1 -1 -1 -j +j -j -j -j +1 -1 +1 +1 +1 +j -j +j +1 +1 +j -j +j -j -j +1 -1<br>+1 +1 +1 +j -j +j +j +j -1 +1 -1 +1 +j +j +1 -j +j -1 -1 +j +1 -1 -j -j -1 +j +j -1 -1 +j +1 -j +1 +1 -j -1 +1 +j +j +1 -j +j -1<br>-1 +j +1 +1 +j +j +1 -j +1 +1 +j -j +j +j +j -1 +1 -1 +1 +1 +j -j +j -j -j +1 -1 +1 -j -j +1 -1 +1 +1 +1 +j -j +j -j -j +1 -1 +1<br>-1 -1 -j +j -j -1 -j +1 +1 |

FIG. 30

The Sequence $Seq^{7}_{right}$, 804(k), to be transmitted from left to right, up to down +j +j -1 +1 -1 -j -j +1 -1 +1 -j +1 +1 -j -1 -j +1 +1 -j -1 -1 -1 -j +j -j +1 +1 +j -j +j +1 +j +j +1 -j +1 +j +j +1 -j -1 -1 -j +j
-j +1 +1 +j -j +j +1 +j +j +1 -j +1 +j +j +1 -j +j +j -1 +1 -1 -j -j +1 -1 +1 -j +1 +1 -j -1 -j +1 +1 -j -1 -1 -1 -j +j -j -1 -1 -j
+j -j +1 +j +j +1 -j -1 -j -j -1 +j +j +j -1 +1 -1 +j +j -1 +1 -1 -j +1 +1 -j -1 +j -1 -1 +j +1 -j -j +1 -1 +1 -j -j +1 -1 +1 +j -1
-1 +j +1 -j +1 +1 -j -1 +1 +1 +j -j +j +1 +1 +j -j +j -1 -j -j -1 +j +1 +j +j +1 -j +1 +1 +j -j +j -1 -1 -j +j -j -1 -j -j -1 +j -1
-j -j -1 +j +j +j -1 +1 -1 -j -j +1 -1 +1 -j +1 +1 -j -1 -j +1 +1 -j -1 +j +j -1 +1 -1 -j -j +1 -1 +1 -j +1 +1 -j -1 -j +1 +1 -j -1
+1 +1 +j -j +j -1 -1 -j +j -j -1 -j -j -1 +j -1 -j -j -1 +j +j +j -1 +1 -1 +j +j -1 +1 -1 -j +1 +1 -j -1 +j -1 -1 +j +1 +1 +1 +j -j
+j +1 +1 +j -j +j -1 -j -j -1 +j +1 +j +j +1 -j -1 -1 -j +j -j -1 -1 -j +j -j +1 +j +j +1 -j -1 -j -j -1 +j -j -j +1 -1 +1 -j -j +1 -1
+1 +j -1 -1 +j +1 -j +1 +1 -j -1 -j -j +1 -1 +1 +j +j -1 +1 -1 +j -1 -1 +j +1 +j -1 -1 +j +1 +1 +1 +j -j +j -1 -1 -j +j -j -1 -j
-j -1 +j -1 -j -j -1 +j +1 +1 +j -j +j -1 -1 -j +j -j -1 -j -j -1 +j -1 -j -j -1 +j -j -j +1 -1 +1 +j +j -1 +1 -1 +j -1 -1 +j +1 +j -1
-1 +j +1 +1 +1 +j -j +j +1 +1 +j -j +j -1 -j -j -1 +j +1 +j +j +1 -j -j -j +1 -1 +1 -j -j +1 -1 +1 +j -1 -1 +j +1 -j +1 +1 -j -1
+j +j -1 +1 -1 +j +j -1 +1 -1 -j +1 +1 -j -1 +j -1 -1 +j +1 -1 -1 -j +j -j -1 -1 -j +j -j +1 +j +j +1 -j -1 -j -j -1 +j -j -j +1 -1
+1 +j +j -1 +1 -1 +j -1 -1 +j +1 +j -1 -1 +j +1 +1 +1 +j -j +j -1 -1 -j +j -j -1 -j -j -1 +j -1 -j -j -1 +j +1 +1 +j -j +j -1 -1 -j
+j -j -1 -j -j -1 +j -1 -j -j -1 +j -j -j +1 -1 +1 +j +j -1 +1 -1 +j -1 -1 +j +1 +j -1 -1 +j +1 +1 +1 +j -j +j +1 +1 +j -j +j -1 -j
-j -1 +j +1 +j +j +1 -j -j -j +1 -1 +1 -j -j +1 -1 +1 +j -1 -1 +j +1 -j +1 +1 -j -1 +j +j -1 +1 -1 +j +j -1 +1 -1 -j +1 +1 -j -1
+j -1 -1 +j +1 -1 -1 -j +j -j -1 -1 -j +j -j +1 +j +j +1 -j -1 -j -j -1 +j +1 +1 +j -j +j -1 -1 -j +j -j -1 -j -j -1 +j -1 -j -j -1 +j +j
+j -1 +1 -1 -j -j +1 -1 +1 -j +1 +1 -j -1 -j +1 +1 -j -1 +j +j -1 +1 -1 -j -j +1 -1 +1 -j +1 +1 -j -1 -j +1 +1 -j -1 +1 +1 +j -j
+j -1 -1 -j +j -j -1 -j -j -1 +j -1 -j -j -1 +j +j +j -1 +1 -1 +j +j -1 +1 -1 -j +1 +1 -j -1 +j -1 -1 +j +1 +1 +1 +j -j +j +1 +1 +j
-j +j -1 -j -j -1 +j +1 +j +j +1 -j -1 -1 -j +j -j -1 -1 -j +j -j +1 +j +j +1 -j -1 -j -j -1 +j -j -j +1 -1 +1 -j -j +1 -1 +1 +j -1 -1
+j +1 -j +1 +1 -j -1 +j -j -1 -j The Sequence $Seq^{8}_{right}$, 804(k), to be transmitted from left to right, up to down +1 +1 +j -j +j -j -j +1 -1 +1 +j +j -1 +1 -1 +1 +1 +j -j +j +1 +j +j +1 -j -j +1 +1 -j -1 +j -1 -1 +j +1 +1 +j +j +1 -j +j +j -1
+1 -1 -1 -1 -j +j -j +1 +1 +j -j +j +j +j -1 +1 -1 +j -1 -1 +j +1 -1 -j -j -1 +j +1 +j +j +1 -j +j -1 -1 +j +1 -1 -1 -j +j -j -j -j
+1 -1 +1 -j -j +1 -1 +1 +1 +1 +j -j +j +1 +j +j +1 -j +j -1 -1 +j +1 +j -1 -1 +j +1 -1 -j -j -1 +j -j -j +1 -1 +1 -1 -1 -j +j -j
-1 -1 -j +j -j +j +j -1 +1 -1 +j -1 -1 +j +1 +1 +j +j +1 -j +1 +j +j +1 -j -j +1 +1 -j -1 -j -j +1 -1 +1 -1 -1 -j +j -j +1 +1 +j
-j +j -j -j +1 -1 +1 -j +1 +1 -j -1 -1 -j -j -1 +j +1 +j +j +1 -j -j +1 +1 -j -1 +1 +1 +j -j +j +j +j -1 +1 -1 -j -j +1 -1 +1 +1 +1
+j -j +j +1 +j +j +1 -j +j -1 -1 +j +1 -j +1 +1 -j -1 +1 +j +j +1 -j +j +j -1 +1 -1 -1 -1 -j +j -j -1 -1 -j +j -j -j -j +1 -1 +1 -j
+1 +1 -j -1 +1 +j +j +1 -j +1 +j +j +1 -j +j -1 -1 +j +1 -1 -1 -j +j -j +j +j -1 +1 -1 +j +j -1 +1 -1 +1 +1 +j -j +j +1 +j +j
+1 -j -j +1 +1 -j -1 -j +1 +1 -j -1 -1 -j -j -1 +j -1 -1 -j +j -j +j +j -1 +1 -1 -j -j +1 -1 +1 -1 -1 -j +j -j -1 -j -j -1 +j +j -1 -1
+j +1 -j +1 +1 -j -1 -1 -j -j -1 +j -j -j +1 -1 +1 +1 +1 +j -j +j -1 -1 -j +j -j -j -j +1 -1 +1 -j +1 +1 -j -1 +1 +j +j +1 -j -1 -j
-j -1 +j -j +1 +1 -j -1 +1 +1 +j -j +j +j +j -1 +1 -1 +j +j -1 +1 -1 -1 -1 -j +j -j -1 -j -j -1 +j -j +1 +1 -j -1 -j +1 +1 -j -1 +1
+j +j +1 -j +j +j -1 +1 -1 +1 +1 +j -j +j +1 +1 +j -j +j -j -j +1 -1 +1 -j +1 +1 -j -1 -1 -j -j -1 +j -1 -j -j -1 +j +j -1 -1 +j +1
-1 -1 -j +j -j +j +j -1 +1 -1 -j -j +1 -1 +1 -1 -1 -j +j -j -1 -j -j -1 +j +j -1 -1 +j +1 -j +1 +1 -j -1 -1 -j -j -1 +j -j -j +1 -1 +1
+1 +1 +j -j +j -1 -1 -j +j -j -j -j +1 -1 +1 -j +1 +1 -j -1 +1 +j +j +1 -j -1 -j -j -1 +j -j +1 +1 -j -1 +1 +1 +j -j +j +j +j -1 +1
-1 +j +j -1 +1 -1 -1 -1 -j +j -j -1 -j -j -1 +j -j +1 +1 -j -1 -j +1 +1 -j -1 +1 +j +j +1 -j +j +j -1 +1 -1 +1 +1 +j -j +j +1 +1
+j -j +j -j -j +1 -1 +1 -j +1 +1 -j -1 -1 -j -j -1 +j -1 -j -j -1 +j +j -1 -1 +j +1 -j -j +1 -1 +1 -1 -1 -j +j -j +1 +1 +j -j +j -j -j
+1 -1 +1 -j +1 +1 -j -1 -1 -j -j -1 +j +1 +j +j +1 -j -j +1 +1 -j -1 +1 +1 +j -j +j +j +j -1 +1 -1 -j -j +1 -1 +1 +1 +1 +j -j +j
+1 +j +j +1 -j +j -1 -1 +j +1 -j +1 +1 -j -1 +1 +j +j +1 -j +j +j -1 +1 -1 -1 -1 -j +j -j -1 -1 -j +j -j -j -j +1 -1 +1 -j +1 +1 -j
-1 +1 +j +j +1 -j +1 +j +j +1 -j +j -1 -1 +j +1 -1 -1 -j +j -j +j +j -1 +1 -1 +j +j -1 +1 -1 +1 +1 +j -j +j +1 +j +j +1 -j -j +1
+1 -j -1 -j +1 +1 -j -1 -1 -j -j -1 +j -1 -1 +j -1

FIG. 31

| | |
|---|---|
| CP | IDFT(OFDM EDMG CEF) |

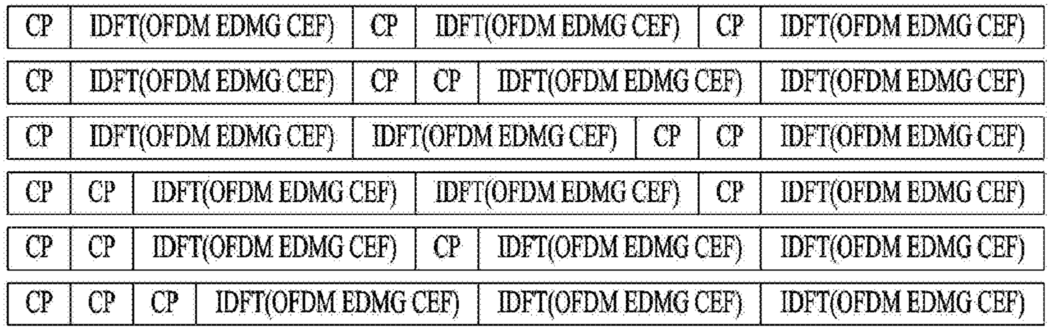

FIG. 34

| CP | IDFT(OFDM EDMG CEF) | CP | IDFT(OFDM EDMG CEF) | CP | IDFT(OFDM EDMG CEF) |
|---|---|---|---|---|---|
| CP | IDFT(OFDM EDMG CEF) | CP | CP | IDFT(OFDM EDMG CEF) | IDFT(OFDM EDMG CEF) |
| CP | IDFT(OFDM EDMG CEF) | IDFT(OFDM EDMG CEF) | CP | CP | IDFT(OFDM EDMG CEF) |
| CP | CP | IDFT(OFDM EDMG CEF) | IDFT(OFDM EDMG CEF) | CP | IDFT(OFDM EDMG CEF) |
| CP | CP | IDFT(OFDM EDMG CEF) | CP | IDFT(OFDM EDMG CEF) | IDFT(OFDM EDMG CEF) |
| CP | CP | CP | IDFT(OFDM EDMG CEF) | IDFT(OFDM EDMG CEF) | IDFT(OFDM EDMG CEF) |

| CP | IDFT(OFDM EDMG CEF) | IDFT(OFDM EDMG CEF) | CP | IDFT(OFDM EDMG CEF) | IDFT(OFDM EDMG CEF) |

| CP | IDFT(OFDM EDMG CEF) | IDFT(OFDM EDMG CEF) | IDFT(OFDM EDMG CEF) | IDFT(OFDM EDMG CEF) |

| CP | CP | CP | IDFT(OFDM EDMG CEF) | CP | IDFT(OFDM EDMG CEF) | CP | IDFT(OFDM EDMG CEF) | CP | IDFT(OFDM EDMG CEF) | CP | IDFT(OFDM EDMG CEF) |
|---|---|---|---|---|---|---|---|---|---|---|---|
| CP | | CP | IDFT(OFDM EDMG CEF) | | IDFT(OFDM EDMG CEF) | | IDFT(OFDM EDMG CEF) | | IDFT(OFDM EDMG CEF) | | IDFT(OFDM EDMG CEF) |

METHOD FOR TRANSMITTING AND RECEIVING SIGNAL IN WIRELESS LAN SYSTEM, AND APPARATUS THEREFOR

CROSS-REFERENCE TO RELATED APPLICATIONS

This application is the National Stage filing under 35 U.S.C. 371 of International Application No. PCT/KR2018/004125, filed on Apr. 9, 2018, which claims the benefit of U.S. Provisional Application No. 62/531,446, filed on Jul. 12, 2017, and 62/535,242, filed on Jul. 21, 2017, the contents of which are all hereby incorporated by reference herein in their entirety.

BACKGROUND OF THE INVENTION

Field of the Invention

The present invention relates to a method for transmitting and receiving signals by a station in a wireless LAN system and an apparatus for the method.

More specifically, the descriptions given below are related to a method for a station operating in the Orthogonal Frequency Division Multiplexing (OFDM) mode to transmit and receive signals including a training field and an apparatus for the method.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

The present invention proposes a method for transmitting and receiving signals including a trading field by a station operating in the OFDM mode and an apparatus for the method.

To solve the problem above, a method for transmitting signals from a first station (STA) to a second STA in a WLAN system according to one aspect of the present invention comprises generating a training field including a training subfield per space-time stream based on a basic training subfield per space-time stream and the total number of space-time streams, where the basic training subfield per space-time stream is configured of/includes M (where M is a natural number) Orthogonal Frequency Division Multiplexing (OFDM) symbols based on information indicated by/included in a header field; and transmitting a signal including the header field and the training field to the second STA through a corresponding space-time stream.

To solve the problem above, a station device for transmitting signals in a WLAN system according to another aspect of the present invention comprises a transceiver having one or more Radio Frequency (RF) chains and transmitting and receiving signals to and from other station device; and a processor being coupled to the transceiver and processing signals transmitted and received to and from the other station device, wherein the processor is configured to generate a training field including a training subfield per space-time stream based on a basic training subfield per space-time stream and the total number of space-time streams, where the basic training subfield per space-time stream is configured of/includes M (where M is a natural number) Orthogonal Frequency Division Multiplexing (OFDM) symbols based on information indicated by/included in a header field; and to transmit a signal including the header field and the training field to the second STA through a corresponding space-time stream.

In the composition above, the basic training subfield per space-time stream may be configured of/may include one, two, or four OFDM symbols based on the information indicated by/included in the header field.

At this time, one OFDM symbol included in the one, two, or four OFDM symbols may include a guard interval with a length of 72.72 ns or cyclic prefix (CP).

Also, the header field may include an Enhanced Directional Multi Gigabit (EDMG) training subfield sequence length field which indicates/including information on the OFDM symbol length of the basic training subfield per space-time stream.

In this case, when the EDMG training subfield sequence length field indicates 0, the basic training subfield per space-time stream may be configured of two OFDM symbols; when the EDMG training subfield sequence length field indicates 1, the basic training subfield per space-time stream may be configured of four OFDM symbols; and when the EDMG training subfield sequence length field indicates 2, the basic training subfield per space-time stream may be configured of/may include one OFDM symbol.

Also, the training subfield per space-time stream may be configured by using/based on the basic training subfield per space-time stream based on a rule determined according to/based on the total number of space-time streams.

As one example, when the total number of space-time streams is 1, the training subfield per space-time stream may be configured based on the equation given below.

$$OFDM\_TRN\_subfield\_1=[OFDM\_TRN\_basic\_1,-OFDM\_TRN\_basic\_1], \quad \text{[Equation]}$$

where OFDM_TRN_subfield_N represents/is a training subfield for a space-time stream for an index N, and OFDM_TRN_basic_N represents/is a basic training subfield for the space-time stream for an index N.

As another example, when the total number of space-time streams is 2, the training subfield per space-time stream may be configured based on the equation given below.

OFDM_TRN_subfield_1=[OFDM_TRN_basic_1,−OFDM_TRN_basic_1],

OFDM_TRN_subfield_2=[OFDM_TRN_basic_2, OFDM_TRN_basic_2], [Equation]

where OFDM_TRN_subfield_N represents/is a training subfield for a space-time stream for an index N, and OFDM_TRN_basic_N represents/is a basic training subfield for the space-time stream for an index N.

As yet another example, when the total number of space-time stream is 3, the training subfield per space-time stream may be configured based on the equation given below.

OFDM_TRN_subfield_1=[OFDM_TRN_basic_1,−OFDM_TRN_basic_1,OFDM_TRN_basic_1],

OFDM_TRN_subfield_2=[OFDM_TRN_basic_2,−$w_3^{1}$*OFDM_TRN_basic_2, $w_3^{2}$*OFDM_TRN_basic_2], OFDM_TRN_subfield_3=[OFDM_TRN_basic_3,−$w_3^{3}$*OFDM_TRN_basic_3, $w_3^{4}$*OFDM_TRN_basic_3],[Equation]

where OFDM_TRN_subfield_N represents/is a training subfield for a space-time stream for an index N, OFDM_TRN_basic_N represents/is a basic training subfield for the space-time stream for an index N, and $w_3$=exp(−j*2*pi/3) is applied.

As still another example, when the total number of space-time streams is 4, the training subfield per space-time stream may be configured based on the equation given below.

OFDM_TRN_subfield_1=[OFDM_TRN_basic_1,−OFDM_TRN_basic_1,OFDM_TRN_basic_1, OFDM_TRN_basic_1], OFDM_TRN_subfield_2=[OFDM_TRN_basic_2, OFDM_TRN_basic_2,−OFDM_TRN_basic_2, OFDM_TRN_basic_2], OFDM_TRN_subfield_3=[OFDM_TRN_basic_3, OFDM_TRN_basic_3,OFDM_TRN_basic_3,−OFDM_TRN_basic_3], OFDM_TRN_subfield_4=[−OFDM_TRN_basic_4, OFDM_TRN_basic_4,OFDM_TRN_basic_4, OFDM_TRN_basic_4], [Equation]

where OFDM_TRN_subfield N represents/is a training subfield for a space-time stream for an index N, and OFDM_TRN_basic_N represents/is a basic training subfield for the space-time stream for an index N.

As an additional example, when the total number of space-time streams is 5, the training subfield per space-time stream may be configured based on the equation given below.

OFDM_TRN_subfield_1=[OFDM_TRN_basic_1,−OFDM_TRN_basic_1,OFDM_TRN_basic_1, OFDM_TRN_basic_1,OFDM_TRN_basic_1,−OFDM_TRN_basic_1], OFDM_TRN_subfield_2=[OFDM_TRN_basic_2,−$w_6^{1}$*OFDM_TRN_basic_2, $w_6^{2}$*OFDM_TRN_basic_2, $w_6^{3}$*OFDM_TRN_basic_2, $w_6^{4}$*OFDM_TRN_basic_2,−$w_6^{5}$*OFDM_TRN_basic_2], OFDM_TRN_subfield_3=[OFDM_TRN_basic_3,−$w_6^{2}$*OFDM_TRN_basic_3, $w_6^{4}$*OFDM_TRN_basic_3, $w_6^{6}$*OFDM_TRN_basic_3, $w_6^{8}$*OFDM_TRN_basic_3−$w_6^{10}$*OFDM_TRN_basic_3], OFDM_TRN_subfield_4=[OFDM_TRN_basic_4,−$w_6^{3}$*OFDM_TRN_basic_4, $w_6^{6}$*OFDM_TRN_basic_4, $w_6^{9}$*OFDM_TRN_basic_4, $w_6^{12}$*OFDM_TRN_basic_4−$w_6^{15}$*OFDM_TRN_basic_4], OFDM_TRN_subfield_5=[OFDM_TRN_basic_5,−$w_6^{4}$*OFDM_TRN_basic_5, $w_6^{8}$*OFDM_TRN_basic_5, $w_6^{12}$*OFDM_TRN_basic_5, $w_6^{16}$*OFDM_TRN_basic_5−$w_6^{20}$*OFDM_TRN_basic_5], [Equation]

where OFDM_TRN_subfield_N represents/is a training subfield for a space-time stream for an index N, OFDM_TRN_basic_N represents/is a basic training subfield for the space-time stream for an index N, and $w_6$=exp(−j*2*pi/6) is applied.

As yet another additional example, when the total number of space-time streams is 6, the training subfield per space-time stream may be configured based on the equation given below.

OFDM_TRN_subfield_1=[OFDM_TRN_basic_1,−OFDM_TRN_basic_1,OFDM_TRN_basic_1, OFDM_TRN_basic_1,OFDM_TRN_basic_1,−OFDM_TRN_basic_1], OFDM_TRN_subfield_2=[OFDM_TRN_basic_2,−$w_6^{1}$*OFDM_TRN_basic_2, $w_6^{2}$*OFDM_TRN_basic_2, $w_6^{3}$*OFDM_TRN_basic_2, $w_6^{4}$*OFDM_TRN_basic_2,−$w_6^{5}$*OFDM_TRN_basic_2], OFDM_TRN_subfield_3=[OFDM_TRN_basic_3,−$w_6^{2}$*OFDM_TRN_basic_3, $w_6^{4}$*OFDM_TRN_basic_3, $w_6^{6}$*OFDM_TRN_basic_3, $w_6^{8}$*OFDM_TRN_basic_3−$w_6^{10}$*OFDM_TRN_basic_3], OFDM_TRN_subfield_4=[OFDM_TRN_basic_4,−$w_6^{3}$*OFDM_TRN_basic_4, $w_6^{6}$*OFDM_TRN_basic_4, $w_6^{9}$*OFDM_TRN_basic_4, $w_6^{2}$*OFDM_TRN_basic_4−$w_6^{15}$*OFDM_TRN_basic_4], OFDM_TRN_subfield_5=[OFDM_TRN_basic_5,−$w_6^{4}$*OFDM_TRN_basic_5, $w_6^{8}$*OFDM_TRN_basic_5, $w_6^{12}$*OFDM_TRN_basic_5, $w_6^{16}$*OFDM_TRN_basic_5−$w_6^{20}$*OFDM_TRN_basic_5], OFDM_TRN_subfield_6=[OFDM_TRN_basic_6,−$w_6^{5}$*OFDM_TRN_basic_6, $w_6^{10}$*OFDM_TRN_basic_6, $w_6^{15}$*OFDM_TRN_basic_6, $w_6^{20}$*OFDM_TRN_basic_6−$w_6^{25}$*OFDM_TRN_basic_6], [Equation]

where OFDN_TRN_subfield_N represents/is a training subfield for a space-time stream for an index N, OFDM_TRN_basic_N represents/is a basic training subfield for a space-time stream for an index N, and $w_6$=exp(−j*2*pi/6) is applied.

As still another additional example, when the total number of space-time streams is 7, the training subfield per space-time stream may be configured based on the equation given below.

OFDM_TRN_subfield_1=[OFDM_TRN_basic_1,–OFDM_TRN_basic_1,OFDM__TRN_basic_1,OFDM_TRN_basic_1,OFDM_TRN_basic_1,–OFDM_TRN_basic_1,OFDM_TRN_basic_1OFDM_TRN_basic_1], OFDM_TRN_subfield_2=[OFDM_TRN_basic_2,OFDM_TRN_basic_2,–OFDM_TRN_basic_2,OFDM_TRN_basic_2,OFDM_TRN_basic_2,OFDM_TRN_basic_2,–OFDM_TRN_basic_2,OFDM_TRN_basic_2], OFDM_TRN_subfield_3=[OFDM_TRN_basic_3,OFDM_TRN_basic_3,OFDM_TRN_basic_3,–OFDM_TRN_basic_3,OFDM_TRN_basic_3,OFDM_TRN_basic_3,OFDM_TRN_basic_3,–OFDM_TRN_basic_3], OFDM_TRN_subfield_4=[–OFDM_TRN_basic_4,OFDM_TRN_basic_4,OFDM_TRN_basic_4,OFDM_TRN_basic_4,–OFDM_TRN_basic_4,OFDM_TRN_basic_4,OFDM_TRN_basic_4,OFDM_TRN_basic_4], OFDM_TRN_subfield_5=[OFDM_TRN_basic_5,–OFDM_TRN_basic_5,OFDM_TRN_basic_5,OFDM_TRN_basic_5,–OFDM_TRN_basic_5,OFDM_TRN_basic_5,–OFDM_TRN_basic_5,–OFDM_TRN_basic_5], OFDM_TRN_subfield_6=[OFDM_TRN_basic_6,OFDM_TRN_basic_6,–OFDM_TRN_basic_6,OFDM_TRN_basic_6,–OFDM_TRN_basic_6,–OFDM_TRN_basic_6,OFDM_TRN_basic_6,–OFDM_TRN_basic_6], OFDM_TRN_subfield_7=[OFDM_TRN_basic_7,OFDM_TRN_basic_7,OFDM_TRN_basic_7,–OFDM_TRN_basic_7,–OFDM_TRN_basic_7,–OFDM_TRN_basic_7,–OFDM_TRN_basic_7,OFDM_TRN_basic_7], [Equation]

wherein OFDM_TRN_subfield_N represents/is a training subfield for a space-time stream for an index N, and OFDM_TRN_basic_N represents/is a basic training subfield for the space-time stream for an index N.

As a further example, when the total number of space-time streams is 8, the training subfield per space-time stream may be configured based on the equation given below.

OFDM_TRN_subfield_1=[OFDM_TRN_basic_1,–OFDM_TRN_basic_1,OFDM__TRN_basic_1,OFDM_TRN_basic_1,OFDM_TRN_basic_1,–OFDM_TRN_basic_1,OFDM_TRN_basic_1,OFDM_TRN_basic_1], OFDM_TRN_subfield_2=[OFDM_TRN_basic_2,OFDM_TRN_basic_2,–OFDM_TRN_basic_2,OFDM_TRN_basic_2,OFDM_TRN_basic_2,OFDM_TRN_basic_2,–OFDM_TRN_basic_2,OFDM_TRN_basic_2], OFDM_TRN_subfield_3=[OFDM_TRN_basic_3,OFDM_TRN_basic_3,OFDM_TRN_basic_3,–OFDM_TRN_basic_3,OFDM_TRN_basic_3,OFDM_TRN_basic_3,OFDM_TRN_basic_3,–OFDM_TRN_basic_3], OFDM_TRN_subfield_4=[–OFDM_TRN_basic_4,OFDM_TRN_basic_4,OFDM_TRN_basic_4,OFDM_TRN_basic_4,–OFDM_TRN_basic_4,OFDM_TRN_basic_4,OFDM_TRN_basic_4,OFDM_TRN_basic_4], OFDM_TRN_subfield_5=[OFDM_TRN_basic_5,–OFDM_TRN_basic_5,OFDM_TRN_basic_5,OFDM_TRN_basic_5,–OFDM_TRN_basic_5,OFDM_TRN_basic_5,–OFDM_TRN_basic_5,–OFDM_TRN_basic_5], OFDM_TRN_subfield_6=[OFDM_TRN_basic_6,OFDM_TRN_basic_6,–OFDM_TRN_basic_6,OFDM_TRN_basic_6,–OFDM_TRN_basic_6,–OFDM_TRN_basic_6,OFDM_TRN_basic_6,–OFDM_TRN_basic_6], OFDM_TRN_subfield_7=[OFDM_TRN_basic_7,OFDM_TRN_basic_7,OFDM_TRN_basic_7,–OFDM_TRN_basic_7,–OFDM_TRN_basic_7,–OFDM_TRN_basic_7,–OFDM_TRN_basic_7,OFDM_TRN_basic_7], OFDM_TRN_subfield_8=[–OFDM_TRN_basic_8,OFDM_TRN_basic_8,OFDM_TRN_basic_8,OFDM_TRN_basic_8,OFDM_TRN_basic_8,–OFDM_TRN_basic_8,–OFDM_TRN_basic_8,–OFDM_TRN_basic_8], [Equation]

wherein OFDM_TRN_subfield_N represents/is a training subfield for a space-time stream for an index N, and OFDM_TRN_basic_N represents/is a basic training subfield for the space-time stream for an index N.

In the composition above, the basic training subfield per space-time stream may be configured of/may include a sequence having a different length in the frequency region according to the number of contiguous channels through which the signal is transmitted.

To solve the problem above, a method for receiving signals by a first station (STA) from a second STA in a WLAN system according to yet another aspect of the present invention comprises receiving a header field included in a transmitted signal; determining the number of Orthogonal Frequency Division Multiplexing (OFDM) symbols of a basic training subfield per space-time stream based on information indicated by/included in the header field; and receiving a training field including a training subfield per space-time stream configured based on the basic training subfield per space-time stream configured of a total number of space-time streams and the number of determined OFDM symbols through a corresponding space-time stream.

To solve the problem above, a station device for receiving signals in a WLAN system according to still another aspect of the present invention comprises a transceiver having one or more Radio Frequency (RF) chains and transmitting and receiving signals to and from other station device; and a processor being coupled to the transceiver and processing signals transmitted and received to and from the other station device, wherein the processor is configured to receive a header field included in a transmitted signal; to determine the number of Orthogonal Frequency Division Multiplexing (OFDM) symbols of a basic training subfield per space-time stream based on information indicated by/included in the header field; and to receive a training field including a training subfield per space-time stream configured based on a basic training subfield per space-time stream configured of a total number of space-time streams and the number of determined OFDM symbols through a corresponding space-time stream.

The advantageous effect that may be achieved from the present invention are not limited to those described above, and it should be clearly understood by those skilled in the art to which the present invention belongs that other effects not mentioned in this document may be achieved from the descriptions given below.

Through the configuration described above, a station operating in the OFDM mode according to the present invention may transmit and receive signals including a training field.

In particular, according to the present invention, a station may transmit and receive signals including a training field in the OFDM mode which may be aligned with a training field composition in the SC mode.

The effect that can be obtained from the present invention is not limited to the above-described effects and the other effects will be understood by those skilled in the art from the following description.

BRIEF DESCRIPTION OF THE DRAWINGS

The appended drawings of this specification are presented to provide a further understanding of the present invention and are incorporated in and constitute a part of this application, illustrate embodiments of the invention and serve to explain the principle of the invention along with the description of the present invention.

FIGS. 11 to 30 illustrate an EDMG-CEF sequence or a training sequence per space-time stream which may be applied to the present invention.

FIG. 31 illustrates a TRN subfield structure corresponding to one OFDM symbol.

FIG. 34 illustrates a TRN subfield structure corresponding to three OFDM symbols.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System

1-1. General Wireless LAN (WLAN) System

Figure 1:
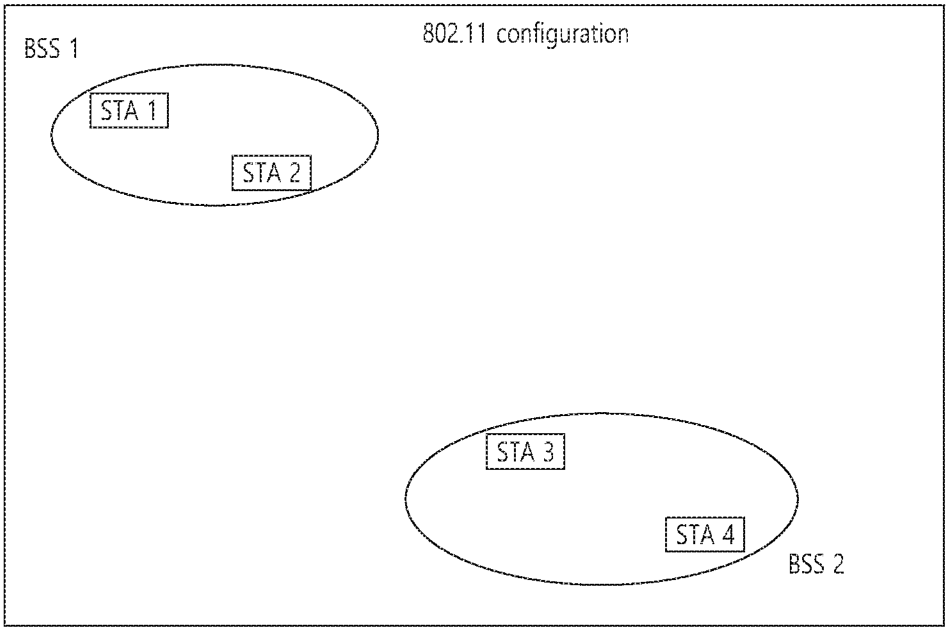
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
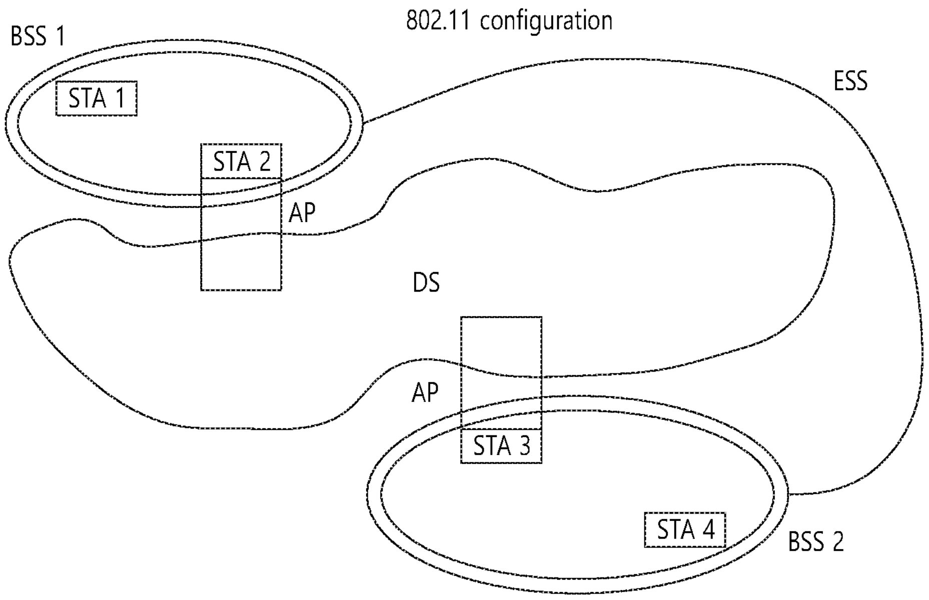
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
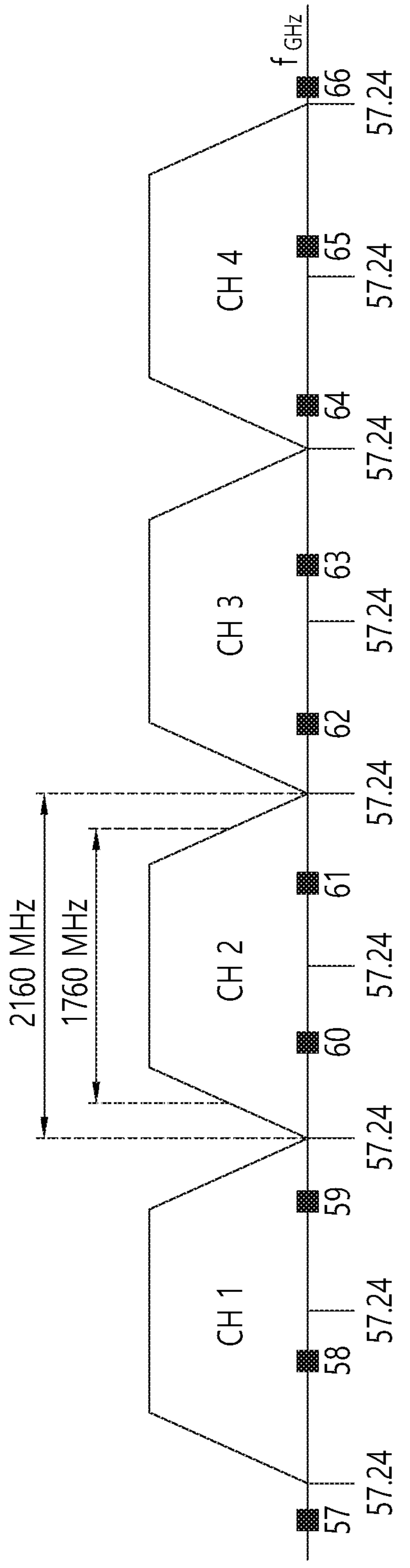
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage in all regions, Channel 2 may be used as a default channel. Channel 2 and Channel 3 may be used in most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
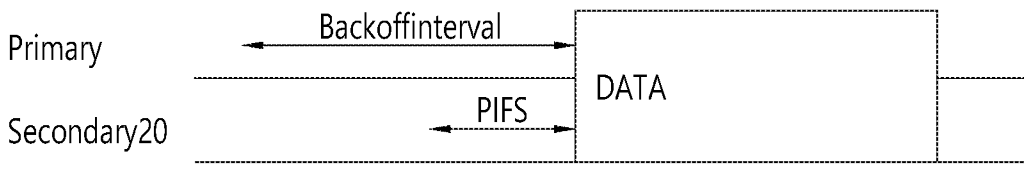
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
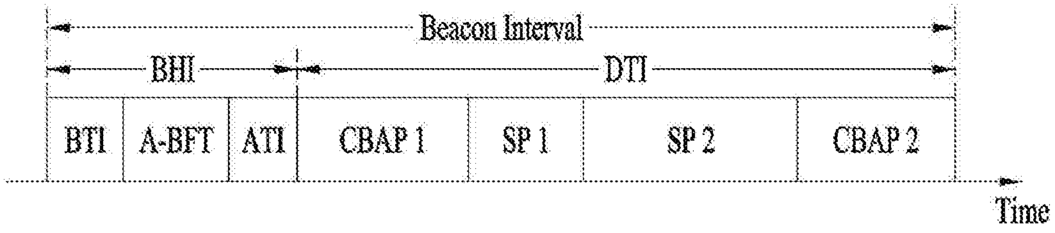
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
|---|---|---|
| Control PHY | 0 | |
| Single carrier PHY | 1 . . . 12 | (low power SC PHY) |
| (SC PHY) | 25 . . . 31 | |
| OFDM PHY | 13 . . . 24 | |

Such modulation modes may be used for satisfying different requirements (e.g., high throughput or stability). Depending upon the system, among the modulation modes presented above, only some of the modulation modes may be supported.

Figure 6:
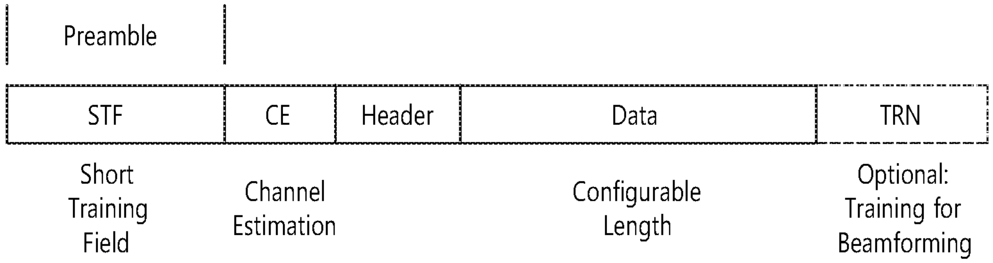
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
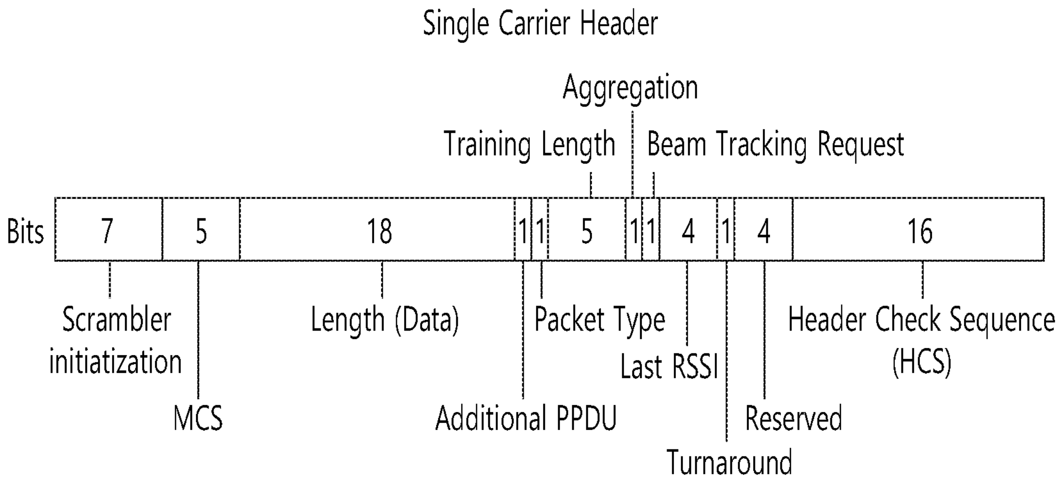
FIG. 7 and FIG. 8 are diagrams describing a configuration of a header field of the radio frame shown in FIG. 6.
Figure 8:
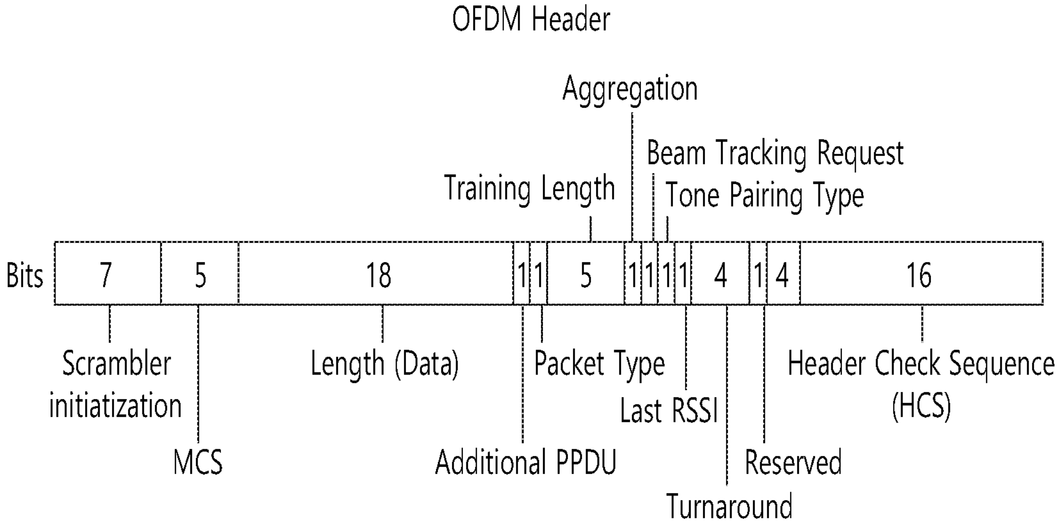

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as int he case of FIG. 7, in the description presented below, such reserved bits may also be used.

As described above, the IEEE 802.11 ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

Figure 9:
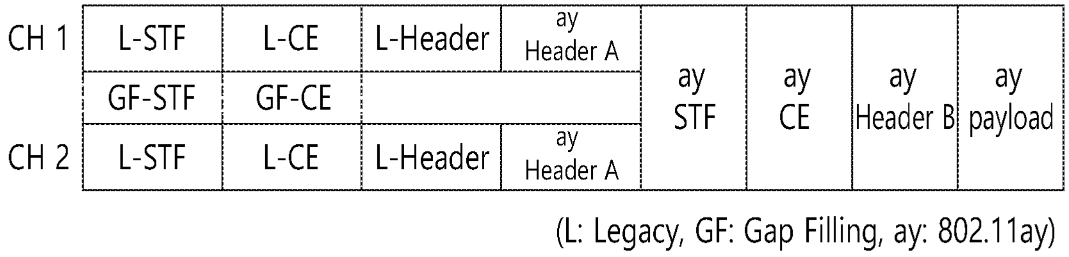
FIG. 9 is a diagram showing a PPDU structure that can be applied to the present invention.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
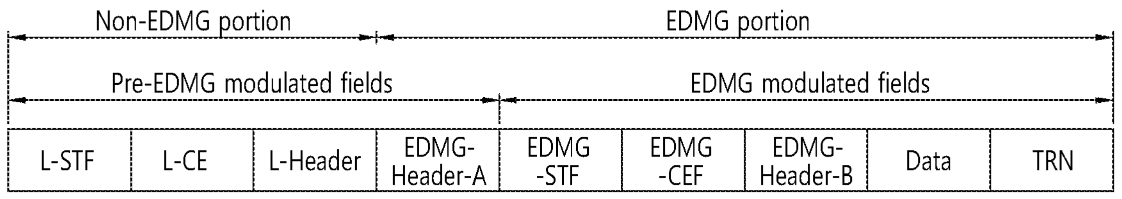
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The preamble is a part of the PPDU that is used for packet detection, AGC, frequency offset estimation, synchronization, indication of modulation (SC or OFDM) and channel estimation. The format of the preamble is common to both OFDM packets and SC packets. The preamble is configured of two parts: the Short Training field and the Channel Estimation field).

3. Embodiment which May be Applied to the Present Invention

In what follows, a method for composing a TRN subfield in the OFDM mode based on the aforementioned composition (namely a TRN subfield for EDMG OFDM PPDU) and a method for transmitting and receiving signals including the TRN subfield based the composition method will be described in detail.

Now, a TRN subfield structure in the OFDM mode which may be applied to the present invention will be first described in detail.

3.1 TRN Subfield in the OFDM Mode

3.1.1. Sequence of OFDM TRN Subfield

According to the present invention, the TRN subfield for EDMG OFDM PPDU may be configured by using/based on the EDMG CEF in the OFDM mode or EDMG STF in the OFDM mode. Similarly, by taking into account Peak to Average Power Ratio (PAPR) performance, the TRN subfield for EMDG OFDM PPDU may be configured by using/based on a sequence with good PAPR performance.

First, the EDMG CEF field which may be applied to the present invention will be described in detail as follows.

The structure of the EDMG-CEF field depends on the number of contiguous 2.16 GHz channels through which an EDMG PPDU is transmitted and the number, $i_{STS}$, of space-time streams.

First, $Seq_{left,N}^{iSTS}$ and $Seq_{right,N}^{iSTS}$ sequences of length N used for definition of the EDMG-CEF field are defined as shown in FIGS. 11 to 30 depending on the value of N. Here, N may have one of the values 176, 385, 595, and 804.

FIG. 11 illustrates $Seq_{left,176}^{iSTS}$ per space-time stream, and FIG. 12 illustrates $Seq_{right,176}^{iSTS}$ per space-time stream.

FIGS. 13 and 14 illustrate $Seq_{left,385}^{iSTS}$ per space-time stream; and FIGS. 15 and 16 illustrate $Seq_{right,385}^{iSTS}$ per space-time stream.

FIGS. 17 to 19 illustrate $Seq_{left,595}^{iSTS}$ per space-time stream; and FIGS. 20 to 22 illustrate $Seq_{right,595}^{iSTS}$ per space-time stream.

FIGS. 23 to 26 illustrate $Seq_{left,804}^{iSTS}$ per space-time stream; and FIGS. 27 to 30 illustrate $Seq_{right,804}^{iSTS}$ per space-time stream.

At this time, for transmission of an EDMG PPDU in the EDMG OFDM mode over a 2.16 GHz channel, the EDMG-CEF sequence in the frequency domain for the i-th space-time stream may be defined by the equation below. At this time, $Seq_{left,176}^{iSTS}$ and $Seq_{right,176}^{iSTS}$ may be defined as shown in FIGS. 11 and 12.

$$\text{EDMG-CEF}^{iSTS}_{-177,177}=[\text{Seq}^{iSTS}_{left,176},0,0,0,\text{Seq}^{iSTS}_{right,176}],\ \text{for } i_{STS}=1,2,3,4,5,6,7,8 \qquad \text{[Equation 1]}$$

For transmission of an EDMG PPDU in the EDMG OFDM mode over a 4.32 GHz channel, the EDMG-CEF sequence in the frequency domain for the i-th space-time sequence may be defined by the equation below. At this time, $Seq_{left,385}^{iSTS}$ and $Seq_{right,385}^{iSTS}$ may be defined as shown in FIGS. 13 to 16.

$$\text{EDMG-CEF}^{iSTS}_{-386,386}=[\text{Seq}^{iSTS}_{left,385},0,0,0,\text{Seq}^{iSTS}_{right,385}],\ \text{for } i_{STS}=1,2,3,4,5,6,7,8 \qquad \text{[Equation 2]}$$

For transmission of an EDMG PPDU in the EDMG OFDM mode over a 6.48 GHz channel, the EDMG-CEF sequence in the frequency domain for the i-th space-time sequence may be defined by the equation below. At this time, $Seq_{left,595}^{iSTS}$ and $Seq_{right,595}^{iSTS}$ may be defined as shown in FIGS. 17 to 22.

$$\text{EDMG-CEF}^{iSTS}_{-596,596}=[\text{Seq}^{iSTS}_{left,595},0,0,0,\text{Seq}^{iSTS}_{right,595}],\ \text{for } i_{STS}=1,2,3,4,5,6,7,8 \qquad \text{[Equation 3]}$$

For transmission of an EDMG PPDU in the EDMG OFDM mode over an 8.64 GHz channel, the EDMG-CEF sequence in the frequency domain for the i-th space-time sequence may be defined by the equation below. At this time, $Seq_{left,804}^{iSTS}$ and $Seq_{right,804}^{iSTS}$ may be defined as shown in FIGS. 23 to 30.

$$\text{EDMG-CEF}^{iSTS}_{-805,805}=[\text{Seq}^{iSTS}_{left,804},0,0,0,\text{Seq}^{iSTS}_{right,804}],\ \text{for } i_{STS}=1,2,3,4,5,6,7,8 \qquad \text{[Equation 4]}$$

When the OFDM sampling rate $F_S$ is $N_{CB}$×2.64 GHz, and sample time $T_S=1/F_S$, transmit waveform of the EDMG-CEF field in the time domain may be defined by the equation given below. Here $N_{CB}$ represents/is the number of contiguous or bonded (or combined) channels.

$$r^{n,i_{TX}}_{EDMG-CEF}(qT_s) = \frac{1}{\sqrt{N_{STS}\cdot N^{Tone}_{EDMG-CEF}}} w(qT_s)\cdot \qquad \text{[Equation 5]}$$

-continued $$\sum_{k=-N_{SR}}^{N_{SR}} \sum_{i_{STS}=1}^{N_{STS}} [Q_k]_{i_{TX},i_{STS}} [P_{EDMG-CEF}]_{i_{STS},n} EDMG-CEF_k^{i_{STS}} \exp(j2\pi k\Delta_F(qT_s - T_{GI\ long})),$$
$$1 \le n \le N_{EDMG-CEF}^{N_{STS}}$$

Each parameter in the equation above may be defined as follows.

$N_{EDMG-CEF}^{Tone}=N_{ST}-N_{DC}$ is the total number of active tones [Equation 6]

$Q_k$ is the spatial mapping matrix per $k^{th}$ subcarrier $P_{EDMG-CEF}$ is the EDMG-CEF mapping matrix defined below $N_{EDMG-CEF}^{N_{STS}}$ is the number of OFDM symbols in the EDMG-CEF for a given total number of space-time streams $N_{STS}$ defined below $[\ ]_{m,n}$ is a matrix element from $m^{th}$ row and $n^{th}$ column $w(qT_s)$ is the window function applied to smooth the transitions between consecutive OFDM symbols Its definition is implementation dependent.

In what follows, for the convenience of descriptions, a structure proposed by the present invention will be described in detail with reference to an example where a sequence of an EDMG-CEF field is utilized as a sequence of the OFDM TRN subfield. However, it should be noted that according to another embodiment of the present invention, the 'EDMG-CEF' sequence in what follows may be replaced with another sequence (for example, an EMDG-STF sequence or another sequence exhibiting decent PAPR performance).

3.1.2. Symbol Length of OFDM TRN Subfield

In the conventional systems, only the TRN subfield in the SC mode rather than OFDM mode is defined. At this time, the TRN subfield in the SC mode may have a TRN subfield sequence having a different length depending on the value of TRN_BL. At this time, the TRN_BL value may be configured differently according to the 'TRN Subfield Sequence Length field' value of the EDMG Header-A field. As one example, when the TRN Subfield Sequence Length field of the EDMG-Header-A is 0, TRN_BL is set to 128; when the TRN Subfield Sequence Length field of the EDMG-Header-A is 1, TRN_BL is set to 256; and when the TRN Subfield Sequence Length field of the EDMG-Header-A is 2, TRN_BL is set to 64. At this time, when the TRN Subfield Sequence Length field of the EDMG-Header-A is 0, it may indicate 'Normal' while, when it is 2, it may indicate 'Short'.

Here, the TRN sequence in the SC mode may be configured of 6 Golay complementary sequences Ga and Gb as shown in the equation given below.

$$TRN^{i}_{basic}=[Ga^{i}_{N},-Gb^{i}_{N},Ga^{i}_{N},Gb^{i}_{N},Ga^{i}_{N},-Gb^{i}_{N}] \qquad \text{[Equation 7]}$$

In the equation above, i may represent a space-time stream or a transmit chain.

As described above, the length of the TRN subfield may be configured differently depending on the TRN Subfield Sequence Length field of the EDMG Header-A. Accordingly, duration of a TRN subfield sequence for each case may be determined as follows.

When TRN Subfield Sequence Length field of EDMG-Header-A is 0, $6*128*T_C=768*T_C$.

When TRN Subfield Sequence Length field of EDMG-Header-A is 1, $6*256*T_C=1536*T_C$.

When TRN Subfield Sequence Length field of EDMG-Header-A is 2, $6*64*T_C=384*T_C$.

Here, $T_C$ denotes a chip rate of the SC mode and may be 0.57 ns.

If duration of the TRN subfield sequence in the SC mode described above is expressed in terms of $T_S$, OFDM sample time parameter, it may be expressed as follows. ($T_C=T_S*3/2$, $T_S=0.38$ ns).

When TRN Subfield Sequence Length field of EDMG-Header-A is 0, $6*128*T_C=1152*T_S$ When TRN Subfield Sequence Length field of EDMG-Header-A is 1, $6*256*T_C=2304*T_S$ When TRN Subfield Sequence Length field of EDMG-Header-A is 2, $6*64*T_C=576*T_S$ As described above, conventional systems do not define symbol length of the TRN subfield in the OFDM mode. In this regard, examples which may be used as the symbol length of the TRN subfield in the OFDM mode for the 11ay system to which the present invention may be applied will be described in detail.

The 802.11ay system to which the present invention may be applied may support signal transmission and reception through a channel bonded with one to four channels. Therefore, according to the number of bonded channels, a basic OFDM TRN subfield, an OFDM TRN subfield corresponding to one OFDM symbol, which may be applied to the present invention may be composed as follows.

(1) Single Channel

In this case, the sample frequency $F_S$ in the OFDM mode is 2.64 GHz, and sample time $T_S$ is 0.38 ns ($=T_C*⅔$).

A transmitter applies a 512-point Inverse Discrete Fourier Transform (IDFT) on the OFDM EDMG-CEF and inserts cyclic prefix to compose the OFDM TRN subfield.

At this time, the length of the inserted CP (or the number of samples) may correspond to 48, 96, 192, 32, 64, or 128 samples. In other words, the length of the inserted CP in the time domain may correspond to $48*T_S$, $96*T_S$, $192*T_S$ (=72.72 ns), $32*T_S$, $64*T_S$, or $128*T_S$. In this case, the total number of samples for one OFDM symbol may be 560, 608, 704, 544, 576, or 640. Also, in this case, the length of each TRN subfield in the time domain may be $560*T_S$, $608*T_S$, $704*T_S$, $544*T_S$, $576*T_S$, or $640*T_S$.

(2) 2 Channel Bonding

In this case, the sample frequency $F_S$ in the OFDM mode is 5.28 GHz, and sample time $T_S$ is 0.19 ns ($=T_C/3$).

A transmitter applies a 512-point IDFT on the OFDM EDMG-CEF and inserts cyclic prefix to compose the OFDM TRN subfield.

At this time, the length of the inserted CP (or the number of samples) may correspond to 96, 192, 384, 64, 128, or 256 samples. In other words, the length of the inserted CP in the time domain may correspond to $96*T_S$, $192*T_S$, $384*T_S$ (=72.72 ns), $64*T_S$, $128*T_S$, or $256*T_S$. In this case, the total number of samples for one OFDM symbol may be 1120, 1216, 1408, 1088, 1152, or 1280. Also, in this case, the length of each TRN subfield in the time domain may be $1120*T_S$, $1216*T_S$, $1408*T_S$, $1088*T_S$, $1152*T_S$, or $1280*T_S$.

(3) 3 Channel Bonding

In this case, the sample frequency $F_S$ in the OFDM mode is 7.92 GHz, and sample time $T_S$ is 0.13 ns ($=2*T_C/9$).

A transmitter applies a 512-point IDFT on the OFDM EDMG-CEF and inserts cyclic prefix to compose the OFDM TRN subfield.

At this time, the length of the inserted CP (or the number of samples) may correspond to 144, 288, 576, 96, 192, or 384 samples. In other words, the length of the inserted CP in the time domain may correspond to $144*T_S$, $288*T_S$, $576*T_S$ (=72.72 ns), $96*T_S$, $192*T_S$, or $384*T_S$. In this case, the total number of samples for one OFDM symbol may be 1680, 1824, 2112, 1632, 1728, or 1920. Also, in this case, the length of each TRN subfield in the time domain may be $1680*T_S$, $1824*T_S$, $2112*T_S$, $1632*T_S$, $1728*T_S$, or $1920*T_S$.

(4) 4 Channel Bonding

In this case, the sample frequency $F_S$ in the OFDM mode is 10.56 GHz, and sample time $T_S$ is 0.09 ns ($=T_C/6$).

A transmitter applies a 2018-point IDFT on the OFDM EDMG-CEF and inserts cyclic prefix to compose the OFDM TRN subfield.

At this time, the length of the inserted CP (or the number of samples) may correspond to 192, 384, 768, 128, 256, or 512 samples. In other words, the length of the inserted CP in the time domain may correspond to $192*T_S$, $384*T_S$, $768*T_S$ (=72.72 ns), $128*T_S$, $256*T_S$, or $512*T_S$. In this case, the total number of samples for one OFDM symbol may be 2240, 2432, 2816, 2176, 2304, or 2560. Also, in this case, the length of each TRN subfield in the time domain may be $2240*T_S$, $2432*T_S$, $2816*T_S$, $2176*T_S$, $2304*T_S$, or $2560*T_S$.

According to the present invention, the transmitter may compose an OFDM TRN subfield corresponding to one OFDM symbol by using the CP+IDFT (OFDM EDMG-CEF) structure according to/based on the total number of CP samples described above.

Also, similarly to the case of SC mode, Header-A field of an EDMG OFDM PPDU may include a field (for example, TRN Subfield Sequence Length field) indicating the length of a TRN field. In what follows, a method for composing a TRN subfield according to the value of the aforementioned field will be described in detail.

In the present invention, the TRN subfield according to the value of the aforementioned field may be configured of repeating the basic TRN subfield (CP+IDFT (OFDM EDMG-CEF)) one to five times. Therefore, in what follows, similarly to the SC mode, a TRN subfield structure (for example, symbol length of the TRN subfield) which may be applied according to the 'TRN Subfield Sequence Length field' value of the EMDG Header-A field will be described in detail.

1) The case where TRN Subfield Sequence Length field of EDMG-Header-A is 0 (TRN_BL is 128, $1152*T_S$)

FIG. 31 illustrates a TRN subfield structure corresponding to one OFDM symbol.

As shown in FIG. 31, if TRN Subfield Sequence Length field of the EDMG-Header-A is 0, the corresponding TRN subfield structure may be configured of a TRN subfield structure corresponding to one OFDM symbol (namely a structure configured of one basic OFDM TRN subfield).

Figure 32:
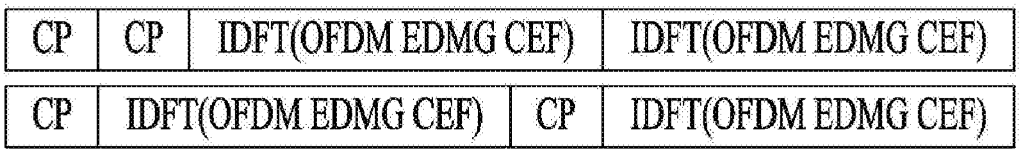
FIGS. 32 and 33 illustrate a TRN subfield structure corresponding two OFDM symbols.
Figure 33:
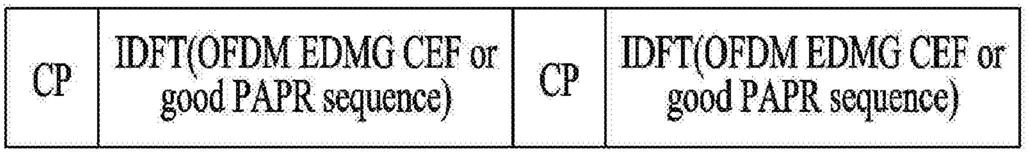

FIGS. 32 and 33 illustrate a TRN subfield structure corresponding two OFDM symbols.

As shown in FIGS. 32 and 33, if TRN Subfield Sequence Length field of the EDMG-Header-A is 0, the corresponding TRN subfield structure may be configured of a TRN subfield structure corresponding to two OFDM symbols (namely a structure configured of two basic OFDM TRN subfields).

At this time, CP may be used twice as shown in FIG. 32, or only one CP may be used over two OFDM symbols as shown in FIG. 33.

FIG. 34 illustrates a TRN subfield structure corresponding to three OFDM symbols.

As shown in FIG. 34, if TRN Subfield Sequence Length field of the EDMG-Header-A is 0, the corresponding TRN subfield structure may be configured of a TRN subfield structure corresponding to three OFDM symbols (namely a structure configured of three basic OFDM TRN subfields).

Figure 35:
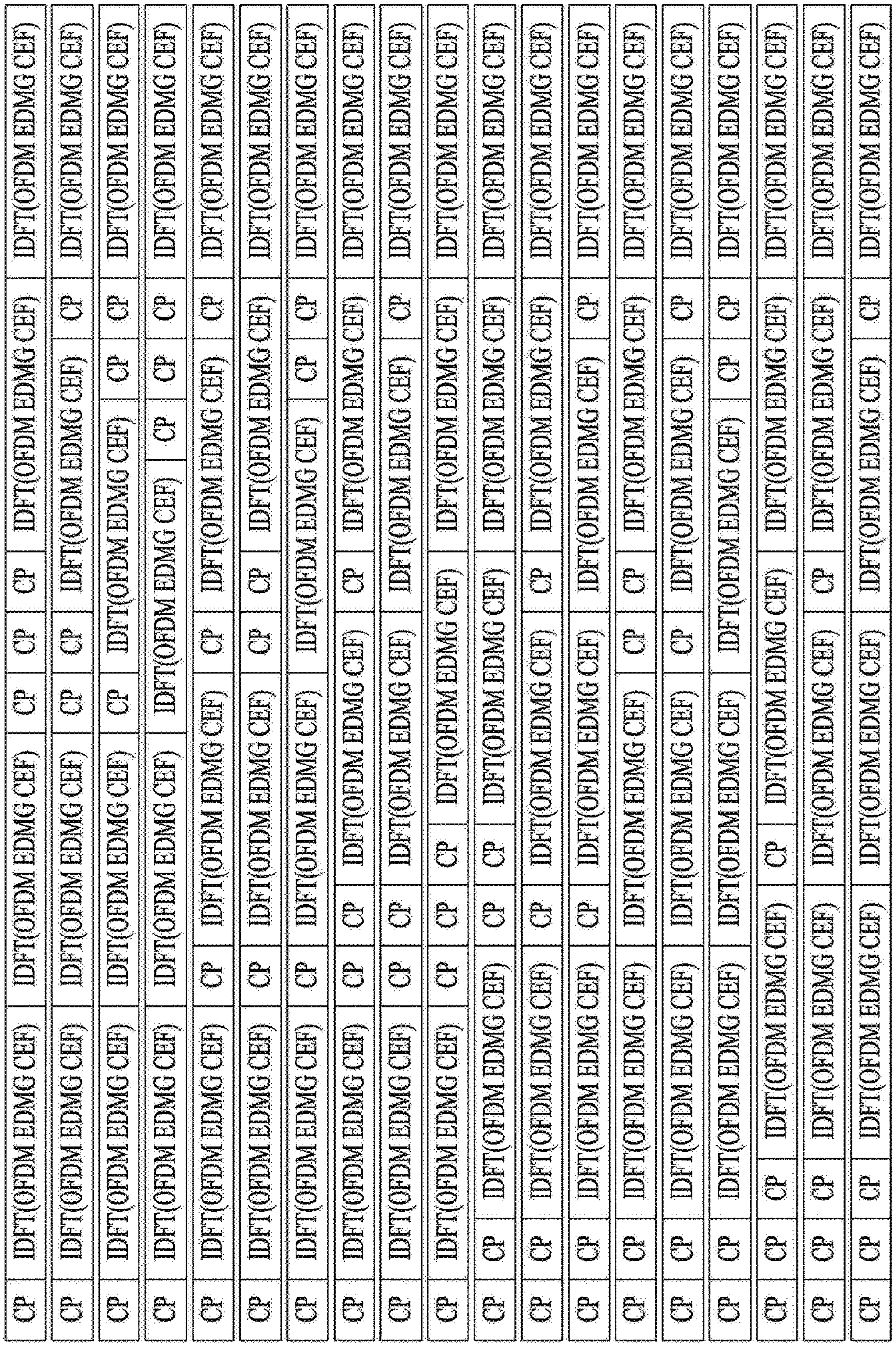
FIGS. 35 and 36 illustrate a TRN subfield structure corresponding to four OFDM symbols.
Figure 36:
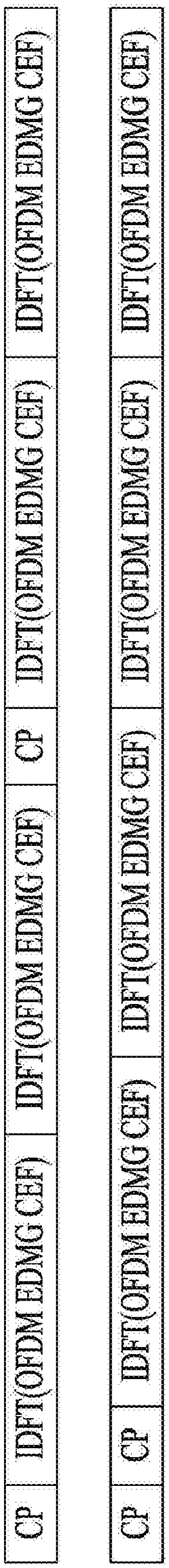

FIGS. 35 and 36 illustrate a TRN subfield structure corresponding to four OFDM symbols.

As shown in FIG. 36, if TRN Subfield Sequence Length field of the EDMG-Header-A is 0, the corresponding TRN subfield structure may be configured of a TRN subfield structure corresponding to four OFDM symbols (namely a structure configured of four basic OFDM TRN subfields).

At this time, CP may be used four times for each symbol as shown in FIG. 35, or only two CPs may be used over four OFDM symbols as shown in FIG. 36.

2) The case where TRN Subfield Sequence Length field of EDMG-Header-A is 1 (TRN_BL is 256, 2304*$T_S$)

If TRN Subfield Sequence Length field of the EDMG-Header-A is 1, as shown in FIGS. 31 to 36, the corresponding TRN subfield may be configured of a TRN subfield structure corresponding to one OFDM symbol (namely a structure configured of one basic OFDM TRN subfield), a TRN subfield structure corresponding to two OFDM symbols (namely a structure configured of two basic OFDM TRN subfields), a TRN subfield structure configured of three OFDM symbols (namely a structure configured of three basic OFDM TRN subfields), or a TRN subfield structure corresponding to four OFDM symbols (namely a structure configured of four basic OFDM TRN subfields).

Figure 37:
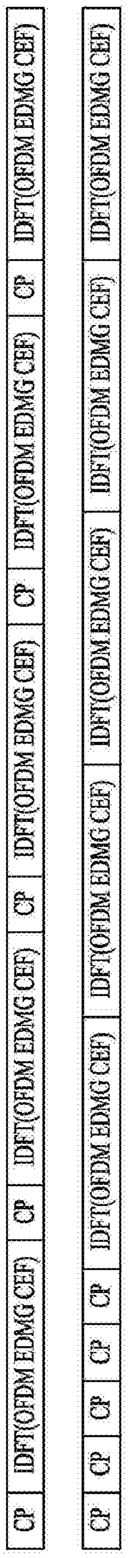
FIG. 37 illustrates a TRN subfield structure corresponding to five OFDM symbols.
Figure 38:
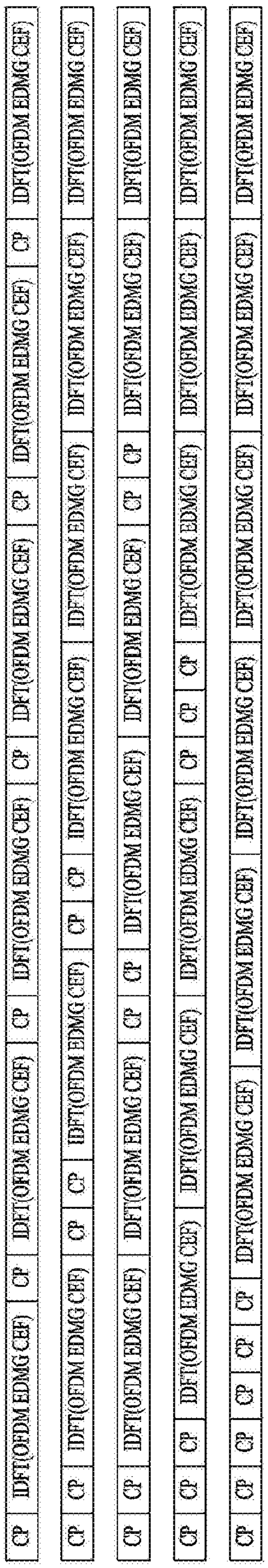
FIG. 38 illustrates a TRN subfield structure corresponding to six OFDM symbols.

In addition, if TRN Subfield Sequence Length field of the EDMG-Header-A is 1, as shown in FIG. 37 or 38, the corresponding TRN subfield may be configured of a TRN subfield structure corresponding to five or six OFDM symbols.

FIG. 37 illustrates a TRN subfield structure corresponding to five OFDM symbols.

As shown in FIG. 37, if TRN Subfield Sequence Length field of the EDMG-Header-A is 1, the corresponding TRN subfield structure may be configured of a TRN subfield structure corresponding to five OFDM symbols (namely a structure configured of five basic OFDM TRN subfields).

FIG. 38 illustrates a TRN subfield structure corresponding to six OFDM symbols.

As shown in FIG. 38, if TRN Subfield Sequence Length field of the EDMG-Header-A is 1, the corresponding TRN subfield structure may be configured of a TRN subfield structure corresponding to six OFDM symbols (namely a structure configured of six basic OFDM TRN subfields).

3) The case where TRN Subfield Sequence Length field of EDMG-Header-A is 2 (TRN_BL is 64, 576*$T_S$)

If TRN Subfield Sequence Length field of the EDMG-Header-A is 2, as shown in FIGS. 31 to 33, the corresponding TRN subfield may be configured of a TRN subfield structure corresponding to one OFDM symbol (namely a structure configured of one basic OFDM TRN subfield) or a TRN subfield structure corresponding to two OFDM symbols (namely a structure configured of two basic OFDM TRN subfields).

In a preferred embodiment to which the present invention may be applied, a TRN subfield structure according to the value of the TRN Subfield Sequence Length field of the EDMG Header-A field (namely a structure where the basic TRN subfield structure is repeated for a predetermined number of times) may be determined so as to be aligned with the TRN subfield of the SC mode in the time domain.

In one example, in the normal case (namely when the TRN Subfield Sequence Length field of the EDMG-Header-A is 0), considering that the TRN subfield of the SC mode is aligned with the TRN subfield of the OFDM mode in the time domain, the TRN subfield of the OFDM mode corresponding to the normal case may be configured of/may include one OFDM symbol (704*$T_S$ when a long Guard Interval (GI) with a length of 72.72 ns is used) or two OFDM symbols (1408*$T_S$ when a long Guard Interval (GI) with a length of 72.72 ns is used).

At this time, similarly to the SC mode case, to easily compose the OFDM TRN subfield into a Normal/Short/Long structure according to the value indicated by/included in the TRN Subfield Sequence Length field of the EDMG Header-A field, the TRN subfield structure in the normal case may be configured of two OFDM symbols.

In other words, according to a preferred embodiment to which the present invention may be applied, if the TRN subfield Sequence Length field of the EDMG-Header-A is 0, the TRN subfield may be configured of a TRN subfield structure corresponding to two OFDM symbols as shown in FIG. 32; if the TRN subfield Sequence Length field of the EDMG-Header-A is 1, the TRN subfield may be configured of a TRN subfield structure corresponding to four OFDM symbols as shown in FIG. 35; and if the TRN subfield Sequence Length field of the EDMG-Header-A is 2, the TRN subfield may be configured of a TRN subfield structure corresponding to one OFDM symbols as shown in FIG. 31.

By employing the composition described above, time duration of the TRN subfield of the OFDM mode may be aligned with that of the TRN subfield of the SC mode in the time domain.

As described above, in the case of single channel, 512-point IDFT may be applied; in the case of 2 channel bonding, 1024-point IDFT; in the case of 3 channel bonding, 1536-point IDFT; and in the case of 4 channel bonding, 2048-point IDFT. Also, the number of CP samples which may be applied is 48, 96, 192, 32, 64, or 128 for the case of single channel bonding; 96, 192, 384, 64, 128, or 256 for the case of 2 channel bonding; 144, 288, 576, 96, 192, or 384 for the case of 3 channel bonding; and 192, 384, 768, 128, 256, or 512 for the case of 4 channel bonding.

In the present invention, to compose a TRN subfield which is based on repetition of a TRN subfield structure corresponding to one OFDM symbol, the order of CP and IDFT (OFDM EDMG-CEF) may be changed in various ways.

3.1.3. OFDM TRN Field Structure for Multi-Streams

The 11ay system applicable for the present invention may support up to 8 space-time streams to support the Multiple Input Multiple Output scheme. In what follows, an OFDM TRN subfield structure according to/based on the total number of supported streams will be described in detail.

For the convenience of descriptions, in what follows, a signal obtained by repeating the TRN subfield structure, which corresponds to one OFDM symbol obtained through insertion of CP after IDFT is applied to the OFDM EDMG-CEF of the i-th space-time stream, one, two, or four times according to the value of the TRN Subfield Sequence Length field of the EDMG-Header-A is denoted as OFDM_TRN_basic_i.

Accordingly, the OFDM TRN subfield according to/based on the total number of space time streams may be defined as follows.

Nsts=1(total number of stream: 1)

OFDM_TRN_subfield_1=[OFDM_TRN_basic_1]

or

OFDM_TRN_subfield_1=[OFDM_TRN_basic_1,−OFDM_TRN_basic_1]

(2) Nsts=2(total number of stream: 2)

OFDM_TRN_subfield_1=[OFDM_TRN_basic_1]

OFDM_TRN_subfield_2=[OFDM_TRN_basic_2]

or

OFDM_TRN_subfield_1=[OFDM_TRN_basic_1,−OFDM_TRN_basic_1]

OFDM_TRN_subfield_2=[OFDM_TRN_basic_2,OFDM_TRN_basic_2]

(3) Nsts=3(total number of stream: 3) ($w_3$=exp(−j*2*pi/3))

OFDM_TRN_subfield_1=[OFDM_TRN_basic_1,OFDM_TRN_basic_1]

OFDM_TRN_subfield_2=[OFDM_TRN_basic_2,OFDM_TRN_basic_2]

OFDM_TRN_subfield_3=[OFDM_TRN_basic_3,−OFDM_TRN_basic_3]

or

OFDM_TRN_subfield_1=[OFDM_TRN_basic_1,−OFDM_TRN_basic_1,OFDM_TRN_basic_1]

OFDM_TRN_subfield_2=[OFDM_TRN_basic_2,$-w_3^1$*OFDM_TRN_basic_2,$w_3^2$*OFDM_TRN_basic_2]

OFDM_TRN_subfield_3=[OFDM_TRN_basic_3,$-w_3^3$*OFDM_TRN_basic_3,$w_3^4$*OFDM_TRN_basic_3]

or

OFDM_TRN_subfield_1=[OFDM_TRN_basic_1,−OFDM_TRN_basic_1,OFDM_TRN_basic_1,OFDM_TRN_basic_1]

OFDM_TRN_subfield_2=[OFDM_TRN_basic_2,OFDM_TRN_basic_2,−OFDM_TRN_basic_2,OFDM_TRN_basic_2]

OFDM_TRN_subfield_3=[OFDM_TRN_basic_3,OFDM_TRN_basic_3,OFDM_TRN_basic_3,−OFDM_TRN_basic_3]

(4) Nsts=4(total number of stream: 4) ($w_4$=exp(−j*2*pi/4))

OFDM_TRN_subfield_1=[OFDM_TRN_basic_1,OFDM_TRN_basic_1]

OFDM_TRN_subfield_2=[OFDM_TRN_basic_2,OFDM_TRN_basic_2]

OFDM_TRN_subfield_3=[OFDM_TRN_basic_3,−OFDM_TRN_basic_3]

OFDM_TRN_subfield_4=[OFDM_TRN_basic_4,−OFDM_TRN_basic_4]

or

OFDM_TRN_subfield_1=[OFDM_TRN_basic_1,−OFDM_TRN_basic_1,OFDM_TRN_basic_1,OFDM_TRN_basic_1]

OFDM_TRN_subfield_2=[OFDM_TRN_basic_2,−$w_4^1$*OFDM_TRN_basic_2,$w_4^2$*OFDM_TRN_basic_2,$w_4^3$*OFDM_TRN_basic_2]

OFDM_TRN_subfield_3=[OFDM_TRN_basic_3,−$w_4^4$*OFDM_TRN_basic_3,$w_4^5$*OFDM_TRN_basic_3,$w_4^6$*OFDM_TRN_basic_3]

OFDM_TRN_subfield_4=[OFDM_TRN_basic_4,−$w_4^7$*OFDM_TRN_basic_4,$w_4^8$*OFDM_TRN_basic_4,$w_4^9$*OFDM_TRN_basic_4]

or

OFDM_TRN_subfield_1=[OFDM_TRN_basic_1,−OFDM_TRN_basic_1,OFDM_TRN_basic_1,OFDM_TRN_basic_1]

OFDM_TRN_subfield_2=[OFDM_TRN_basic_2,OFDM_TRN_basic_2,−OFDM_TRN_basic_2,OFDM_TRN_basic_2]

OFDM_TRN_subfield_3=[OFDM_TRN_basic_3,OFDM_TRN_basic_3,OFDM_TRN_basic_3,−OFDM_TRN_basic_3]

OFDM_TRN_subfield_4=[−OFDM_TRN_basic_4,OFDM_TRN_basic_4,OFDM_TRN_basic_4,OFDM_TRN_basic_4]

(5) Nsts=5(total number of stream: 5) ($w_5$=exp(−j*2*pi/5), $w_6$=exp(−j*2*pi/6))

OFDM_TRN_subfield_1=[OFDM_TRN_basic_1,OFDM_TRN_basic_1,OFDM_TRN_basic_1,OFDM_TRN_basic_1]

OFDM_TRN_subfield_2=[OFDM_TRN_basic_2,OFDM_TRN_basic_2,OFDM_TRN_basic_2,OFDM_TRN_basic_2]

OFDM_TRN_subfield_3=[OFDM_TRN_basic_3,−OFDM_TRN_basic_3,OFDM_TRN_basic_3,−OFDM_TRN_basic_3]

OFDM_TRN_subfield_4=[OFDM_TRN_basic_4,−OFDM_TRN_basic_4,OFDM_TRN_basic_4,−OFDM_TRN_basic_4]

OFDM_TRN_subfield_5=[OFDM_TRN_basic_5,OFDM_TRN_basic_5,OFDM_TRN_basic_5,−OFDM_TRN_basic_5]

or

OFDM_TRN_subfield_1=[OFDM_TRN_basic_1,−OFDM_TRN_basic_1,OFDM_TRN_basic_1,OFDM_TRN_basic_1,OFDM_TRN_basic_1,−OFDM_TRN_basic_1]

OFDM_TRN_subfield_2=[OFDM_TRN_basic_2,−$w_6^1$*OFDM_TRN_basic_2,$w_6^2$*OFDM_TRN_basic_2,$w_6^3$*OFDM_TRN_basic_2,$w_6^4$*OFDM_TRN_basic_2,−$w_6^5$*OFDM_TRN_basic_2]

OFDM_TRN_subfield_3=[OFDM_TRN_basic_3,−$w_6^2$*OFDM_TRN_basic_3,$w_6^4$*OFDM_TRN_basic_3,$w_6^6$*OFDM_TRN_basic_3,$w_6^8$*OFDM_TRN_basic_3−$w_6^{10}$*OFDM_TRN_basic_3]

OFDM_TRN_subfield_4=[OFDM_TRN_basic_4,−$w_6^3$*OFDM_TRN_basic_4,$w_6^6$*OFDM_TRN_basic_4,$w_6^9$*OFDM_TRN_basic_4,$w_6^{12}$*OFDM_TRN_basic_4−$w_6^{15}$*OFDM_TRN_basic_4]

OFDM_TRN_subfield_5=[OFDM_TRN_basic_5,−$w_6^{4}$*OFDM_TRN_basic_5, $w_6^{8}$*OFDM_TRN_basic_5, $w_6^{12}$*OFDM_TRN_basic_5, $w_6^{16}$*OFDM_TRN_basic_5−$w_6^{20}$*OFDM_TRN_basic_5]

or

OFDM_TRN_subfield_1=[OFDM_TRN_basic_1,−OFDM_TRN_basic_1,OFDM_TRN_basic_1, OFDM_TRN_basic_1,OFDM_TRN_basic_1,−OFDM_TRN_basic_1,OFDM_TRN_basic_1, OFDM_TRN_basic_1]

OFDM_TRN_subfield_2=[OFDM_TRN_basic_2, OFDM_TRN_basic_2,−OFDM_TRN_basic_2, OFDM_TRN_basic_2,OFDM_TRN_basic_2, OFDM_TRN_basic_2,−OFDM_TRN_basic_2, OFDM_TRN_basic_2]

OFDM_TRN_subfield_3=[OFDM_TRN_basic_3, OFDM_TRN_basic_3,OFDM_TRN_basic_3,−OFDM_TRN_basic_3,OFDM_TRN_basic_3, OFDM_TRN_basic_3,OFDM_TRN_basic_3,−OFDM_TRN_basic_3]

OFDM_TRN_subfield_4=[−OFDM_TRN_basic_4, OFDM_TRN_basic_4,OFDM_TRN_basic_4, OFDM_TRN_basic_4,−OFDM_TRN_basic_4, OFDM_TRN_basic_4,OFDM_TRN_basic_4, OFDM_TRN_basic_4]

OFDM_TRN_subfield_5=[OFDM_TRN_basic_5,−OFDM_TRN_basic_5,OFDM_TRN_basic_5, OFDM_TRN_basic_5,−OFDM_TRN_basic_5, OFDM_TRN_basic_5,−OFDM_TRN_basic_5,−OFDM_TRN_basic_5]

or

OFDM_TRN_subfield_1=[OFDM_TRN_basic_1,−OFDM_TRN_basic_1,OFDM_TRN_basic_1, OFDM_TRN_basic_1,OFDM_TRN_basic_1]

OFDM_TRN_subfield_2=[OFDM_TRN_basic_2,−$w_5^{1}$*OFDM_TRN_basic_2, $w_5^{2}$*OFDM_TRN_basic_2, $w_5^{3}$*OFDM_TRN_basic_2, $w_5^{4}$*OFDM_TRN_basic_2]

OFDM_TRN_subfield_3=[OFDM_TRN_basic_3,−$w_5^{5}$*OFDM_TRN_basic_3, $w_5^{6}$*OFDM_TRN_basic_3, $w_5^{7}$*OFDM_TRN_basic_3, $w_5^{8}$*OFDM_TRN_basic_3]

OFDM_TRN_subfield_4=[OFDM_TRN_basic_4,−$w_5^{9}$*OFDM_TRN_basic_4, $w_5^{10}$*OFDM_TRN_basic_4, $w_5^{11}$*OFDM_TRN_basic_4, $w_5^{12}$*OFDM_TRN_basic_4]

OFDM_TRN_subfield_5=[OFDM_TRN_basic_5,−$w_5^{13}$*OFDM_TRN_basic_5, $w_5^{14}$*OFDM_TRN_basic_5, $w_5^{15}$*OFDM_TRN_basic_5, $w_5^{16}$*OFDM_TRN_basic_5]

(6) Nsts=6(total number of stream: 6) ($w_6$=exp(−j2*pi/6))

OFDM_TRN_subfield_1=[OFDM_TRN_basic_1, OFDM_TRN_basic_1,OFDM_TRN_basic_1, OFDM_TRN_basic_1]

OFDM_TRN_subfield_2=[OFDM_TRN_basic_2, OFDM_TRN_basic_2,OFDM_TRN_basic_2, OFDM_TRN_basic_2]

OFDM_TRN_subfield_3=[OFDM_TRN_basic_3,−OFDM_TRN_basic_3,OFDM_TRN_basic_3,−OFDM_TRN_basic_3]

OFDM_TRN_subfield_4=[OFDM_TRN_basic_4,−OFDM_TRN_basic_4,OFDM_TRN_basic_4,−OFDM_TRN_basic_4]

OFDM_TRN_subfield_5=[OFDM_TRN_basic_5, OFDM_TRN_basic_5,−OFDM_TRN_basic_5,−OFDM_TRN_basic_5]

OFDM_TRN_subfield_6=[OFDM_TRN_basic_6, OFDM_TRN_basic_6,−OFDM_TRN_basic_6,−OFDM_TRN_basic_6]

or

OFDM_TRN_subfield_1=[OFDM_TRN_basic_1,−OFDM_TRN_basic_1,OFDM_TRN_basic_1, OFDM_TRN_basic_1,OFDM_TRN_basic_1,−OFDM_TRN_basic_1]

OFDM_TRN_subfield_2=[OFDM_TRN_basic_2,−$w_6^{1}$*OFDM_TRN_basic_2, $w_6^{2}$*OFDM_TRN_basic_2, $w_6^{3}$*OFDM_TRN_basic_2, $w_6^{4}$*OFDM_TRN_basic_2,−$w_6^{5}$*OFDM_TRN_basic_2]

OFDM_TRN_subfield_3=[OFDM_TRN_basic_3,−$w_6^{2}$*OFDM_TRN_basic_3, $w_6^{4}$*OFDM_TRN_basic_3, $w_6^{6}$*OFDM_TRN_basic_3, $w_6^{8}$*OFDM_TRN_basic_3−$w_6^{10}$*OFDM_TRN_basic_3]

OFDM_TRN_subfield_4=[OFDM_TRN_basic_4,−$w_6^{3}$*OFDM_TRN_basic_4, $w_6^{6}$*OFDM_TRN_basic_4, $w_6^{9}$*OFDM_TRN_basic_4, $w_6^{12}$*OFDM_TRN_basic_4−$w_6^{15}$*OFDM_TRN_basic_4]

OFDM_TRN_subfield_5=[OFDM_TRN_basic_5,−$w_6^{4}$*OFDM_TRN_basic_5, $w_6^{8}$*OFDM_TRN_basic_5, $w_6^{12}$*OFDM_TRN_basic_5, $w_6^{16}$*OFDM_TRN_basic_5−$w_6^{20}$*OFDM_TRN_basic_5]

OFDM_TRN_subfield_6=[OFDM_TRN_basic_6,−$w_6^{5}$*OFDM_TRN_basic_6, $w_6^{10}$*OFDM_TRN_basic_6, $w_6^{15}$*OFDM_TRN_basic_6, $w_6^{20}$*OFDM_TRN_basic_6−$w_6^{25}$*OFDM_TRN_basic_6]

or

OFDM_TRN_subfield_1=[OFDM_TRN_basic_1,−OFDM_TRN_basic_1,OFDM_TRN_basic_1, OFDM_TRN_basic_1,OFDM_TRN_basic_1,−OFDM_TRN_basic_1,OFDM_TRN_basic_1, OFDM_TRN_basic_1]

OFDM_TRN_subfield_2=[OFDM_TRN_basic_2, OFDM_TRN_basic_2,−OFDM_TRN_basic_2, OFDM_TRN_basic_2,OFDM_TRN_basic_2, OFDM_TRN_basic_2,−OFDM_TRN_basic_2, OFDM_TRN_basic_2]

OFDM_TRN_subfield_3=[OFDM_TRN_basic_3, OFDM_TRN_basic_3,OFDM_TRN_basic_3,−OFDM_TRN_basic_3,OFDM_TRN_basic_3, OFDM_TRN_basic_3,OFDM_TRN_basic_3,−OFDM_TRN_basic_3]

OFDM_TRN_subfield_4=[−OFDM_TRN_basic_4, OFDM_TRN_basic_4,OFDM_TRN_basic_4, OFDM_TRN_basic_4,−OFDM_TRN_basic_4, OFDM_TRN_basic_4,OFDM_TRN_basic_4, OFDM_TRN_basic_4]

OFDM_TRN_subfield_5=[OFDM_TRN_basic_5,− OFDM_TRN_basic_5,OFDM_TRN_basic_5, OFDM_TRN_basic_5,−OFDM_TRN_basic_5, OFDM_TRN_basic_5,−OFDM_TRN_basic_5,− OFDM_TRN_basic_5]

OFDM_TRN_subfield_6=[OFDM_TRN_basic_6, OFDM_TRN_basic_6,−OFDM_TRN_basic_6, OFDM_TRN_basic_6,−OFDM_TRN_basic_6,− OFDM_TRN_basic_6,OFDM_TRN_basic_6,− OFDM_TRN_basic_6]

(7) Nsts=7(total number of stream: 7) ($w_7$=exp(−j 2*pi/7))

OFDM_TRN_subfield_1=[OFDM_TRN_basic_1, OFDM_TRN_basic_1,OFDM_TRN_basic_1, OFDM_TRN_basic_1]

OFDM_TRN_subfield_2=[OFDM_TRN_basic_2, OFDM_TRN_basic_2,OFDM_TRN_basic_2, OFDM_TRN_basic_2]

OFDM_TRN_subfield_3=[OFDM_TRN_basic_3,− OFDM_TRN_basic_3,OFDM_TRN_basic_3,− OFDM_TRN_basic_3]

OFDM_TRN_subfield_4=[OFDM_TRN_basic_4,− OFDM_TRN_basic_4,OFDM_TRN_basic_4,− OFDM_TRN_basic_4]

OFDM_TRN_subfield_5=[OFDM_TRN_basic_5, OFDM_TRN_basic_5,−OFDM_TRN_basic_5,− OFDM_TRN_basic_5]

OFDM_TRN_subfield_6=[OFDM_TRN_basic_6, OFDM_TRN_basic_6,−OFDM_TRN_basic_6,− OFDM_TRN_basic_6]

OFDM_TRN_subfield_7=[OFDM_TRN_basic_7,− OFDM_TRN_basic_7,−OFDM_TRN_basic_7, OFDM_TRN_basic_7]

or

OFDM_TRN_subfield_1=[OFDM_TRN_basic_1,− OFDM_TRN_basic_1,OFDM_TRN_basic_1, OFDM_TRN_basic_1,OFDM_TRN_basic_1,− OFDM_TRN_basic_1,OFDM_TRN_basic_1 OFDM_TRN_basic_1]

OFDM_TRN_subfield_2=[OFDM_TRN_basic_2, OFDM_TRN_basic_2,−OFDM_TRN_basic_2, OFDM_TRN_basic_2,OFDM_TRN_basic_2, OFDM_TRN_basic_2,−OFDM_TRN_basic_2, OFDM_TRN_basic_2]

OFDM_TRN_subfield_3=[OFDM_TRN_basic_3, OFDM_TRN_basic_3,OFDM_TRN_basic_3,− OFDM_TRN_basic_3,OFDM_TRN_basic_3, OFDM_TRN_basic_3,OFDM_TRN_basic_3,− OFDM_TRN_basic_3]

OFDM_TRN_subfield_4=[−OFDM_TRN_basic_4, OFDM_TRN_basic_4,OFDM_TRN_basic_4, OFDM_TRN_basic_4,−OFDM_TRN_basic_4, OFDM_TRN_basic_4,OFDM_TRN_basic_4, OFDM_TRN_basic_4]

OFDM_TRN_subfield_5=[OFDM_TRN_basic_5,− OFDM_TRN_basic_5,OFDM_TRN_basic_5, OFDM_TRN_basic_5,−OFDM_TRN_basic_5, OFDM_TRN_basic_5,−OFDM_TRN_basic_5,− OFDM_TRN_basic_5]

OFDM_TRN_subfield_6=[OFDM_TRN_basic_6, OFDM_TRN_basic_6,−OFDM_TRN_basic_6, OFDM_TRN_basic_6,−OFDM_TRN_basic_6,− OFDM_TRN_basic_6,OFDM_TRN_basic_6,− OFDM_TRN_basic_6]

OFDM_TRN_subfield_7=[OFDM_TRN_basic_7, OFDM_TRN_basic_7,OFDM_TRN_basic_7,− OFDM_TRN_basic_7,−OFDM_TRN_basic_7,− OFDM_TRN_basic_7,−OFDM_TRN_basic_7, OFDM_TRN_basic_7]

or

OFDM_TRN_subfield_1=[OFDM_TRN_basic_1,− $w_7^{1}$*OFDM_TRN_basic_1, $w_7^{2}$*OFDM_TRN_basic_1, $w_7^{3}$*OFDM_TRN_basic_1, $w_7^{4}$*OFDM_TRN_basic_1,− $w_7^{5}$*OFDM_TRN_basic_1, $w_7^{6}$*OFDM_TRN_basic_1]

OFDM_TRN_subfield_2=[OFDM_TRN_basic_2,− $w_7^{7}$*OFDM_TRN_basic_2, $w_7^{8}$*OFDM_TRN_basic_2, $w_7^{9}$*OFDM_TRN_basic_2, $w_7^{10}$*OFDM_TRN_basic_2,− $w_7^{11}$*OFDM_TRN_basic_2, $w_7^{12}$*OFDM_TRN_basic_2]

OFDM_TRN_subfield_3=[OFDM_TRN_basic_3,− $w_7^{13}$*OFDM_TRN_basic_3, $w_7^{14}$*OFDM_TRN_basic_3, $w_7^{15}$*OFDM_TRN_basic_3, $w_7^{16}$*OFDM_TRN_basic_3,− $w_7^{17}$*OFDM_TRN_basic_3, $w_7^{18}$*OFDM_TRN_basic_3]

OFDM_TRN_subfield_4=[OFDM_TRN_basic_4,− $w_7^{19}$*OFDM_TRN_basic_4, $w_7^{20}$*OFDM_TRN_basic_4, $w_7^{21}$*OFDM_TRN_basic_4, $w_7^{22}$*OFDM_TRN_basic_4,− $w_7^{23}$*OFDM_TRN_basic_4, $w_7^{24}$*OFDM_TRN_basic_4]

OFDM_TRN_subfield_5=[OFDM_TRN_basic_5,− $w_7^{25}$*OFDM_TRN_basic_5, $w_7^{26}$*OFDM_TRN_basic_5, $w_7^{27}$*OFDM_TRN_basic_5, $w_7^{28}$*OFDM_TRN_basic_5,− $w_7^{29}$*OFDM_TRN_basic_5, $w_7^{30}$*OFDM_TRN_basic_5]

OFDM_TRN_subfield_6=[OFDM_TRN_basic_6,− $w_7^{31}$*OFDM_TRN_basic_6, $w_7^{32}$*OFDM_TRN_basic_6, $w_7^{33}$*OFDM_TRN_basic_6, $w_7^{34}$*OFDM_TRN_basic_6,− $w_7^{35}$*OFDM_TRN_basic_6, $w_7^{36}$*OFDM_TRN_basic_6]

OFDM_TRN_subfield_7=[OFDM_TRN_basic_7,− $w_7^{37}$*OFDM_TRN_basic_7, $w_7^{38}$*OFDM_TRN_basic_7, $w_7^{39}$*OFDM_TRN_basic_7, $w_7^{40}$*OFDM_TRN_basic_7,− $w_7^{41}$*OFDM_TRN_basic_7, $w_7^{42}$*OFDM_TRN_basic_7]

(8) Nsts=8(total number of stream: 8) ($w_8$=exp(−j 2*pi/8))

OFDM_TRN_subfield_1=[OFDM_TRN_basic_1, OFDM_TRN_basic_1,OFDM_TRN_basic_1, OFDM_TRN_basic_1]

OFDM_TRN_subfield_2=[OFDM_TRN_basic_2, OFDM_TRN_basic_2,OFDM_TRN_basic_2, OFDM_TRN_basic_2]

OFDM_TRN_subfield_3=[OFDM_TRN_basic_3,–OFDM_TRN_basic_3,OFDM_TRN_basic_3,–OFDM_TRN_basic_3]

OFDM_TRN_subfield_4=[OFDM_TRN_basic_4,–OFDM_TRN_basic_4,OFDM_TRN_basic_4,–OFDM_TRN_basic_4]

OFDM_TRN_subfield_5=[OFDM_TRN_basic_5,OFDM_TRN_basic_5,–OFDM_TRN_basic_5,–OFDM_TRN_basic_5]

OFDM_TRN_subfield_6=[OFDM_TRN_basic_6,OFDM_TRN_basic_6,–OFDM_TRN_basic_6,–OFDM_TRN_basic_6]

OFDM_TRN_subfield_7=[OFDM_TRN_basic_7,–OFDM_TRN_basic_7,–OFDM_TRN_basic_7,OFDM_TRN_basic_7]

OFDM_TRN_subfield_8=[OFDM_TRN_basic_8,–OFDM_TRN_basic_8,–OFDM_TRN_basic_8,OFDM_TRN_basic_8]

or

OFDM_TRN_subfield_1=[OFDM_TRN_basic_1,–OFDM_TRN_basic_1,OFDM_TRN_basic_1,OFDM_TRN_basic_1,OFDM_TRN_basic_1,–OFDM_TRN_basic_1,OFDM_TRN_basic_1,OFDM_TRN_basic_1]

OFDM_TRN_subfield_2=[OFDM_TRN_basic_2,OFDM_TRN_basic_2,–OFDM_TRN_basic_2,OFDM_TRN_basic_2,OFDM_TRN_basic_2,OFDM_TRN_basic_2,–OFDM_TRN_basic_2,OFDM_TRN_basic_2]

OFDM_TRN_subfield_3=[OFDM_TRN_basic_3,OFDM_TRN_basic_3,OFDM_TRN_basic_3,–OFDM_TRN_basic_3,OFDM_TRN_basic_3,OFDM_TRN_basic_3,OFDM_TRN_basic_3,–OFDM_TRN_basic_3]

OFDM_TRN_subfield_4=[–OFDM_TRN_basic_4,OFDM_TRN_basic_4,OFDM_TRN_basic_4,OFDM_TRN_basic_4,–OFDM_TRN_basic_4,OFDM_TRN_basic_4,OFDM_TRN_basic_4,OFDM_TRN_basic_4]

OFDM_TRN_subfield_5=[OFDM_TRN_basic_5,–OFDM_TRN_basic_5,OFDM_TRN_basic_5,OFDM_TRN_basic_5,–OFDM_TRN_basic_5,OFDM_TRN_basic_5,–OFDM_TRN_basic_5,–OFDM_TRN_basic_5]

OFDM_TRN_subfield_6=[OFDM_TRN_basic_6,OFDM_TRN_basic_6,–OFDM_TRN_basic_6,OFDM_TRN_basic_6,–OFDM_TRN_basic_6,–OFDM_TRN_basic_6,OFDM_TRN_basic_6,–OFDM_TRN_basic_6]

OFDM_TRN_subfield_7=[OFDM_TRN_basic_7,OFDM_TRN_basic_7,OFDM_TRN_basic_7,–OFDM_TRN_basic_7,–OFDM_TRN_basic_7,–OFDM_TRN_basic_7,–OFDM_TRN_basic_7,OFDM_TRN_basic_7]

OFDM_TRN_subfield_8=[–OFDM_TRN_basic_8,OFDM_TRN_basic_8,OFDM_TRN_basic_8,OFDM_TRN_basic_8,OFDM_TRN_basic_8,–OFDM_TRN_basic_8,–OFDM_TRN_basic_8,–OFDM_TRN_basic_8]

or

OFDM_TRN_subfield_1=[OFDM_TRN_basic_1,–$w_8^{1}$*OFDM_TRN_basic_1,$w_8^{2}$*OFDM_TRN_basic_1,$w_8^{3}$*OFDM_TRN_basic_1,$w_8^{4}$*OFDM_TRN_basic_1,–$w_8^{5}$*OFDM_TRN_basic_1,$w_8^{6}$*OFDM_TRN_basic_1,$w_8^{7}$*OFDM_TRN_basic_1]

OFDM_TRN_subfield_2=[OFDM_TRN_basic_2,–$w_8^{8}$*OFDM_TRN_basic_2,$w_8^{9}$*OFDM_TRN_basic_2,$w_8^{10}$*OFDM_TRN_basic_2,$w_8^{11}$*OFDM_TRN_basic_2,–$w_8^{12}$*OFDM_TRN_basic_2,$w_8^{13}$*OFDM_TRN_basic_2,$w_8^{14}$*OFDM_TRN_basic_2]

OFDM_TRN_subfield_3=[OFDM_TRN_basic_3,–$w_8^{15}$*OFDM_TRN_basic_3,$w_8^{16}$*OFDM_TRN_basic_3,$w_8^{17}$*OFDM_TRN_basic_3,$w_8^{18}$*OFDM_TRN_basic_3,–$w_8^{19}$*OFDM_TRN_basic_3,$w_8^{20}$*OFDM_TRN_basic_3,$w_8^{21}$*OFDM_TRN_basic_3]

OFDM_TRN_subfield_4=[OFDM_TRN_basic_4,–$w_8^{22}$*OFDM_TRN_basic_4,$w_8^{23}$*OFDM_TRN_basic_4,$w_8^{24}$*OFDM_TRN_basic_4,$w_8^{25}$*OFDM_TRN_basic_4,–$w_8^{26}$*OFDM_TRN_basic_4,$w_8^{27}$*OFDM_TRN_basic_4,$w_8^{28}$*OFDM_TRN_basic_4]

OFDM_TRN_subfield_5=[OFDM_TRN_basic_5,–$w_8^{29}$*OFDM_TRN_basic_5,$w_8^{30}$*OFDM_TRN_basic_5,$w_8^{31}$*OFDM_TRN_basic_5,$w_8^{32}$*OFDM_TRN_basic_5,–$w_8^{33}$*OFDM_TRN_basic_5,$w_8^{34}$*OFDM_TRN_basic_5,$w_8^{35}$*OFDM_TRN_basic_5]

OFDM_TRN_subfield_6=[OFDM_TRN_basic_6,–$w_8^{36}$*OFDM_TRN_basic_6,$w_8^{37}$*OFDM_TRN_basic_6,$w_8^{38}$*OFDM_TRN_basic_6,$w_8^{39}$*OFDM_TRN_basic_6,–$w_8^{40}$*OFDM_TRN_basic_6,$w_8^{41}$*OFDM_TRN_basic_6,$w_8^{42}$*OFDM_TRN_basic_6]

OFDM_TRN_subfield_7=[OFDM_TRN_basic_7,–$w_8^{43}$*OFDM_TRN_basic_7,$w_8^{44}$*OFDM_TRN_basic_7,$w_8^{45}$*OFDM_TRN_basic_7,$w_8^{46}$*OFDM_TRN_basic_7,–$w_8^{47}$*OFDM_TRN_basic_7,$w_8^{48}$*OFDM_TRN_basic_7,$w_8^{49}$*OFDM_TRN_basic_7]

OFDM_TRN_subfield_8=[OFDM_TRN_basic_8,–$w_8^{50}$*OFDM_TRN_basic_8,$w_8^{51}$*OFDM_TRN_basic_8,$w_8^{52}$*OFDM_TRN_basic_8,$w_8^{53}$*OFDM_TRN_basic_8,–$w_8^{54}$*OFDM_TRN_basic_8,$w_8^{55}$*OFDM_TRN_basic_8,$w_8^{56}$*OFDM_TRN_basic_8]

As described above, the TRN field transmitted by the transmitter may be determined to have a different length according to/based on the total number of streams to be transmitted and the value of the TRN Subfield Sequence Length field of the EDMG Header-A field.

3.1.4. Conclusions

According to one example to which the present invention may be applied, the TRN field (or TRN subfield) of the EDMG OFDM mode may be composed as follows.

For transmission of an EDMG PPDU in the EDMG OFDM mode through a 2.16 GHz channel, an OFDM TRN_BASIC sequence in the frequency domain for the iTX-th space-time stream may be defined by the equation given below. At this time, $Seq^{iTX}_{left,\ 176}$ and $Seq^{iTX}_{right,\ 176}$ may correspond to $Seq^{iSTS}_{left,\ 176}$ and $Seq^{iSTS}_{right,\ 176}$ of FIGS. 11 and 12 above.

$$TRN\_BASIC^{iTX}_{-177,177}=[Seq^{iTX}_{left,176},0,0,0,Seq^{iTX}_{right,176}],\ \text{for}\ i_{TX}=1,2,3,4,5,6,7,8 \quad \text{[Equation 8]}$$

For transmission of an EDMG PPDU in the EDMG OFDM mode through a 2.16 GHz channel, an OFDM TRN_BASIC sequence in the frequency domain for the iTX-th space-time stream may be defined by the equation given below. At this time, $Seq^{iTX}_{left,\ 385}$ and $Seq^{iTX}_{right,\ 385}$ may correspond to $Seq^{iSTS}_{left,\ 385}$ and $Seq^{iSTS}_{right,\ 385}$ of FIGS. 13 to 16 above.

$$TRN\_BASIC^{iTX}_{-386,386}=[Seq^{iTX}_{left,385},0,0,0,Seq^{iTX}_{right,385}],\ \text{for}\ i_{TX}=1,2,3,4,5,6,7,8 \quad \text{[Equation 9]}$$

For transmission of an EDMG PPDU in the EDMG OFDM mode through a 6.48 GHz channel, an OFDM TRN_BASIC sequence in the frequency domain for the iTX-th space-time stream may be defined by the equation given below. At this time, $Seq^{iTX}_{left,\ 595}$ and $Seq^{iTX}_{right,\ 595}$ may correspond to $Seq^{iSTS}_{left,\ 595}$ and $Seq^{iSTS}_{right,\ 595}$ of FIGS. 17 to 22 above.

$$TRN\_BASIC^{iTX}_{-596,596}=[Seq^{iTX}_{left,595},0,0,0,Seq^{iTX}_{right,595}],\ \text{for}\ i_{TX}=1,2,3,4,5,6,7,8 \quad \text{[Equation 10]}$$

For transmission of an EDMG PPDU in the EDMG OFDM mode through an 8.64 GHz channel, an OFDM TRN_BASIC sequence in the frequency domain for the $i_{TX}$-th space-time stream may be defined by the equation given below. At this time, $Seq^{iTX}_{left,\ 804}$ and $Seq^{iTX}_{right,\ 804}$ may correspond to $Seq^{iSTS}_{left,\ 804}$ and $Seq^{iSTS}_{right,\ 804}$ of FIGS. 23 to 30 above.

$$TRN\_BASIC^{iTX}_{-805,805}=[Seq^{iTX}_{left,804},0,0,0,Seq^{iTX}_{right,804}],\ \text{for}\ i_{TX}=1,2,3,4,5,6,7,8 \quad \text{[Equation 11]}$$

When the OFDM sampling rate $F_S=N_{CB}*2.64$ GHz, and sampling time $T_S=1/F_S$, a basic OFDM TRN subfield waveform for the $i_{TX}$-th transmission chain (or space-time stream) in the time domain may be defined by the equation given below.

$$r^{i_{TX}}_{TRN\_BASIC}(qT_s) = \sum_{n=1}^{N^{N_{TX}}_{TRN}} r^{n,i_{TX}}_{TRN}(qT_s-(n-1)\cdot(T_{DFT}+T_{GI\ long})) \quad \text{[Equation 12]}$$

where:

$$r^{n,i_{TX}}_{TRN}(qT_s) = \frac{1}{\sqrt{N^{Tone}_{TRN}}} w(qT_s)\cdot\sum_{k=-N_{SR}}^{N_{SR}} [P_{TRN}]_{i_{TX},n} TRN\_BASIC^{i_{TX}}_{k} \exp(j2\pi k\Delta_F(qT_s-T_{GI\ long})),\ 1\le n\le N^{N_{TX}}_{TRN}$$

At this time, the Normal TRN subfield, Short TRN subfield, and Long TRN subfield according to the value of the TRN Subfield Sequence Length field of the EDMG Header-A field may be defined by the equation given below.

$$r^{i_{TX}}_{TRN\_NORMAL}(qT_s) = \sum_{n=1}^{2} r^{i_{TX}}_{TRN\_BASIC}(qT_s-(n-1)\cdot T_{BASIC}) \quad \text{[Equation 13]}$$

$$r^{i_{TX}}_{TRN\_SHORT}(qT_s) = r^{i_{TX}}_{TRN\_BASIC}(qT_s)$$

$$r^{i_{TX}}_{TRN\_LONG}(qT_s) = \sum_{n=1}^{4} r^{i_{TX}}_{TRN\_BASIC}(qT_s-(n-1)\cdot T_{BASIC})$$

In the equations above, $N_{CB}$ represents/is the number of contiguous or bonded (or combined) channels, and other parameters may be defined as follows.

$N_{TRN}^{Tone}=N_{ST}-N_{DC}$ is the total number of active tones [Equation 14]

$P_{TRN}$ is the TRN mapping matrix (see below)

$N_{TRN}^{N_{TX}}$ is the number of OFDM symbols in a TRN subfield for the given total number of transmit chains $N_{TX}$ (see below)

$[\ ]_{m,n}$ is a matrix element from $m^{th}$ row and $n^{th}$ column $w(qT_s)$ is window function applied to smooth the transitions between consecutive OFDM symbols, its definition is implementation specific q is a time sample index $T_{BASIC}$ is the duration of the basic TRN subfield From the definition above, $P_{TRN}$ (OFDM TRN mapping matrix) may be defined according to the $N_{TX}$ value by the equation given below.

The OFDM TRN napping matrix for $N_{TX}=1$ is defined as follows:

$$P_{TRN}=[+1\ -1], N_{TRN}^{N_{TX}}=2 \quad \text{[Equation 15]}$$

The OFDM TRN mapping matrix for $N_{TX}=2$ is defined as follows:

$$P_{TRN} = \begin{bmatrix} +1 & -1 \\ +1 & +1 \end{bmatrix}, N^{N_{TX}}_{TRN} = 2 \quad \text{[Equation 17]}$$

The OFDM TRN mapping matrix for $N_{TX}=3$ is defined as follows:

$$P_{TRN} = \begin{bmatrix} +1 & -1 & -1 \\ +1 & -w_3^1 & w_3^2 \\ +1 & -w_3^2 & w_3^4 \end{bmatrix}, w_3 = \exp(-j2\pi/3), N^{N_{TX}}_{TRN} = 3 \quad \text{[Equation 18]}$$

The OFDM TRN mapping matrix for $N_{TX}=4$ is defined as follows:

$$P_{TRN} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix}, N^{N_{TX}}_{TRN} = 4 \quad \text{[Equation 19]}$$

The OFDM TRN mapping matrix for $N_{TX}=5$, 6 is defined as follows:

[Equation 20]

$$P_{TRN} = \begin{bmatrix} +1 & -1 & +1 & +1 & +1 & +1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},$$

$$w_6 = \exp(-j2\pi/6),\ N_{TRN}^{N_{TX}} = 6$$

The OFDM TRN mapping matrix for $N_{TX}$=7, 8 is defined as follows:

$$P_{TRN} = \begin{bmatrix} P_{4\times4} & P_{4\times4} \\ P_{4\times4} & -P_{4\times4} \end{bmatrix},\ N_{TRN}^{N_{TX}} = 8$$

The descriptions above summarize what have been disclosed in Sections 3.1.1 to 3.1.3, and it should be understood by those skilled in the art to which the present invention belongs that the descriptions given in Section 3.1.4 are included in the descriptions given in Sections 3.1.1 to 3.1.3.

Figure 39:
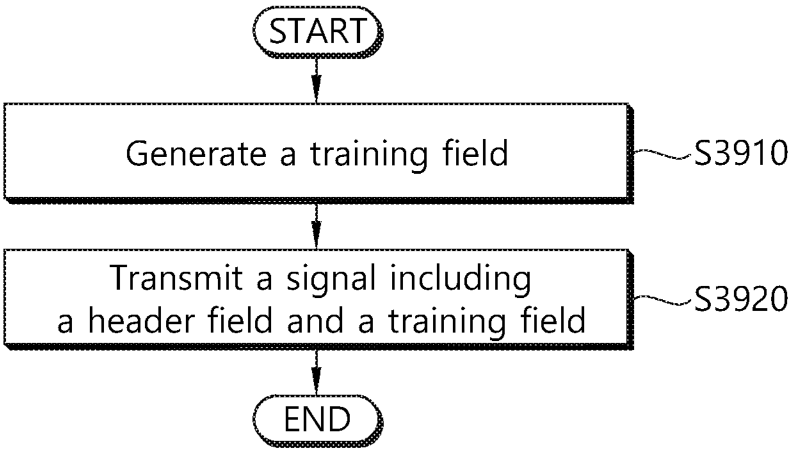
FIG. 39 illustrates a method for transmitting signals including a TRN field according to one embodiment of the present invention.

3.2. Method for Transmitting and Receiving Signals Including a TRN Subfield in the OFDM Mode FIG. 39 illustrates a method for transmitting signals including a TRN field according to one embodiment of the present invention.

First, a transmitter (for example, STA) generates a training field included in a signal to be transmitted S3910.

The transmitter may generate a training field including a training subfield per space-time stream based on a basic training subfield per space-time stream and the total number of space-time streams. At this time, the basic training subfield per space-time stream may be configured of M (where M is a natural number) Orthogonal Frequency Division Multiplexing (OFDM) symbols based on information indicated by/included in a header field.

More specifically, the training field includes a training subfield per space-time stream, and the training subfield per space-time stream may be configured by using/based on the basic training subfield per space-time stream based on a rule determined according to/based on the total number of space-time streams.

As one example, when the total number of space-time streams is 1, the training subfield per space-time stream may be composed as follows. In the following, OFDM_TRN_subfield_N represents/is a training subfield for a space-time stream for an index N, and OFDM_TRN_basic_N represents/is a basic training subfield for the space-time stream for an index N.

OFDM_TRN_subfield_1=[OFDM_TRN_basic_1,−OFDM_TRN_basic_1]

As another example, when the total number of space-time streams is 2, the training subfield per space-time stream may be composed as follows.

OFDM_TRN_subfield_1=[OFDM_TRN_basic_1,−OFDM_TRN_basic_1],

OFDM_TRN_subfield_2=[OFDM_TRN_basic_2,OFDM_TRN_basic_2],

As yet another example, when the total number of space-time stream is 3, the training subfield per space-time stream may be composed as follows. In the equations below, $w_3$=exp(−j*2*pi/3).

OFDM_TRN_subfield_1=[OFDM_TRN_basic_1,−OFDM_TRN_basic_1,OFDM_TRN_basic_1]

OFDM_TRN_subfield_2=[OFDM_TRN_basic_2,−$w_3^1$*OFDM_TRN_basic_2,$w_3^2$*OFDM_TRN_basic_2]

OFDM_TRN_subfield_3=[OFDM_TRN_basic_3,−$w_3^3$*OFDM_TRN_basic_3,$w_3^4$*OFDM_TRN_basic_3]

As still another example, when the total number of space-time stream is 4, the training subfield per space-time stream may be composed as follows.

OFDM_TRN_subfield_1=[OFDM_TRN_basic_1,−OFDM_TRN_basic_1,OFDM_TRN_basic_1,OFDM_TRN_basic_1]

OFDM_TRN_subfield_2=[OFDM_TRN_basic_2,OFDM_TRN_basic_2,−OFDM_TRN_basic_2,OFDM_TRN_basic_2]

OFDM_TRN_subfield_3=[OFDM_TRN_basic_3,OFDM_TRN_basic_3,OFDM_TRN_basic_3,−OFDM_TRN_basic_3]

OFDM_TRN_subfield_4=[−OFDM_TRN_basic_4,OFDM_TRN_basic_4,OFDM_TRN_basic_4,OFDM_TRN_basic_4]

As a further example, when the total number of space-time stream is 5, the training subfield per space-time stream may be composed as follows. In the equations below, $w_6$=exp(−j*2*pi/6).

OFDM_TRN_subfield_1=[OFDM_TRN_basic_1,−OFDM_TRN_basic_1,OFDM_TRN_basic_1,OFDM_TRN_basic_1,OFDM_TRN_basic_1,−OFDM_TRN_basic_1]

OFDM_TRN_subfield_2=[OFDM_TRN_basic_2,−$w_6^1$*OFDM_TRN_basic_2,$w_6^2$*OFDM_TRN_basic_2,$w_6^3$*OFDM_TRN_basic_2,$w_6^4$*OFDM_TRN_basic_2,−$w_6^5$*OFDM_TRN_basic_2]

OFDM_TRN_subfield_3=[OFDM_TRN_basic_3,−$w_6^2$*OFDM_TRN_basic_3,$w_6^4$*OFDM_TRN_basic_3,$w_6^6$*OFDM_TRN_basic_3,$w_6^8$*OFDM_TRN_basic_3−$w_6^{10}$*OFDM_TRN_basic_3]

OFDM_TRN_subfield_4=[OFDM_TRN_basic_4,−$w_6^3$*OFDM_TRN_basic_4,$w_6^6$*OFDM_TRN_basic_4,$w_6^9$*OFDM_TRN_basic_4,$w_6^{12}$*OFDM_TRN_basic_4−$w_6^{15}$*OFDM_TRN_basic_4]

OFDM_TRN_subfield_5=[OFDM_TRN_basic_5,−$w_6^4$*OFDM_TRN_basic_5,$w_6^8$*OFDM_TRN_basic_5,$w_6^{12}$*OFDM_TRN_basic_5,$w_6^{16}$*OFDM_TRN_basic_5−$w_6^{20}$*OFDM_TRN_basic_5]

As an additional example, when the total number of space-time stream is 6, the training subfield per space-time stream may be composed as follows.

OFDM_TRN_subfield_1=[OFDM_TRN_basic_1,–OFDM_TRN_basic_1,OFDM_TRN_basic_1,OFDM_TRN_basic_1,OFDM_TRN_basic_1,–OFDM_TRN_basic_1]

OFDM_TRN_subfield_2=[OFDM_TRN_basic_2,–$w_6^{1}$*OFDM_TRN_basic_2,$w_6^{2}$*OFDM_TRN_basic_2,$w_6^{3}$*OFDM_TRN_basic_2,$w_6^{4}$*OFDM_TRN_basic_2,–$w_6^{5}$*OFDM_TRN_basic_2]

OFDM_TRN_subfield_3=[OFDM_TRN_basic_3,–$w_6^{2}$*OFDM_TRN_basic_3,$w_6^{4}$*OFDM_TRN_basic_3,$w_6^{6}$*OFDM_TRN_basic_3,$w_6^{8}$*OFDM_TRN_basic_3–$w_6^{10}$*OFDM_TRN_basic_3]

OFDM_TRN_subfield_4=[OFDM_TRN_basic_4,–$w_6^{3}$*OFDM_TRN_basic_4,$w_6^{6}$*OFDM_TRN_basic_4,$w_6^{9}$*OFDM_TRN_basic_4,$w_6^{12}$*OFDM_TRN_basic_4–$w_6^{15}$*OFDM_TRN_basic_4]

OFDM_TRN_subfield_5=[OFDM_TRN_basic_5,–$w_6^{4}$*OFDM_TRN_basic_5,$w_6^{8}$*OFDM_TRN_basic_5,$w_6^{12}$*OFDM_TRN_basic_5,$w_6^{16}$*OFDM_TRN_basic_5–$w_6^{20}$*OFDM_TRN_basic_5]

OFDM_TRN_subfield_6=[OFDM_TRN_basic_6,–$w_6^{5}$*OFDM_TRN_basic_6,$w_6^{10}$*OFDM_TRN_basic_6,$w_6^{15}$*OFDM_TRN_basic_6,$w_6^{20}$*OFDM_TRN_basic_6–$w_6^{25}$*OFDM_TRN_basic_6]

As yet another additional example, when the total number of space-time stream is 7, the training subfield per space-time stream may be composed as follows.

OFDM_TRN_subfield_1=[OFDM_TRN_basic_1,–OFDM_TRN_basic_1,OFDM_TRN_basic_1,OFDM_TRN_basic_1,OFDM_TRN_basic_1,–OFDM_TRN_basic_1,OFDM_TRN_basic_1 OFDM_TRN_basic_1]

OFDM_TRN_subfield_2=[OFDM_TRN_basic_2,OFDM_TRN_basic_2,–OFDM_TRN_basic_2,OFDM_TRN_basic_2,OFDM_TRN_basic_2,OFDM_TRN_basic_2,–OFDM_TRN_basic_2,OFDM_TRN_basic_2]

OFDM_TRN_subfield_3=[OFDM_TRN_basic_3,OFDM_TRN_basic_3,OFDM_TRN_basic_3,–OFDM_TRN_basic_3,OFDM_TRN_basic_3,OFDM_TRN_basic_3,OFDM_TRN_basic_3,–OFDM_TRN_basic_3]

OFDM_TRN_subfield_4=[–OFDM_TRN_basic_4,OFDM_TRN_basic_4,OFDM_TRN_basic_4,OFDM_TRN_basic_4,–OFDM_TRN_basic_4,OFDM_TRN_basic_4,OFDM_TRN_basic_4,OFDM_TRN_basic_4]

OFDM_TRN_subfield_5=[OFDM_TRN_basic_5,–OFDM_TRN_basic_5,OFDM_TRN_basic_5,OFDM_TRN_basic_5,–OFDM_TRN_basic_5,OFDM_TRN_basic_5,–OFDM_TRN_basic_5,–OFDM_TRN_basic_5]

OFDM_TRN_subfield_6=[OFDM_TRN_basic_6,OFDM_TRN_basic_6,–OFDM_TRN_basic_6,OFDM_TRN_basic_6,–OFDM_TRN_basic_6,–OFDM_TRN_basic_6,OFDM_TRN_basic_6,–OFDM_TRN_basic_6]

OFDM_TRN_subfield_7=[OFDM_TRN_basic_7,OFDM_TRN_basic_7,OFDM_TRN_basic_7,–OFDM_TRN_basic_7,–OFDM_TRN_basic_7,–OFDM_TRN_basic_7,–OFDM_TRN_basic_7,OFDM_TRN_basic_7]

As still another additional example, when the total number of space-time stream is 8, the training subfield per space-time stream may be composed as follows.

OFDM_TRN_subfield_1=[OFDM_TRN_basic_1,–OFDM_TRN_basic_1,OFDM_TRN_basic_1,OFDM_TRN_basic_1,OFDM_TRN_basic_1,–OFDM_TRN_basic_1,OFDM_TRN_basic_1,OFDM_TRN_basic_1]

OFDM_TRN_subfield_2=[OFDM_TRN_basic_2,OFDM_TRN_basic_2,–OFDM_TRN_basic_2,OFDM_TRN_basic_2,OFDM_TRN_basic_2,OFDM_TRN_basic_2,–OFDM_TRN_basic_2,OFDM_TRN_basic_2]

OFDM_TRN_subfield_3=[OFDM_TRN_basic_3,OFDM_TRN_basic_3,OFDM_TRN_basic_3,–OFDM_TRN_basic_3,OFDM_TRN_basic_3,OFDM_TRN_basic_3,OFDM_TRN_basic_3,–OFDM_TRN_basic_3]

OFDM_TRN_subfield_4=[–OFDM_TRN_basic_4,OFDM_TRN_basic_4,OFDM_TRN_basic_4,OFDM_TRN_basic_4,–OFDM_TRN_basic_4,OFDM_TRN_basic_4,OFDM_TRN_basic_4,OFDM_TRN_basic_4]

OFDM_TRN_subfield_5=[OFDM_TRN_basic_5,–OFDM_TRN_basic_5,OFDM_TRN_basic_5,OFDM_TRN_basic_5,–OFDM_TRN_basic_5,OFDM_TRN_basic_5,–OFDM_TRN_basic_5,–OFDM_TRN_basic_5]

OFDM_TRN_subfield_6=[OFDM_TRN_basic_6,OFDM_TRN_basic_6,–OFDM_TRN_basic_6,OFDM_TRN_basic_6,–OFDM_TRN_basic_6,–OFDM_TRN_basic_6,OFDM_TRN_basic_6,–OFDM_TRN_basic_6]

OFDM_TRN_subfield_7=[OFDM_TRN_basic_7,OFDM_TRN_basic_7,OFDM_TRN_basic_7,–OFDM_TRN_basic_7,–OFDM_TRN_basic_7,–OFDM_TRN_basic_7,–OFDM_TRN_basic_7,OFDM_TRN_basic_7]

OFDM_TRN_subfield_8=[–OFDM_TRN_basic_8,OFDM_TRN_basic_8,OFDM_TRN_basic_8,OFDM_TRN_basic_8,OFDM_TRN_basic_8,–OFDM_TRN_basic_8,–OFDM_TRN_basic_8,–OFDM_TRN_basic_8]

Also, the basic training subfield per space-time stream may be configured of/may include one, two, or four OFDM symbols based on the information indicated by/included in the header field.

At this time, one OFDM symbol included in the one, two, or four OFDM symbols may include a guard interval with a length of 72.72 ns or cyclic prefix (CP).

Also, the header field may include an Enhanced Directional Multi Gigabit (EDMG) training subfield sequence length field which indicates/including information on the OFDM symbol length of the basic training subfield per space-time stream.

As one example, when the EDMG training subfield sequence length field indicates 0, the basic training subfield per space-time stream may be configured of two OFDM symbols; when the EDMG training subfield sequence length field indicates 1, the basic training subfield per space-time stream may be configured of four OFDM symbols; and when the EDMG training subfield sequence length field indicates 2, the basic training subfield per space-time stream may be configured of/may include one OFDM symbol.

Also, the basic training subfield per space-time stream may be configured of/may include a sequence with a different length in the frequency domain according to the number of contiguous channels through which the signal is transmitted.

As one example, when the number of contiguous channels through which the signal is transmitted is 1, the basic training subfield per space-time stream may be configured of/may include a sequence with a length of 355 in the frequency domain. At this time, a 512-point IDFT may be applied to the sequence.

As another example, when the number of contiguous channels through which the signal is transmitted is 2, the basic training subfield per space-time stream may be configured of/may include a sequence with a length of 773 in the frequency domain. At this time, a 1024-point IDFT may be applied to the sequence.

As yet another example, when the number of contiguous channels through which the signal is transmitted is 3, the basic training subfield per space-time stream may be configured of/may include a sequence with a length of 596 in the frequency domain. At this time, a 1536-point IDFT may be applied to the sequence.

As still another example, when the number of contiguous channels through which the signal is transmitted is 4, the basic training subfield per space-time stream may be configured of/may include a sequence with a length of 805 in the frequency domain. At this time, a 2048-point IDFT may be applied to the sequence.

Next, the transmitter transmits a signal including the training field generated as above and the header field to a receiver through the corresponding space-time stream S3920.

At this time, when the signal is transmitted through a plurality of channels, the transmitter may transmit the signal through the corresponding space-time stream within a plurality of channels.

In response to the transmission, first, the receiver receives a header field included in the transmitted signal. Next, the receiver determines the number of Orthogonal Frequency Division Multiplexing (OFDM) symbols of a basic training subfield per space-time stream based on the information indicated by/included in the header field. Next, the receiver receives a training field including a training subfield per space-time stream configured based on the basic training subfield per space-time stream configured of the total number of space-time streams and the number of determined OFDM symbols, through the corresponding space-time stream.

At this time, the receiver may perform channel measurement in the frequency domain during a symbol period through which the training field is transmitted through the training field.

Through the structure as described above, training subfields for the respective space-time streams may be kept mutually orthogonal to each other.

4. Device Configuration

Figure 40:
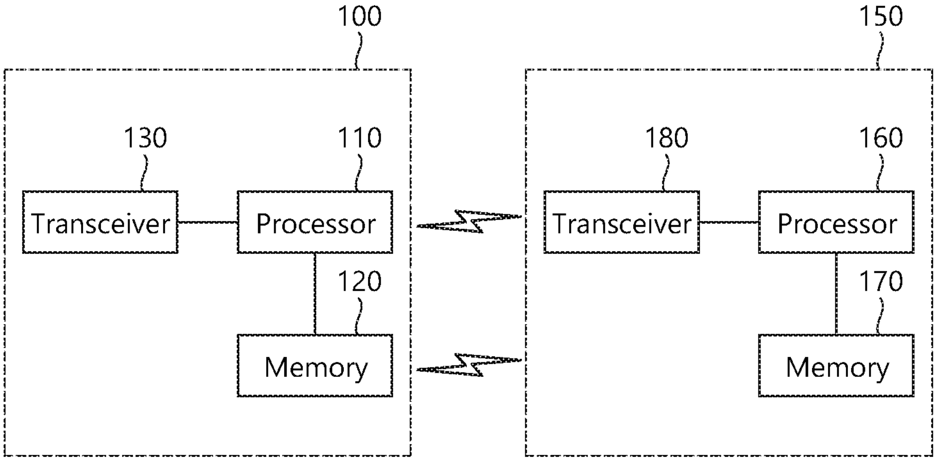
FIG. 40 is a diagram illustrating a device for implementing the above-described method.

FIG. 40 is a diagram illustrating a device for implementing the above-described method.

A wireless device 100 of FIG. 40 may correspond to an STA that transmits a signal described in the above description, and a wireless device 150 may correspond to an STA that receives a signal described in the above description.

In this case, the station transmitting the signal may correspond to a PCP/AP or an 11ay terminal supporting an 11ay system, and the station receiving the signal may correspond to a legacy terminal (e.g., 11ad terminal) that does not support the 11ay system as well as a PCP/AP or an 11ay terminal supporting the 11ay system.

Hereinafter, for convenience of description, the STA transmitting a signal is referred to as a transmitting device 100, and the STA receiving a signal is referred to as a receiving device 150.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

Although the present invention has been described in detail under the assumption that the present invention can be applied to an IEEE 802.11 based wireless LAN (WLAN) system, the present invention will not be limited only to this. It will be understood that the present invention can be applied to diverse wireless systems capable of performing data transmission based on channel bonding by using the same method as presented herein.

What is claimed is:

1. A method for transmitting, by a first station (STA), a signal to a second STA in a wireless local area network (WLAN) system, comprising:

generating a training field including a training subfield based on a basic training subfield and a total number of space-time streams, wherein the basic training subfield includes a first sequence, a zero sequence being contiguous to the first sequence and a second sequence being contiguous to the zero sequence, wherein the zero sequence is configured based on {0, 0, 0}, and wherein the training subfield is generated based on a repetition of the basic training subfield for each of the space-time streams, wherein the repetition of the basic training subfield is determined based on a header field, and wherein the header field includes an Enhanced Directional Multi Gigabit (EDMG) training subfield sequence length field including information on OFDM symbol length of the basic training subfield; and transmitting the signal including the header field and the training field to the second STA through the space-time streams.

2. The method of claim 1, wherein the training subfield is configured of one, two, or four basic training subfields based on the header field.

3. The method of claim 2, wherein one OFDM symbol included in the basic training subfield includes a guard interval with a length of 72.72 ns or cyclic prefix (CP).

4. The method of claim 1, wherein, when a value of the EDMG training subfield sequence length field is 0, the training subfield is configured of two repetitions of the basic training subfield;

when a value of the EDMG training subfield sequence length field is 1, the training subfield is configured of four repetitions of the basic training subfield; and when a value of the EDMG training subfield sequence length field is 2, the training subfield is configured of one basic training subfield.

5. The method of claim 1, wherein the training subfield is configured based on the basic training subfield based on a rule determined by the total number of the space-time streams.

6. The method of claim 5, wherein, when the total number of the space-time streams is 1, a training subfield for a space-time stream for an index 1 is configured based on the equation given below OFDM_TRN_subfield_1=[OFDM_TRN_basic_1,–OFDM_TRN_basic_1], [Equation]

where OFDM_TRN_subfield_N represents a training subfield for a space-time stream for an index N, and OFDM_TRN_basic_N represents a basic training subfield for the space-time stream for the index N.

7. The method of claim 5, wherein, when the total number of the space-time streams is 2, training subfields for space-time streams for an index 1 and an index 2 are configured based on the equation given below OFDM_TRN_subfield_1=[OFDM_TRN_basic_1,–OFDM_TRN_basic_1], OFDM_TRN_subfield_2=[OFDM_TRN_basic_2,OFDM_TRN_basic_2], [Equation]

where OFDM_TRN_subfield_N represents a training subfield for a space-time stream for an index N, and OFDM_TRN_basic_N represents a basic training subfield for the space-time stream for the index N.

8. The method of claim 5, wherein, when the total number of the space-time stream is 3, training subfields for space-time streams for an index 1, an index 2 and an index 3 are configured based on the equation given below OFDM_TRN_subfield_1=[OFDM_TRN_basic_1,–OFDM_TRN_basic_1,OFDM_TRN_basic_1], OFDM_TRN_subfield_2=[OFDM_TRN_basic_2,–$w_3^1$*OFDM_TRN_basic_2,$w_3^2$*OFDM_TRN_basic_2], OFDM_TRN_subfield_3=[OFDM_TRN_basic_3,–$w_3^3$*OFDM_TRN_basic_3,$w_3^4$*OFDM_TRN_basic_3], [Equation]

where OFDM_TRN_subfield_N represents a training subfield for a space-time stream for an index N, OFDM_TRN_basic_N represents a basic training subfield for the space-time stream for the index N, and $w_3$=exp(–j*2*pi/3) is applied.

9. The method of claim 5, wherein, when the total number of the space-time streams is 4, training subfields for space-time streams for an index 1, an index 2, an index 3 and an index 4 are configured based on the equation given below OFDM_TRN_subfield_1=[OFDM_TRN_basic_1,–OFDM_TRN_basic_1,OFDM_TRN_basic_1,OFDM_TRN_basic_1], OFDM_TRN_subfield_2=[OFDM_TRN_basic_2,OFDM_TRN_basic_2,OFDM_TRN_basic_2,OFDM_TRN_basic_2], OFDM_TRN_subfield_3=[OFDM_TRN_basic_3,OFDM_TRN_basic_3,OFDM_TRN_basic_3,–OFDM_TRN_basic_3], OFDM_TRN_subfield_4=[–OFDM_TRN_basic_4,OFDM_TRN_basic_4,OFDM_TRN_basic_4,OFDM_TRN_basic_4], [Equation]

where OFDM_TRN_subfield_N represents a training subfield for a space-time stream for an index N, and OFDM_TRN_basic_N represents a basic training subfield for the space-time stream for the index N.

10. The method of claim 5, wherein, when the total number of the space-time streams is 5, training subfields for space-time streams for an index 1, an index 2, an index 3, an index 4 and an index 5 are configured based on the equation given below OFDM_TRN_subfield_1=[OFDM_TRN_basic_1,–OFDM_TRN_basic_1,OFDM_TRN_basic_1,OFDM_TRN_basic_1,OFDM_TRN_basic_1,–OFDM_TRN_basic_1], OFDM_TRN_subfield_2=[OFDM_TRN_basic_2,–$w_6^1$*OFDM_TRN_basic_2,$w_6^2$*OFDM_TRN_basic_2,$w_6^3$*OFDM_TRN_basic_2,$w_6^4$*OFDM_TRN_basic_2,$w_6^5$*OFDM_TRN_basic_2], OFDM_TRN_subfield_3=[OFDM_TRN_basic_3,–$w_6^2$*OFDM_TRN_basic_3,$w_6^4$*OFDM TRN basic_3,$w_6^6$*OFDM_TRN_basic_3,$w_6^8$*OFDM_TRN_basic_3–$w_6^{10}$*OFDM_TRN_basic_3], OFDM_TRN_subfield_4=[OFDM_TRN_basic_4,–$w_6^3$*OFDM_TRN_basic_4,$w_6^6$*OFDM_TRN_basic_4,$w_6^9$*OFDM_TRN_basic_4,$w_6^{12}$*OFDM_TRN_basic_4–$w_6^{15}$*OFDM_TRN_basic_4], OFDM_TRN_subfield_5=[OFDM_TRN_basic_5,–$w_6^4$*OFDM_TRN_basic_5,$w_6^8$*OFDM_TRN_basic_5, $w_6^{12}$*OFDM_TRN_basic_5,
$w_6^{16}$*OFDM_TRN_basic_5-
$w_6^{20}$*OFDM_TRN_basic_5],   [Equation]

where OFDM_TRN_subfield_N represents a training subfield for a space-time stream for an index N, OFDM TRN basic N represents a basic training subfield for the space-time stream for the index N, and $w_6$=exp(-j*2*pi/6) is applied.

11. The method of claim 5, wherein, when the total number of the space-time streams is 6, training subfields for space-time streams for an index 1, an index 2, an index 3, an index 4, an index 5 and an index 6 are configured based on the equation given below OFDM_TRN_subfield_1=[OFDM_TRN_basic_1,-
   OFDM_TRN_basic_1,OFDM_TRN_basic_1,
   OFDM_TRN_basic_1,OFDM_TRN_basic_1,-
   OFDM_TRN_basic_1], OFDM_TRN_subfield_2=[OFDM_TRN_basic_2,-
   $w_6^1$*OFDM_TRN_basic_2,
   $w_6^2$*OFDM_TRN_basic_2,
   $w_6^3$*OFDM_TRN_basic_2,
   $w_6^4$*OFDM_TRN_basic_2,-
   $w_6^5$*OFDM_TRN_basic_2], OFDM_TRN_subfield_3=[OFDM_TRN_basic_3,-
   $w_6^2$*OFDM_TRN_basic_3,
   $w_6^4$*OFDM_TRN_basic_3,
   $w_6^6$*OFDM_TRN_basic_3,
   $w_6^8$*OFDM_TRN_basic_3-
   $w_6^{10}$*OFDM_TRN_basic_3], OFDM_TRN_subfield_4=[OFDM_TRN_basic_4,-
   $w_6^3$*OFDM_TRN_basic_4,
   $w_6^6$*OFDM_TRN_basic_4,
   $w_6^9$*OFDM_TRN_basic_4,
   $w_6^{12}$*OFDM_TRN_basic_4-
   $w_6^{15}$*OFDM_TRN_basic_4], OFDM_TRN_subfield_5=[OFDM_TRN_basic_5,-
   $w_6^1$*OFDM_TRN_basic_5,
   $w_6^8$*OFDM_TRN_basic_5,
   $w_6^{12}$*OFDM_TRN_basic_5,
   $w_6^{16}$*OFDM_TRN_basic_5-
   $w_6^{20}$*OFDM_TRN_basic_5], OFDM_TRN_subfield_6=[OFDM_TRN_basic_6,-
   $w_6^5$*OFDM_TRN_basic_6,
   $w_6^{10}$*OFDM_TRN_basic_6,
   $w_6^{15}$*OFDM_TRN_basic_6,
   $w_6^{20}$*OFDM_TRN_basic_6-
   $w_6^{25}$*OFDM_TRN_basic_6],   [Equation]

where OFDN_TRN_subfield_N represents a training subfield for a space-time stream for an index N, OFDM_TRN_basic_N represents a basic training subfield for a space-time stream for the index N, and =exp(-j*2*pi/6) is applied.

12. The method of claim 5, wherein, when the total number of the space-time streams is 7, training subfields for space-time streams for an index 1, an index 2, an index 3, an index 4, an index 5, an index 6 and an index 7 are configured based on the equation given below OFDM_TRN_subfield_1=[OFDM_TRN_basic_1,-
   OFDM_TRN_basic_1,OFDM_TRN_basic_1,
   OFDM_TRN_basic_1,OFDM_TRN_basic_1,-
   OFDM_TRN_basic_1,
   OFDM_TRN_basic_1OFDM_TRN_basic_1], OFDM_TRN_subfield_2=[OFDM_TRN_basic_2,
   OFDM_TRN_basic_2,-OFDM_TRN_basic_2,
   OFDM_TRN_basic_2,OFDM_TRN_basic_2,
   OFDM_TRN_basic_2,-OFDM_TRN_basic_2,
   OFDM_TRN_basic_2], OFDM_TRN_subfield_3[OFDM_TRN_basic_3,
   OFDM_TRN_basic_3,OFDM_TRN_basic_3,-
   OFDM_TRN_basic_3,OFDM_TRN_basic_3,
   OFDM_TRN_basic_3,OFDM_TRN_basic_3,-
   OFDM_TRN_basic_3], OFDM_TRN_subfield_4=[-OFDM_TRN_basic_4,
   OFDM_TRN_basic_4,OFDM_TRN_basic_4,
   OFDM_TRN_basic_4,-OFDM_TRN_basic_4,
   OFDM_TRN_basic_4,OFDM_TRN_basic_4,
   OFDM_TRN_basic_4], OFDM_TRN_subfield_5=[OFDM_TRN_basic_5,-
   OFDM_TRN_basic_5,OFDM_TRN_basic_5,
   OFDM_TRN_basic_5,-OFDM_TRN_basic_5,
   OFDM_TRN_basic_5,-OFDM_TRN_basic_5,-
   OFDM_TRN_basic_5], OFDM_TRN_subfield_6=[OFDM_TRN_basic_6,
   OFDM_TRN_basic_6,-OFDM_TRN_basic_6,
   OFDM_TRN_basic_6,-OFDM_TRN_basic_6,-
   OFDM_TRN_basic_6,OFDM_TRN_basic_6,-
   OFDM_TRN_basic_6], OFDM_TRN_subfield_7=[OFDM_TRN_basic_7,
   OFDM_TRN_basic_7,OFDM_TRN_basic_7,-
   OFDM_TRN_basic_7,-OFDM_TRN_basic_7,-
   OFDM_TRN_basic_7,-OFDM_TRN_basic_7,
   OFDM_TRN_basic_7],   [Equation]

wherein OFDM_TRN_subfield_N represents a training subfield for a space-time stream for an index N, and OFDM_TRN_basic_N represents a basic training subfield for the space-time stream for the index N.

13. The method of claim 5, wherein, when the total number of the space-time streams is 8, training subfields for space-time streams for an index 1, an index 2, an index 3, an index 4, an index 5, an index 6, an index 7 and an index 8 are configured based on the equation given below OFDM_TRN_subfield_1=[OFDM_TRN_basic_1,-
   OFDM_TRN_basic_1,OFDM_TRN_basic_1,
   OFDM_TRN_basic_1,OFDM_TRN_basic_1,-
   OFDM_TRN_basic_1,OFDM_TRN_basic_1,
   OFDM_TRN_basic_1], OFDM_TRN_subfield_2=[OFDM_TRN_basic_2,
   OFDM_TRN_basic_2,-OFDM_TRN_basic_2,
   OFDM_TRN_basic_2,OFDM_TRN_basic_2,
   OFDM_TRN_basic_2,-OFDM_TRN_basic_2,
   OFDM_TRN_basic_2], OFDM_TRN_subfield_3=[OFDM_TRN_basic_3,
   OFDM_TRN_basic_3,OFDM_TRN_basic_3,-
   OFDM_TRN_basic_3,OFDM_TRN_basic_3,
   OFDM_TRN_basic_3,OFDM_TRN_basic_3,-
   OFDM_TRN_basic_3], OFDM_TRN_subfield_4=[-OFDM_TRN_basic_4,
   OFDM_TRN_basic_4,OFDM_TRN_basic_4,
   OFDM_TRN_basic_4,-OFDM_TRN_basic_4,
   OFDM_TRN_basic_4,OFDM_TRN_basic_4,
   OFDM_TRN_basic_4], OFDM_TRN_subfield_5=[OFDM_TRN_basic_5,-
   OFDM_TRN_basic_5,OFDM_TRN_basic_5,
   OFDM_TRN_basic_5,-OFDM_TRN_basic_5,
   OFDM_TRN_basic_5,-OFDM_TRN_basic_5,-
   OFDM_TRN_basic_5], OFDM_TRN_subfield_6=[OFDM_TRN_basic_6,
   OFDM_TRN_basic_6,-OFDM_TRN_basic_6,
   OFDM_TRN_basic_6,-OFDM_TRN_basic_6,-
   OFDM_TRN_basic_6,OFDM_TRN_basic_6,-
   OFDM_TRN_basic_6], OFDM_TRN_subfield_7=[OFDM_TRN_basic_7,
   OFDM_TRN_basic_7,OFDM_TRN_basic_7,-

OFDM_TRN_basic_7,−OFDM_TRN_basic_7,−OFDM_TRN_basic_7,−OFDM_TRN_basic_7,OFDM_TRN_basic_7], OFDM_TRN_subfield_8=[−OFDM_TRN_basic_8,OFDM_TRN_basic_8,OFDM_TRN_basic_8,OFDM_TRN_basic_8,OFDM_TRN_basic_8,−OFDM_TRN_basic_8,−OFDM_TRN_basic_8,−OFDM_TRN_basic_8], [Equation]

wherein OFDM_TRN_subfield_N represents a training subfield for a space-time stream for an index N, and OFDM_TRN_basic_N represents a basic training subfield for the space-time stream for the index N.

14. A first station (STA) in a wireless local area network (WLAN) system, comprising:

a transceiver configured to transmit a signal to a second STA; and a processor coupled to the transceiver, wherein the processor is configured to:

generate a training field including a training subfield based on a basic training subfield and a total number of space-time streams, wherein the basic training subfield includes a first sequence, a zero sequence being contiguous to the first sequence and a second sequence being contiguous to the zero sequence, and wherein the zero sequence is configured based on {0, 0, 0}, wherein the training subfield is generated based on a repetition of the basic training subfield for each of the space-time streams, wherein the repetition of the basic training subfield is determined based on a header field, and wherein the header field includes an Enhanced Directional Multi Gigabit (EDMG) training subfield sequence length field including information on OFDM symbol length of the basic training subfield; and transmit, via the transceiver, the signal including the header field and the training field to the second STA through the space-time streams.

15. The station of claim 14, wherein, when a value of the EDMG training subfield sequence length field is 0, the training subfield is configured of two repetitions of the basic training subfield;

when a value of the EDMG training subfield sequence length field is 1, the training subfield is configured of four repetitions of the basic training subfield; and when a value of the EDMG training subfield sequence length field is 2, the training subfield is configured of one basic training subfield.

16. The station of claim 14, wherein the training subfield is configured based on the basic training subfield based on a rule determined by the total number of the space-time streams.

17. The station of claim 16, wherein one OFDM symbol included in the basic training subfield include a guard interval with a length of 72.72 ns or cyclic prefix (CP).

* * * * *